(12) United States Patent
Tran et al.

(10) Patent No.: US 9,778,534 B2
(45) Date of Patent: Oct. 3, 2017

(54) CHROMATIC SYSTEMS

(71) Applicant: Polyceed Inc, Encinitas, CA (US)

(72) Inventors: Henry Tran, Culver City, CA (US); Scott Gilje, Torrance, CA (US); Maha Achour, Encinitas, CA (US); Juan C. Lopez-Tonazzi, Tuscon, AZ (US); John P. Cronin, Tuscon, AZ (US); Anoop Agrawal, Tuscon, AZ (US)

(73) Assignee: POLYCEED INC., Encinitas, CA (US)

( * ) Notice: Subject to any disclaimer, the term of this patent is extended or adjusted under 35 U.S.C. 154(b) by 0 days.

(21) Appl. No.: 15/021,680

(22) PCT Filed: Sep. 15, 2014

(86) PCT No.: PCT/US2014/055716
§ 371 (c)(1),
(2) Date: Mar. 11, 2016

(87) PCT Pub. No.: WO2015/041991
PCT Pub. Date: Mar. 26, 2015

(65) Prior Publication Data
US 2016/0223878 A1    Aug. 4, 2016

Related U.S. Application Data

(60) Provisional application No. 62/007,378, filed on Jun. 3, 2014, provisional application No. 61/986,047, filed on Apr. 29, 2014, provisional application No. 61/980, (Continued)

(51) Int. Cl.
G02F 1/163 (2006.01)
G09G 3/38 (2006.01)
(Continued)

(52) U.S. Cl.
CPC ............. G02F 1/163 (2013.01); E06B 9/24 (2013.01); G02F 1/155 (2013.01); G02F 1/1525 (2013.01);
(Continued)

(58) Field of Classification Search
CPC ........ G02B 1/15; G02B 1/1525; G02B 1/153; G02B 1/1533; G02B 1/155; G02B 1/163;
(Continued)

(56) References Cited

U.S. PATENT DOCUMENTS 6,429,960 B1 * 8/2002 Georg .................. C09K 9/02
                                              359/265
7,497,975 B2 * 3/2009 Maruyama ........... H01B 1/128
                                              252/500
(Continued)

Primary Examiner — Loha Ben
(74) Attorney, Agent, or Firm — Sandra L. Godsey, Esq.

(57) ABSTRACT

Chromatic systems and structures are presented that operate without external electrical supply, which enable changes in color or transparency of a substrate material, such as glass. Various configurations provide a mechanism to activate an oxidation-reduction reaction in a chromatic material, so as to change from transparent to opaque or from one color to another. These structures may be used in applications from windows for buildings and homes, camera lenses, automotive displays and windows, mobile device displays, and other applications where chromatic change is desired.

20 Claims, 29 Drawing Sheets

Related U.S. Application Data 011, filed on Apr. 15, 2014, provisional application No. 61/947,410, filed on Mar. 3, 2014, provisional application No. 61/941,462, filed on Feb. 18, 2014, provisional application No. 61/880,166, filed on Sep. 19, 2013.

(51) Int. Cl.
*G02F 1/15* (2006.01)
*G02F 1/155* (2006.01)
*E06B 9/24* (2006.01)
*G02F 1/153* (2006.01)
*H01G 9/20* (2006.01)

(52) U.S. Cl.
CPC .............. *G02F 1/1533* (2013.01); *G09G 3/38* (2013.01); *E06B 2009/2464* (2013.01); *G02F 2001/1515* (2013.01); *G02F 2001/1552* (2013.01); *G02F 2001/1635* (2013.01); *H01G 9/2004* (2013.01)

(58) Field of Classification Search
CPC .... G02B 2001/1515; G02B 2001/1552; G02B 2001/1635; G09G 3/38; E06B 9/24; E06B 2009/2464; H01G 9/2004; H01G 9/2013; H01B 1/02
USPC ....... 359/237, 241, 245, 265, 270, 273–275; 345/105; 257/431, 434; 136/244, 256, 136/263; 438/66, 82; 252/500
See application file for complete search history.

(56) References Cited

U.S. PATENT DOCUMENTS 7,875,209 B2 * 1/2011 Maruyama ............ H01B 1/128
  136/252
9,330,854 B2 * 5/2016 Isobe ................... H01G 9/2077

* cited by examiner

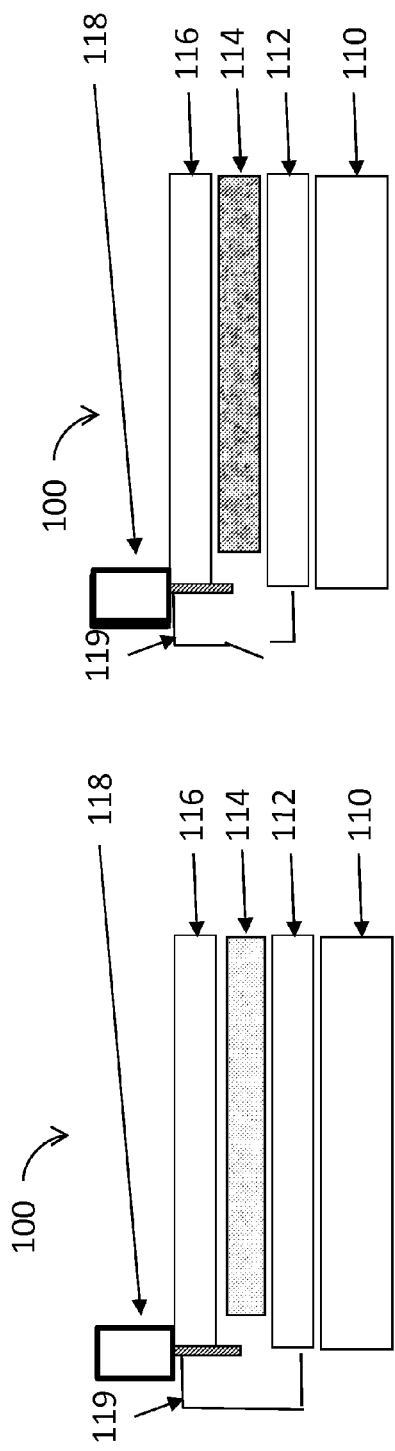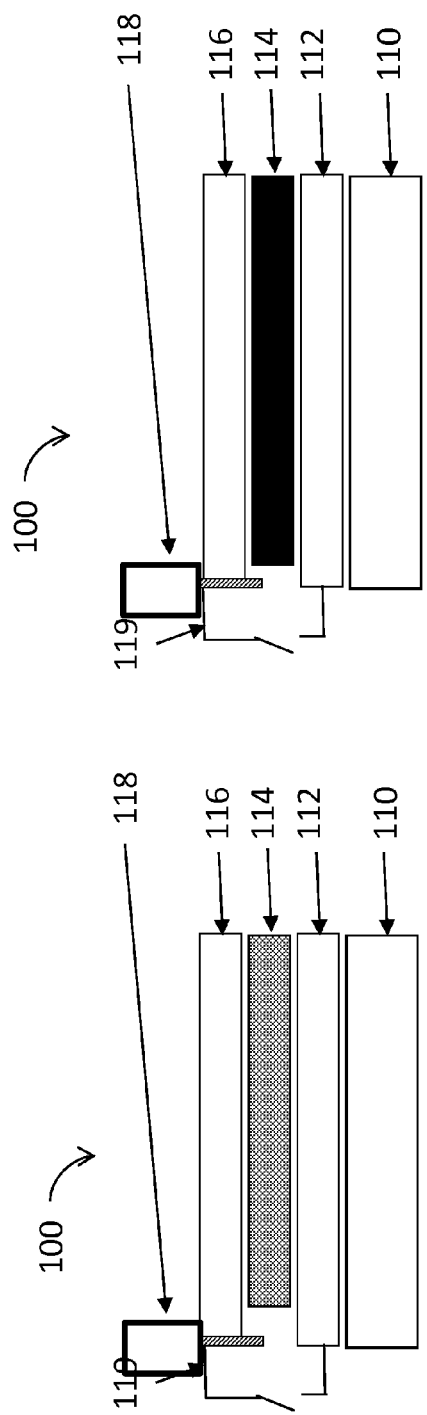

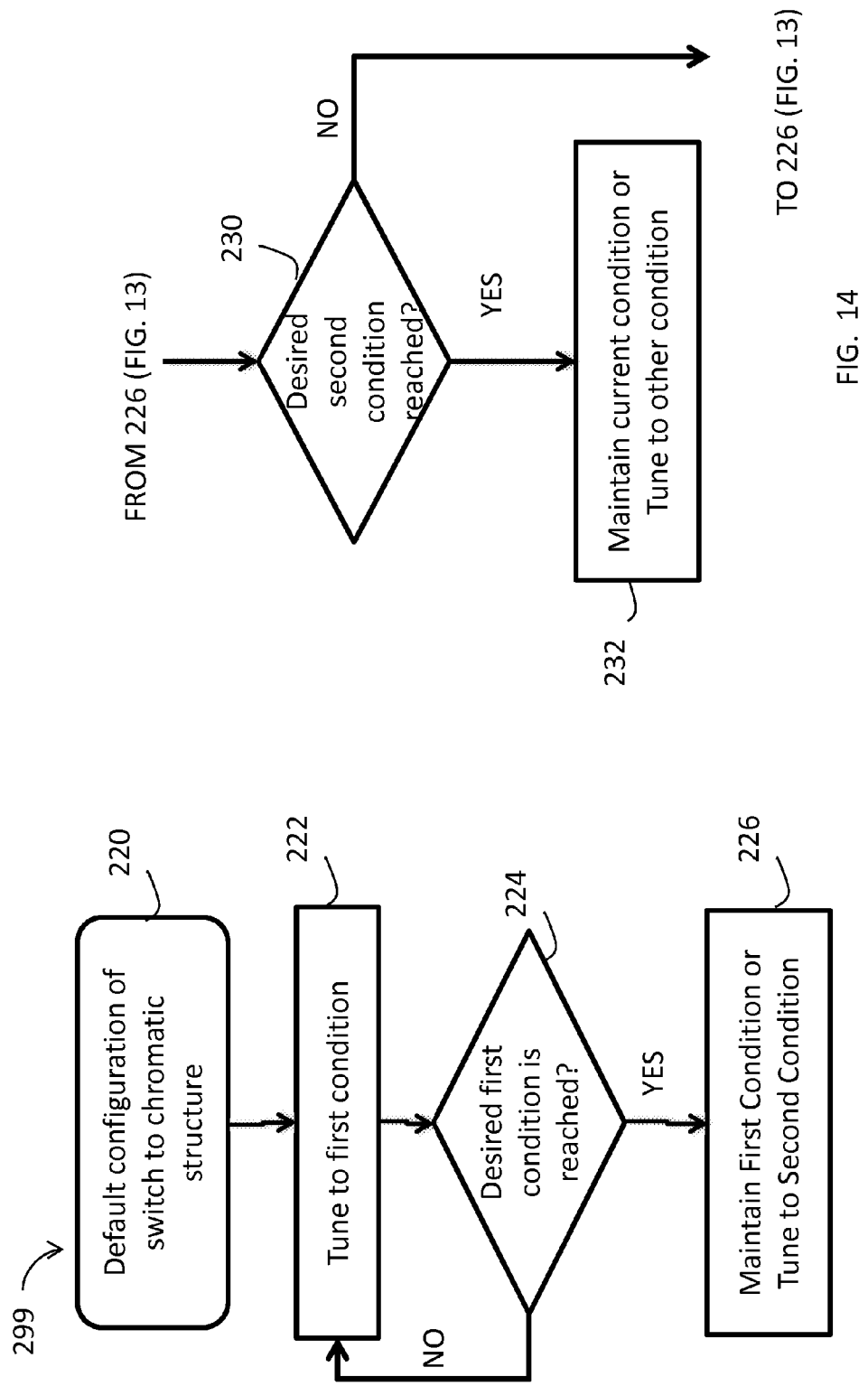

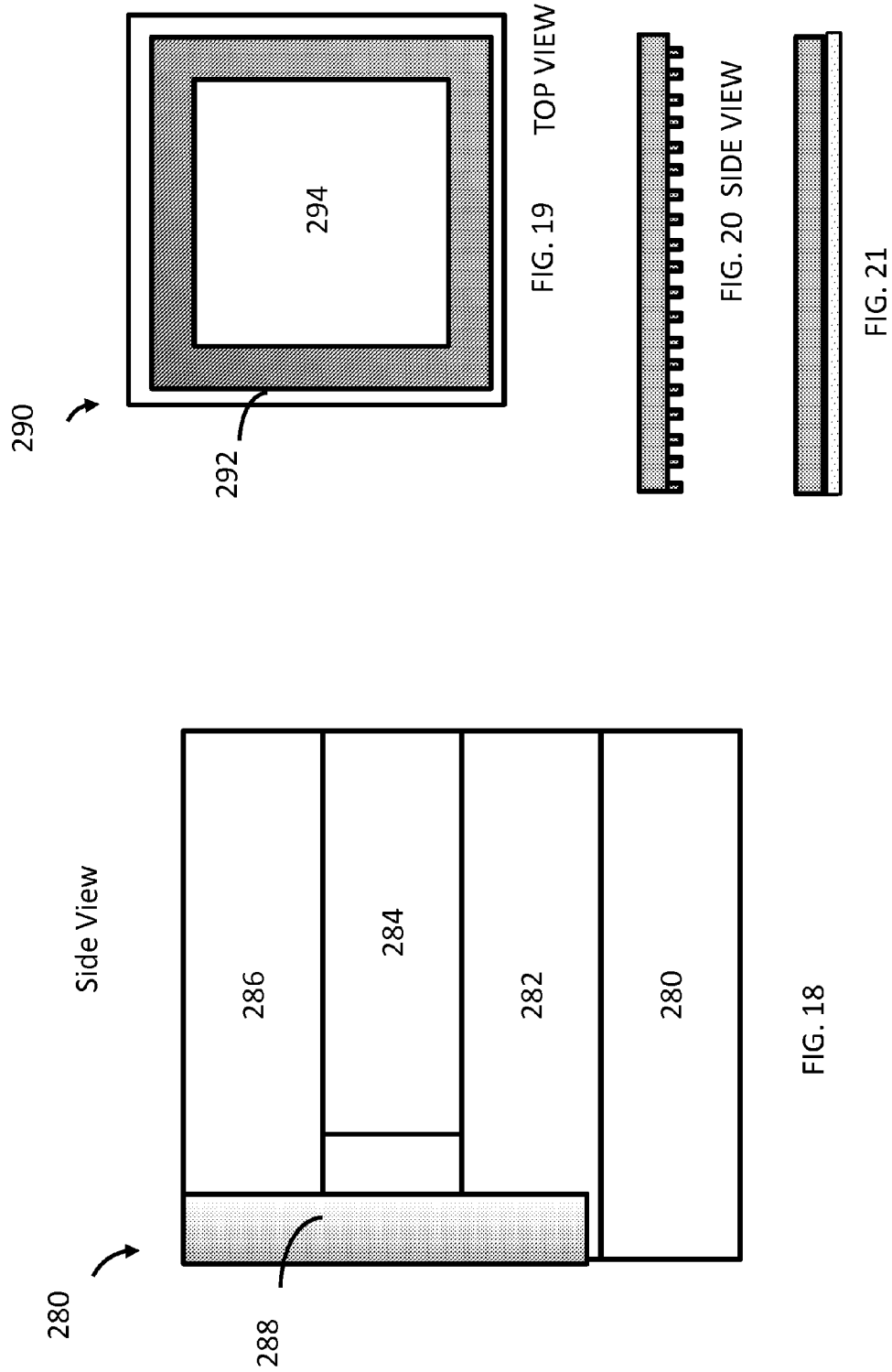

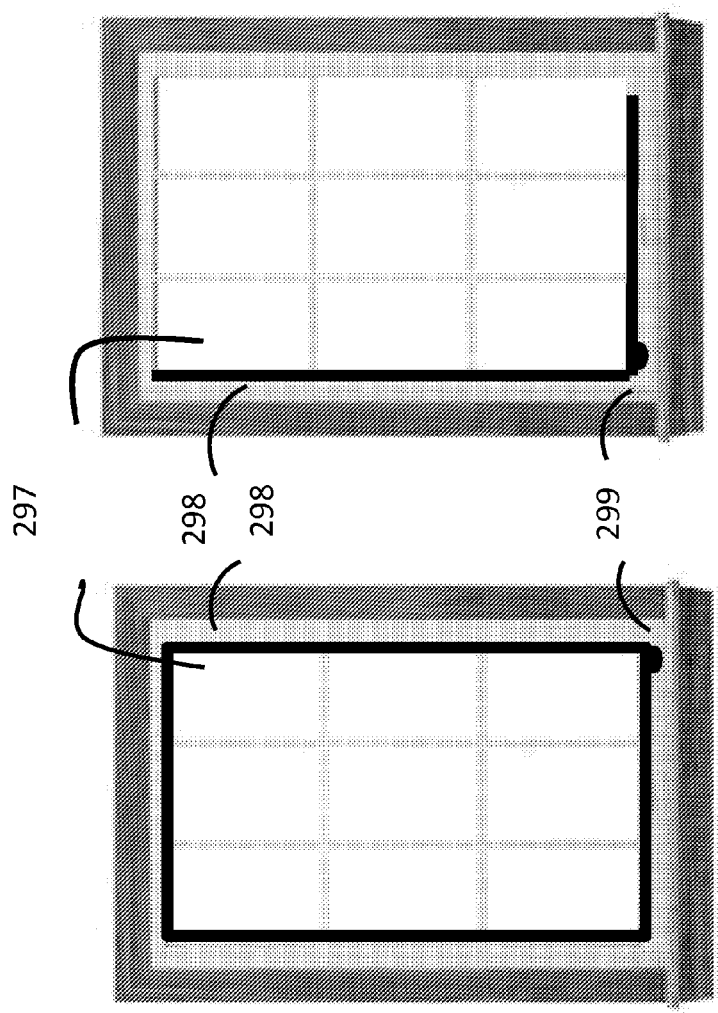
FIG. 24
FIG. 23
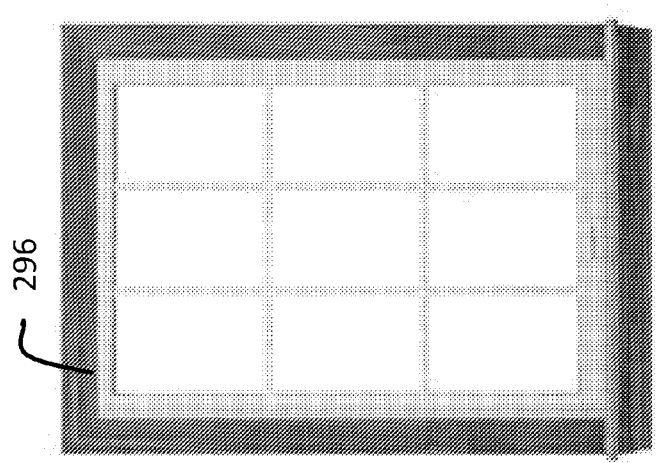
FIG. 22

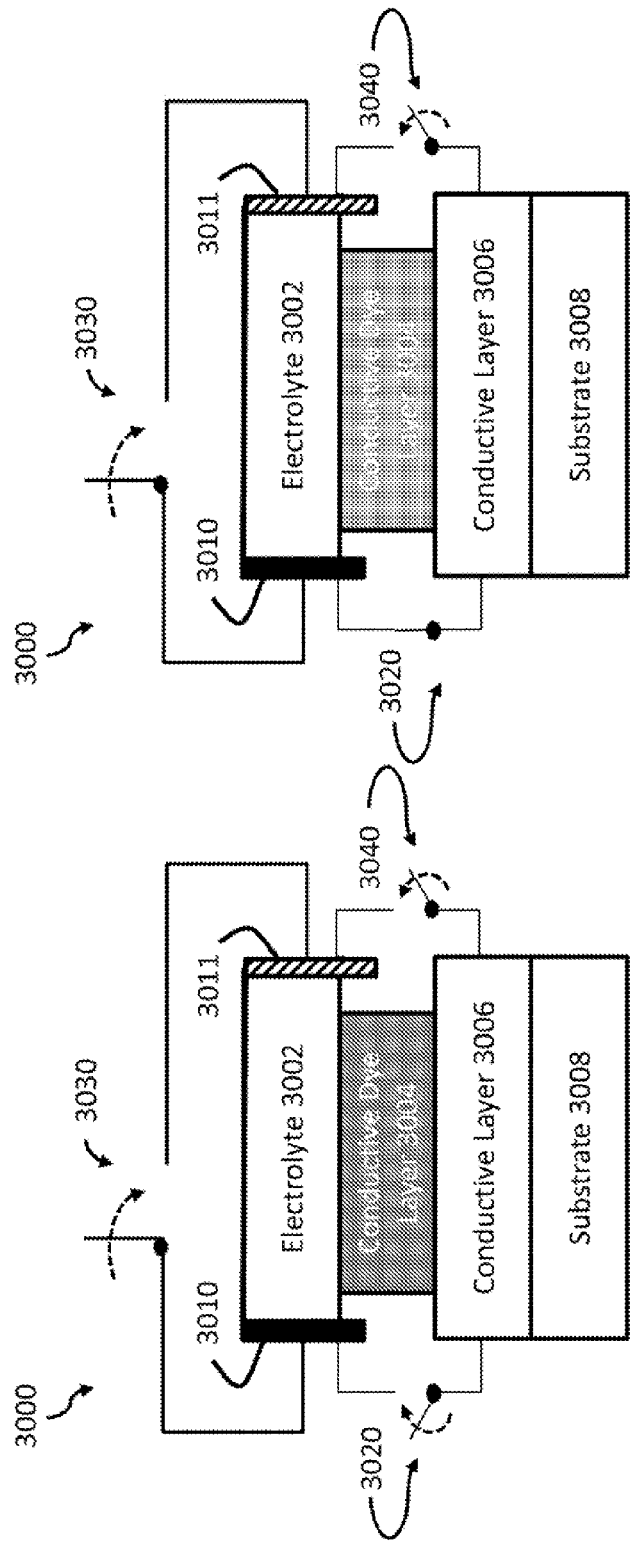

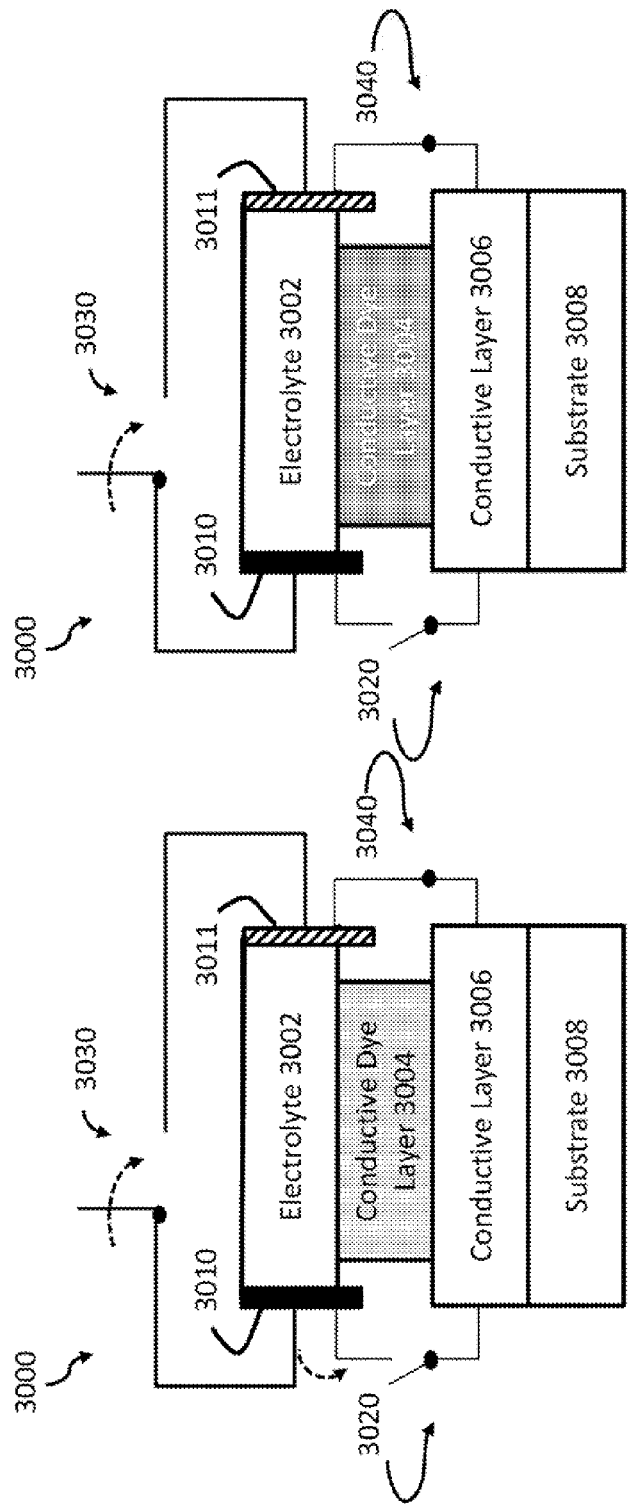

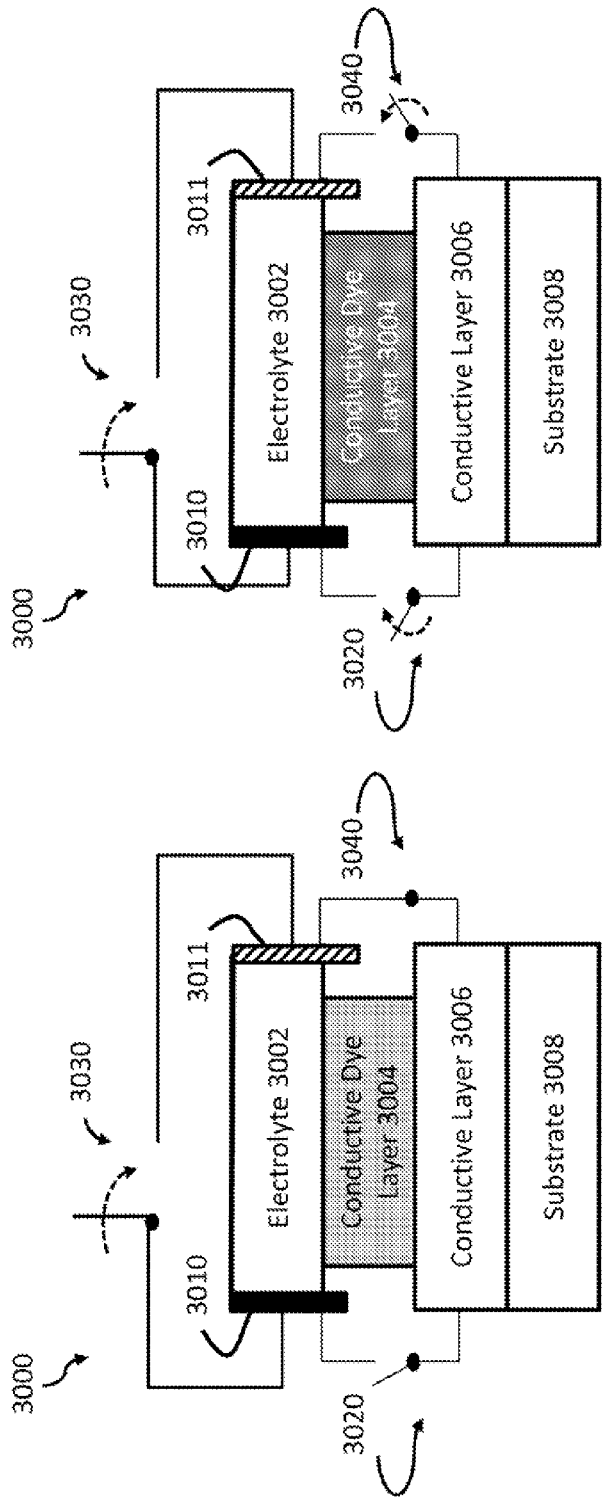

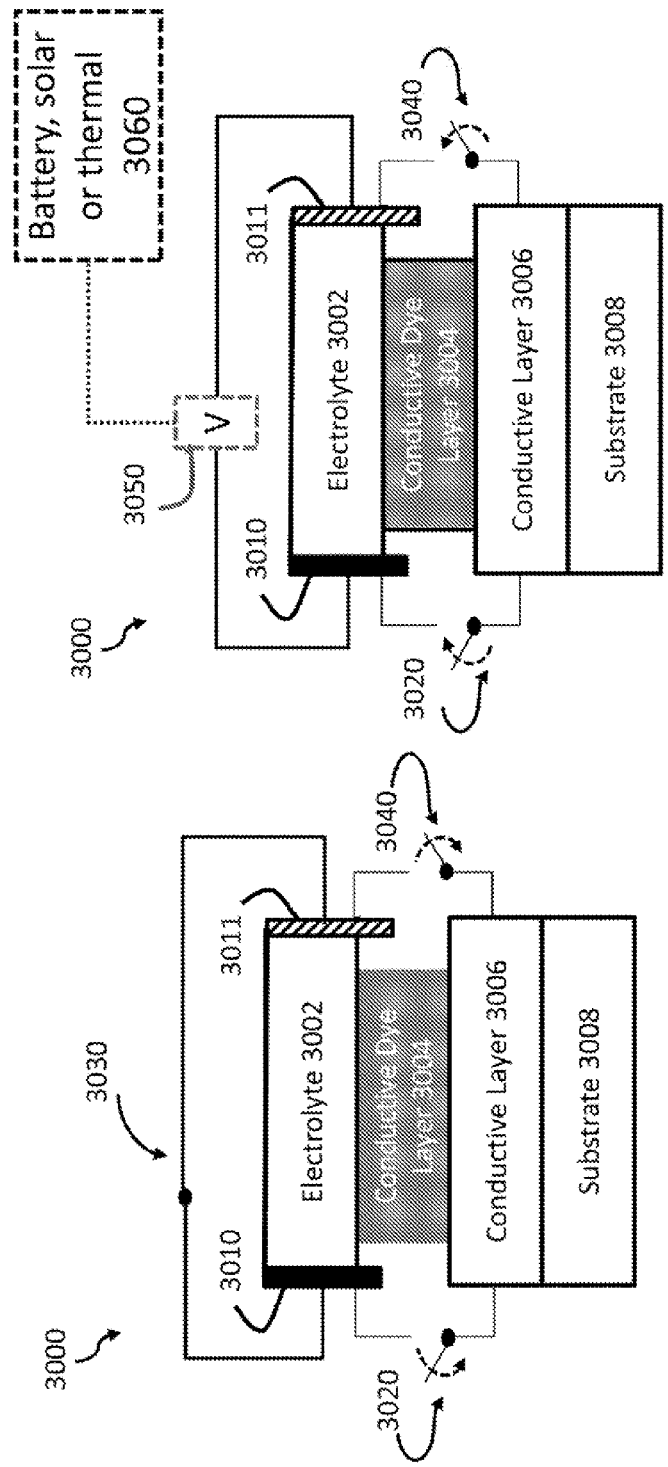

CO: cover; E: electrolyte; M1, M2: redox materials; A, B, C: switches; S: substrate; TC: transparent conductor; CL: chromatic layer Figure 3: Spectra of cell in initial blue state. Spectra of cell bleached and spectra of cell colored back to green state

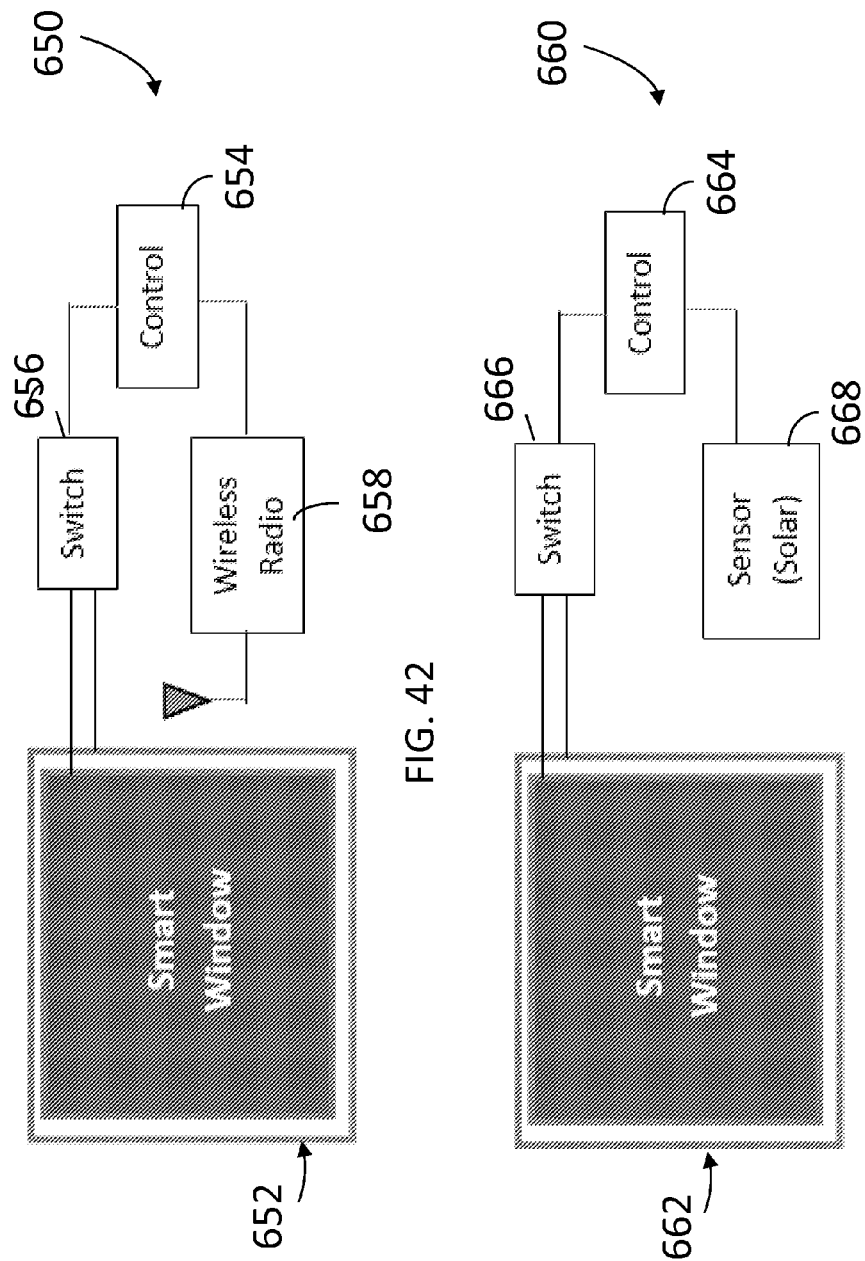

CHROMATIC SYSTEMS

CROSS-REFERENCE TO RELATED APPLICATION

This application claims priority from U.S. provisional patent application Ser. No. 61/880,166, entitled SEMI-ACTIVE CHROMATIC SYSTEMS, filed on 19 Sep. 2013; U.S. provisional patent application Ser. No. 61/941,462, entitled SEMI-ACTIVE CHROMATIC SYSTEMS, filed on 18 Feb. 2014; U.S. provisional patent application Ser. No. 61/947,410, entitled SEMI-ACTIVE CHROMATIC SYSTEMS, filed on 3 Mar. 2014; U.S. provisional patent application Ser. No. 61/980,011, entitled SEMI-ACTIVE CHROMATIC SYSTEMS, filed on 15 Apr. 2014; U.S. provisional patent application Ser. No. 61/986,047, entitled CHROMATIC SYSTEMS, filed on 29 Apr. 2014; and U.S. provisional patent application Ser. No. 62/007,378, entitled CHROMATIC SYSTEMS, filed on 3 Jun. 2014. The foregoing patent documents are hereby incorporated by reference in their entirety as if fully set forth herein, including text, figures, claims, tables, and computer program listing appendices (if present), and all other matter in the United States provisional patent applications.

FIELD OF THE INVENTION

This invention is related to the field of organic and inorganic materials that exhibit chromatic behavior under changes of surrounding conditions, such as redox phenomena, and devices made therefrom, where these devices exhibit a change in color or optical density (chromatic behavior). The chromatic behavior responds to state changes of various system components without externally applied electrical stimulus. The user control over the optical state of the device is exercised by a switch which connects or disconnects various device components. In particular, smart materials with optical, chemical, electrical, and/or mechanical properties may be controlled by varying connections between elements that augments these properties to allow for multifunctional material applications in consumer, industrial, architectural applications, and other related smart devices applications. Retrofitting existing devices using roll-to-roll fabrication and integration of energy storage devices with such smart materials is also disclosed. These properties open many applications in the area of smart glass, such as low cost active window systems for highly energy efficient glazing for use in architectural and transportation, smart optical filters, eyewear, displays, mirrors, etc.

BRIEF DESCRIPTION OF THE DRAWINGS

The drawing provided in the figures are illustrative of various embodiments. These are provided as examples for clarity of understanding. These drawings are not necessarily drawn to scale.

FIGS. 5-8 illustrate cross-sectional views of energy-efficient chromatic smart material structures in various states, according to example embodiments, when an electronic contact is not in electronic contact with a conductive layer.

FIGS. 13-14 illustrate flow diagrams for control methods for smart materials, according to example embodiments.

FIGS. 15-23 illustrate configurations of a conductive contact for application in a smart window structure, according to example embodiments, where the conductive contact may have grooves or is protected by a membranes with ionic size pores.

FIGS. 22-24 illustrate a smart window structure, according to example embodiments.

FIGS. 26-33 illustrate a chromatic structure incorporating two metals and compartments, a first metal for reduction of the chromatic layer and a second metal for oxidation, according to example embodiments.

FIG. 42 illustrates a smart material structure system incorporating a wireless control system, according to example embodiments.

FIG. 43 illustrates a smart material structure system incorporating a sensor-triggered automatic control system, according to example embodiments.

DETAILED DESCRIPTION OF EMBODIMENTS

Figure 1:
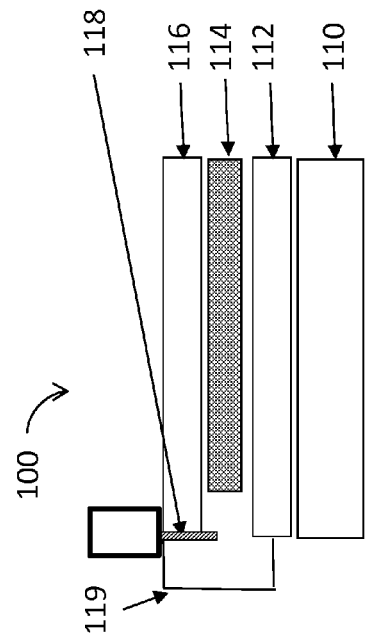
FIGS. 1-4 illustrate cross-sectional views of energy-efficient chromatic smart material structures in various states, according to example embodiments, when a conductive contact is in electronic contact with a conductive layer.

The present invention and various embodiments thereof presented herein relate to materials and structures, organic and/or inorganic, that exhibit chromatic behavior in response to environmental changes or state changes of the components of the system. In one embodiment, a structure is configured such that a reduction-oxidation (redox) reaction within the structure results in a change in the chromatic behavior of the structure; the change may be a change in the color and/or optical density of the structure, or specifically of the materials in the structure. The chromatic behavior responds to state changes of one or more of the various system components without the requirement to apply an external electrical stimulus.

Rather than an external electrical stimulus, a mechanical stimulus is used to change the state of components of the structure. A user controls the optical state, or the chromatic behavior, of the device by connecting or disconnecting multiple device components. In particular, smart materials with optical, chemical, electrical, and/or mechanical properties are controlled by varying connections between elements; such user control then augments the optical, or chromatic, properties to allow multifunctional material applications in consumer, industrial, architectural applications, and other related smart devices applications.

Retrofitting existing devices using roll-to-roll fabrication and integration of energy storage devices with such smart materials is also disclosed herein. The optical control capabilities achieve efficiencies and flexibilities of application in smart glass, such as low cost active window systems for highly energy efficient glazing for use in architectural and transportation, smart optical filters, eyewear, displays, mirrors, etc.

| Glossary | |
|---|---|
| chromatic behavior | Color(s) or optical response, parameter and/or behavior of a material, component or structure. |
| smart materials | material(s) having at least one property that may be controlled or changed by an external stimulus; smart materials may be used to build systems that change their optical, chemical, electrical, and/or mechanical properties in a controlled (active) or uncontrolled (passive) way. |
| smart structure | a structure that incorporates a smart material or acts as a smart material. A smart material or smart structure is generally considered a system or material having capability for sensing, actuating or controlling its behavior in response to a stimulus. The stimulus may be active or passive. |
| controlled or active smart material | a smart material responsive to active control of the least one property, such as an optical or chromatic behavior of the material or structure. Controlled smart materials are a class of smart materials including smart glass and smart window applications, such as photo-electro-chemical applications wherein the color of an electro-chromic element changes when an external stimulus is applied, e.g., an electric current. In such smart windows an electronic control is used to supply and regulate current flow from one element to another. |

| Glossary (continued) | |
|---|---|
| Uncontrolled or passive smart material | Smart materials responsive to passive control of the at least one property; in passive smart materials a property changes in response to change(s) in the surrounding environment. Parameters of passive smart materials may change in response to thermal, chemical, mechanical, or optical exposures. An example of a passive smart material is a chromatic glass having an optical transparency parameter that changes as a function of its environmental conditions, such as in response to a change in temperature, incident light, or optical radiation exposure. Eye glasses that transition when exposed to sunlight are made of passive smart materials; chromatic (photochromic) glass is used in the popular chromatic glasses that transition from transparent for indoor usage to shade or colored for outdoor use on exposure to sunlight. Other examples of passive smart materials are i) textiles and fabrics that change color in response to changes in incident light conditions; ii) a material that emits fluorescent color under ultra-violet radiation while in darkened environment; iii) material that changes color when in contact with a solvent, sometimes called a solvent-based material, such as used in a swimsuit that changes color when immersed in water. In a solvent-based swimsuit the color change of the material is dependent on the specific additives in the water, such as salt, chlorine and so forth; when these additives contact the solvent-based material of the swimsuit, the solvent-based material changes its color. |
| Smart window | a window made of a smart material or smart material structure. |
| electrochromic smart material system | a system that operates by application of an external voltage across the material to modify its properties. Electrochromic smart windows change color when voltage is applied and are transparent when voltage is removed or vice versa. There are variety of mechanisms for electrochromic smart windows, including binary solutions which have only two states (on/off or transparent/opaque) and those enabling varying states of transparency or color. Electrochromic windows are made of materials with electrochromic properties that change color or transparency when energized by an electrical current. Electrical energy initiates a chemical reaction which changes the properties of the material, such as to change how the material reflects and absorbs light, or to change the color of the material. |

Smart materials are particularly useful in development of windows, and colored or transparent structures. In general, smart materials are able to sense changes in the environment and respond by changing their properties. Smart materials continue to evolve as technology expands.

Passive smart materials are desirable due to their low cost, ease of integration, and reduced need for or elimination of an electrical power source. However, their applications are limited in the marketplace as users cannot adjust the material properties in a controlled way. For instance, users cannot choose to use their chromatic eyeglasses in a transparent mode in outdoor environment but will instead carry a regular clear pair of eyeglass to use outdoors if so desired. Similarly, the user cannot adjust or control the amount of transparency or the opacity of the material.

Some of these chromatic techniques and applications are triggered by the stimulus; some maintain the parameter state with or without continued application of the stimulus; some require continued application of the stimulus to maintain parameter state; some are reversible on removal of the stimulus. In one embodiment, the chromatic behavior of the material is based on changes of the electron states of molecules in the material, such as the pi- or d-electron states, the density of which depends on the external stimulus (or stimuli). That is, the material's chromatic state changes, such as changes in color or transparency, upon application of a stimulus, or stimuli; the material then reverts back to its initial state when the stimulus, or stimuli, is/are removed. These materials may be controlled actively or passively, wherein application of a stimulus results in chromatic changes in the materials.

In a reversible chromatic material, the chromatic behavior or parameter changes reversibly on application and removal of a stimulus. A default stimulus condition, such as an ambient condition of the environment, corresponds to a default parameter state of a smart material (parameter state). Changes of the stimulus condition result in changes in the parameter state. In one example, for a system having a stimulus of temperature and parameter of material color, a change in temperature condition results in a color change of the material. In a reversible chromatic material, when the stimulus condition returns to the ambient condition, the parameter state returns to the default state.

Material parameters may be optical, chromatic, transparency, and so forth. The passive smart material's parameter, such as its chromatic behavior, is a function of the stimulus. The parameter state change is triggered by the stimulus condition.

For example, consider a smart window application where while in an ambient environmental condition, the window is transparent, or has a first transparency state. The ambient environmental condition may be a condition within a range of values for temperature, air pressure, humidity, light condition, and so forth. In this case, the transparency of the window is a function of the intensity of the light incident on the window; the light intensity is the stimulus and the transparency is the material parameter. The parameter state is a function of the stimulus condition. In an ambient stimulus condition the parameter has a corresponding default state. As the light intensity changes, the window's transparency or color changes. These applications typically use a sun-sensitive material, wherein—the stimulus is light intensity or temperature.

Smart materials may be used in a wide variety of applications and purposes, including security, decoration, comfort, energy saving, and so forth. Other application examples may include fashion, cosmetics, optical memory, optical switches, thermo-chromics in paints, plastics and textiles, architecture, electro-chromics in car mirrors and smart windows, chemical and biological sensors, and so forth.

Today's electrochromic smart material systems operate by applying a voltage across the material to modify its properties. Electrochromic applications include rear view car mirrors that automatically darken in response to headlight intensity as received at the mirrors. Electrochromic materials are often able to reversibly change color when voltage is applied. Various types of materials and structures may be used to construct electrochromic devices, depending on the specific applications, such as smart material systems that utilize a variety of control means, including pressure control (piezochromic), solvent stimulus control (solvatochromic), such as addition of a liquid, or electron beam control (cathodochromic). These materials and applications typically require an electrical power source, as well as careful integration, to guarantee adequate performance without damaging the material. An example of a controlled material is the chromatic smart glass used in windows and architectural designs; users control the color and transparency of chromatic smart glass using an electrical switch. In some systems, the color change is persistent, meaning that once the color changes no further energy is required to maintain that color and energy need only be applied to effect another change. Electrochromic materials are often used to control the amount of light and heat allowed to pass through windows.

Windows using any of these smart materials to control the transparency or color of the window are smart windows. Some forms of this technology are used in automotive applications for automatic tint of mirrors under various lighting conditions. In other applications, trains use electrochromic glass panels between the passenger compartment and the driver's cabin to provide privacy and visibility options. The standard mode is clear, and may be switched by the driver to frosted/translucent, thus changing the view for the passenger. Recently this technology has been applied to windows in airplanes to allow passenger control of the window tinting from clear glass to shade to completely opaque.

Table 1 below lists chromatic phenomena based on various stimuli.

TABLE 1

| CONTROL TYPE | CONTROL MECHANISM | STIMULUS |
|---|---|---|
| Passive | Photochromism | Light |
| Passive | Thermochromism | Heat |
| Active | Gasochromism | gas - hydrogen/oxygen redox |
| Passive | Solvatochromism | solvent polarity |
| Passive | Halochromism | pH |
| Passive | Biochromism | interfacing with biological entity |
| Passive | Chronochromism | passage of time |
| Active | Electrochromism | electrical current |
| Active | Ionochromism | Ions |
| Active | Mechanochromism | mechanical actions |
| Active | Tribochromism | mechanical friction |
| Active | Piezochromism | mechanical pressure |
| Active | Cathodochromism | electron beam irradiation |
| Active | Radiochromism | ionising radiation |
| Active | Magnetochromism | magnetic field. |

One issue associated with current electrochromic smart windows is the requirement of an electric power source, which adds cost to the original build of the window, incurs a continuing recurring cost of electricity to the user, is subject to continuous electric power (does not work during power outages), are limited by the life of the electrical components and wiring required for operation.

The inventions described herein are novel materials and structures that extend the current research; these inventions provide additional approaches and applications for new smart material structures, which may be implemented as stand-alone structure, or may be combined to enhance electrochromic and other smart materials. The smart materials and structures presented herein enable user control without requiring wires connections, switches and electrical sources. The applications presented herein may incorporate various integrated elements, such as sensors, solar cells, and chromic devices. Windows fabricated from the present inventions may be easily retrofitted in buildings. Similarly, the present applications may enable transformation of use of existing windows and glass without wiring to electrical outlets and providing electric supply.

Note that existing electrochromic material may be reproduced using the conductive contact configuration and technique illustrated in FIGS. 1-4. An example of this type of passive structure is a conductive polymer selected to display desired transitions, such as shades of a given color, different colors, hues and so forth. In some embodiments, this layer is a polyaniline (PANI) polymer material. Several configurations are described herein.

Proximity and Switch Control:

The novel chromatic smart material structure 100 of various embodiments includes the components illustrated in FIG. 1. This structure does not require an external electrical power source to change the chromatic behavior of the structure, but rather uses a mechanical switch to enable electro-chemical changes in the structure. Specifically, in the embodiment illustrated, control of the reduction and oxidation of a portion of the structure corresponds to changes in the chromatic behavior.

Substrate 110 is a dielectric material that has transparency parameter and may be in a transparent, an opaque state, and various transition states there between. Examples of such a material are glass, plastic, or a flexible film, depending on the application. On the substrate 110, a transparent conductive film is applied, such as Indium Tin Oxide (ITO) to form conductive layer 112. The transparent conductive layer 112 acts as an electronic conductor allowing the free flow of electrons in one or more directions. The layer 112 may be a metallic material, a nano semiconductor, or a conductive metamaterial structures. Various combinations and configurations are possible to provide conductivity. In some embodiments the conductive layer 112 may not be transparent, but rather may exhibit other chromatic behaviors according to the application, such as having a color or tint.

A chromatic layer 114 is coupled to, in contact with or built upon, the conductive layer 112. The chromatic layer 114 may be an organic or inorganic material that exhibits chromatic behavior under changes in surrounding environments such as reduction-oxidation, or redox, reactions. As used herein, a chromatic material or structure changes its chromatic behavior or parameter in response to a stimulus, wherein changes in oxidation state result in changes in chromatic behavior or parameter.

Figure 2:
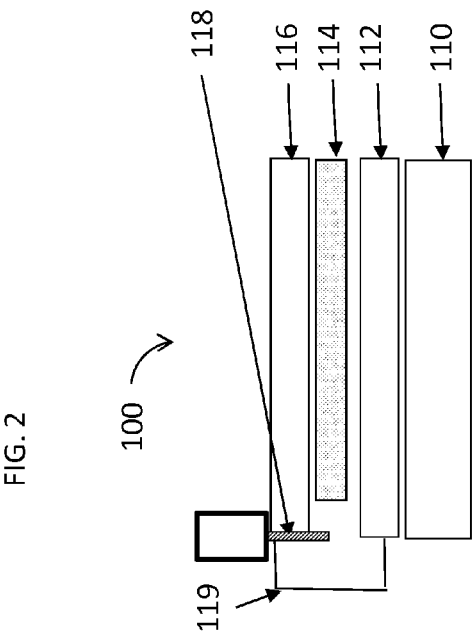
Figure 3:
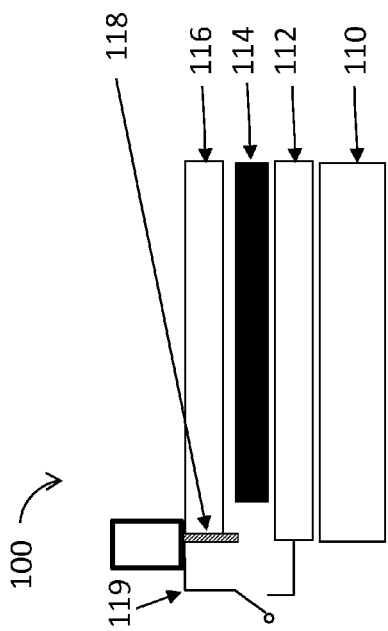
Figure 4:
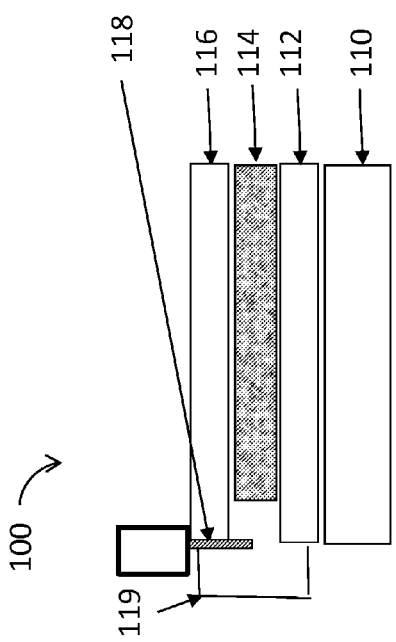
Figure 9:
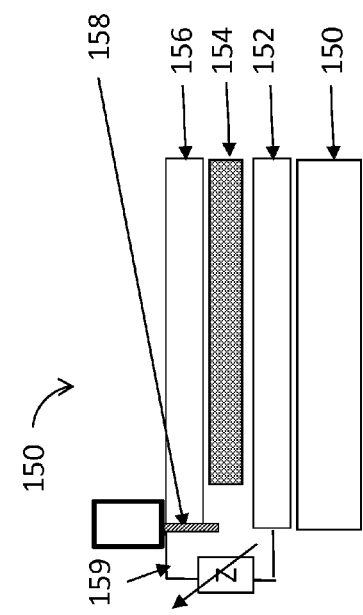
FIGS. 9-12 illustrate chromatic states when a passive or active tunable impedance is present

An electrolyte layer 116 is positioned in contact with the chromatic layer 114. The electrolyte may be an acid solution with ions participating in the transition between different colors, such as a colorless PANI LE (leucoemeraldine, fully-reduced state); green PANI ES (emeraldine salt, half-oxidized and conductive state), blue PANI EB (emeraldine base, half-oxidized state), or between color(s) and clear transparent states upon connection of a conductive contact 118. The conductive contact 118 provides an electrical stimulus by coupling the electrolyte layer 116 to the conductive layer 112, and therefore is referred to herein as a conductive or electronic contact; however, the system 100 uses a mechanical coupling to effect the change in transparency of the chromatic layer 114 without application of an external electrical power source as in conventional electrochromic structures. The reaction is triggered by the coupling of the conductive layer 112 to the electrolyte layer 116, which initiates a redox process in the chromatic layer 114. While the switch 119 as illustrated in FIG. 1 is a mechanical switch, alternate embodiments may employ an electrical switch, however, an external electrical power source is not required for the redox reactions of chromatic layer 114. The conductive contact 118 may be any of a variety of metals, and is used as a stimulus to drive the reaction, reduction or oxidation, within the smart material structure 100. The redox reactions are initiated when the conductive contact 118 is placed in contact with the electrolyte layer 116 via switch 119. This means that PANI is reduced when indirectly or directly coupled between the electrolyte layer 116 and the conductive layer 112. This occurs as the result of a spontaneous redox reaction, given that the metal contact 118 has a standard reduction potential that is higher than the PANI reduction potential. FIGS. 2-4 illustrate changes in the chromatic behavior or parameter state of the chromatic layer 114 with changes in the proximity of the conductive contact 118 and the conductive layer 112. The electrolyte layer acts as an ionic transport or storage during the chromatic transition or redox reactions.

A similar embodiment is provided in FIG. 26, where a second, separate conductive contact 3011, where the difference in potential with respect to metal 3010 is analogous to the difference in PANI oxidation and reduction potentials, may be used to re-oxidize the PANI back to its colored state by connecting it to the conductive layer as illustrated in FIGS. 26-33. Furthermore, re-plating a second conductive contact 3011 occurs when both contacts 3010 and 3011 are disconnected from conductive layer and connected to each other (FIG. 32), as described hereinbelow.

The phenomena illustrated herein may be analyzed as in a similar analysis of metal corrosion, galvanic cell, energy storage cell, or a combination of them. For instance, a galvanic cell is an electrochemical cell that derives electrical energy from spontaneous redox reactions taking place within the cell. The redox reaction takes place spontaneously to produce electricity where chemical energy is transformed to electrical energy that reduces (or oxidizes) the chromatic layer. A galvanic cell, also referred to as a voltaic cell, includes different metals connected by a salt bridge, or individual half-cells separated by a porous membrane. The reverse phenomena may use solar energy to convert to electrical/chemical energy that oxidizes (or reduces) the chromatic layer. In some examples, solar radiation may recondition the one of more oxidizers present in the electrolyte to keep it effective during the reverse process by using electrolyte composites that includes catalyst agents. Another example, is converting solar energy to electrical energy that will apply a voltage to the structure during the reverse process. These techniques and applications incorporate chemical processes without incurring an external electrical structure.

Returning to the illustrations of FIGS. 1-8, cross-sectional views of a smart material structure, according to various embodiments of the present inventions, illustrate configurations that enable control of the chromatic behavior of at least one layer of the smart structure 100. The structure 100 of FIG. 1 is configured to provide an energy-efficient chromatic smart material structure. In this example, the stimulus 118 is a conductive contact (herein also referred to as a conductive contact) that is connected to a conductive layer 112 via connector (or switch) 119, and is disconnected from the conductive layer 112 by moving connector 119 to a different position. The structure 100 is built on a substrate layer 110, which in the present example is a transparent glass material. The chromatic layer 114 is positioned to contact the conductive layer 112. Alternate embodiments may incorporate alternate couplings, such as where the chromatic layer 114 is a different size than the conductive layer 112. In one embodiment the chromatic layer 114 has a larger surface area than the conductive layer 112, and in another embodiment, the chromatic layer 114 has a smaller surface area than the conductive layer 112.

FIGS. 1-4 illustrate cross-sectional views of the chromatic smart structure 100 in various states of control. The first default state is illustrated in FIG. 1, where the conductive contact 118 is isolated from the conductive layer 112; in this default state the chromatic layer 114 is a first color or level of transparency. FIGS. 2-4 illustrate changes in the chromatic layer 114 over time after the contact 118 is coupled to the conductive layer 112 through switch 119. FIG. 2 illustrates the initial change in the chromatic layer 114 just after closing switch 119. As illustrated, the color of the chromatic layer 114 begins to change. As time continues, the color of the chromatic layer 114 continue to change, as in FIG. 3, to a final color in FIG. 4. In alternate embodiments, the transparency or other chromatic behavior or parameter of the chromatic layer 114 changes. Similarly, the chromatic change experienced may be a binary change, such as from transparent to opaque.

The conductive contact 118 is a conducting element, such as a metal element; the conductive contact 118 is not connected to an electrical energy source. Application of the conductive contact 118 as a stimulus for chromatic change in the structure 100 may take be done in a variety of ways, where the resultant change is evidenced in the chromatic layer 114. As illustrated in one embodiment, positioning the switch 119 such that the conductive contact 118 is in contact with the conductive layer 112, the chromatic layer 114 transitions from a first color (FIG. 1) to a bleached, colorless state (FIG. 4) through multiple color-varied stages. The time of transition through the colors is determined by the structure dimensions, materials and configuration.

In FIG. 1, the default condition of the structure 100 has the switch 119 is in an open position and the chromatic layer 114 in a colored state, where the chromatic layer 114 is in an oxidized state (a first redox state). In FIG. 2, the switch 119 is closed and the conductive contact 118 couples the electrolyte layer 116 and the conductive layer 112. In this configuration, the chromatic layer 114 starts transitioning to a reduced state (a second redox state), exhibiting a changed chromic parameter; specifically, chromatic layer 114 begins to change color and toward a clear condition. In FIG. 3 there is no further change in the position of the switch 119 or conductive contact 118; over time the chromatic layer 114 continues to change color toward a clear condition. FIG. 4 illustrates the structure 100 at a later point in time, when the chromatic layer 114 has reached a stable reduced state. The FIGS. 1-4 are provided to illustrate the process over time.

A reverse process is illustrated in FIGS. 5-8 where the switch 119 is opened to isolate conductive contact 118 from conductive layer. The chromatic layer 114 transitions back to a default state over time after opening switch 119.

The following is a brief description of some of the materials that may be used for the various layers of the smart material structure 100 as illustrated in FIG. 1. The embodiments provided herein are examples of chromatic systems that may be built to achieve the low energy smart devices and control systems; other alternate embodiments may be built using other materials and structures which enable changes in properties of a smart material by physical contact therewith.

The connection mechanism 119 may be manually controlled through a mechanical switch or using an electronic low-power switch; the switch may be controlled wirelessly. The switch 119 is used to make a connection between the electrolyte layer 116, the metal contact 118 and the conductive layer 112, and a variety of connections methods may be used.

Although FIGS. 1-8 illustrate the structure 100 as having a single connection between the metal electrode 118 and conductive layer 112, multiple connections may be used to scale the size of the structure to larger areas. For example, there may be multiple metal electrodes, multiple switches and various configurations thereof. Also, bus bars may be implemented around the perimeter of the structure 100 to increase the contact with conductive layer 112, thus spreading the driving stimulus more uniformly throughout or along conductive layer 112.

Various embodiments of the present inventions may be configured using the structure illustrated in FIGS. 1-8. FIG. 1 illustrates an energy-efficient chromatic smart material structure in a default state, i.e., before applying a stimulus. In some embodiments of FIGS. 1-8, the conductive contact 118 is a metal element used as a stimulus by positioning to connect and disconnect with conductive layer 112 via connector (switch) 119. The substrate layer 110 is a transparent glass material. A conductive layer 112 is then configured on the substrate layer 110 and a chromatic layer 114 on the conductive layer 112. Alternate embodiments may include additional layers not shown in the FIGS. 1-8. These additional layers may be configured between and/or around the layers of FIG. 1, and may be specific to the application, use and/or requirements of various embodiments.

FIGS. 1-4 illustrate the chromatic smart material structure 100 as it transitions over time according to example embodiments; the structure 100 is not connected to an external electrical energy source or external power source. In this way, the structure 100 is a stand-alone application of a chromatic system. The ability to implement chromatic control without a power source is revolutionary in the smart material, and smart window specifically, market.

On application of the conductive contact 118 in electronic contact with the conductive layer 112, a redox reaction occurs in chromatic layer 114 resulting in the chromatic behavior change. The conductive contact 118 forms an electronic contact which enables the transfer of free electrons. This is the connection made between the metal electrode, conductive contact 118, and the conductive layer 112. Note there is also an electrical connection between the electrolyte layer 116 and the conductive contact 118 which allows the transfer of ions between electrolyte and metal materials. These connections are all conductive connections.

During a redox reaction the oxidation state of atoms changes or move from one element to another. Oxidation is the loss of electrons and increase in oxidation state, whereas reduction is a gain of electrons or decrease in oxidation state. The change in oxidation state of the chromatic layer 114 has a corresponding change in chromatic behavior, such as a change in color or transparency. The following discussion describes the various components of structure 100 according to some example embodiments.

Substrate Layer 110

In the embodiments presented herein, the substrate layer 110 is a transparent dielectric material, such as glass. A smart material with a glass substrate may be used to build a smart window. There are other applications for the present inventions, such as to control and filter light, and for heat reception and application. The substrate layer 110 in some embodiments may not be a transparent material, but rather may be a material that is sensitive to light, wherein the structure 100 is designed to control the light energy reaching the substrate layer 110. Examples include materials having colors that bleach with sunlight, art work that is damaged by sunlight, chemical processes that require constant light control, and so forth.

Substrate 110 may be one or more of a variety of structures, materials, devices that define a support layer upon which the chromatic structure(s) is placed, built or otherwise brought proximate. The substrate may be the pure base material or may be a composite of metal oxides or metals with the pure base material. The glass, plastic, polymer, textile or other base material may include composites of metal oxide during fabrication. The substrate as described herein is an object of the chromatic control, such as the glass of a window. In other applications, the substrate may be a support structure, or a filter structure that is designed for purposes of the application.

In some embodiments, the substrate 110 is a transparent material, such as glass; in other applications the substrate layer may have a color, wherein the smart structure transitions between two or more color states. The conductive layer in such applications is selected according to the use, wherein it may be a transparent or colored material.

The substrate 110 may include one or any number of glass materials, such as oxide-based glasses (silicas, borosilicates, etc), plastics/textiles such as polyethylene, polycarbonates, or clear vinyl materials, and so forth. The substrate 110 may also be a composite of the above listed materials in combination with other materials, such as additional metal oxides or metals that may be surface coated or directly impregnated into substrate 110 during manufacturing.

The substrate 110 may be a rigid, flat material such as silica glass or a flexible material that may be curved or bent into a desired shape such as any flexible polymer. There are a variety of applications for the smart window structures and the substrate is not limited in material, structure, composition, shape and so forth. For example, the smart window application may be used for automotive windows, mobile device display, bottles, optical or reading glasses, tables, architectural windows, commercial building windows, airplane windows, television displays, as well as medical devices and other applications wherein small geometries are desired. For large area devices, such as windows for automobiles or architectural windows, if glass is used as a substrate, it may be desired to use a tempered glass to be able to withstand the thermal variations, particularly when the optical properties are controlled by changing the absorption of the solar radiation by a chromatic layer. For some applications the glass thickness is approximately 2 mm to 4.2 mm. For hand-held mobile devices, if thin glass is used (typical thickness less than about 1.2 mm), it may be desired to chemically strengthen the material (e.g., Gorilla Glass® from, Corning, Corning, N.Y.).

In some embodiments, more than one type of control mechanism may be incorporated for control of the smart window. Alternate structures and techniques, such as those detailed in Table 1, may be used to enhance or complement alternate control of the smart structure, similar to structure 100. A combination of these mechanisms may be used to achieve design goals, such as stability, robust operation, efficiency, convenience and so forth. Embodiments may be built on a substrate having other properties and controls, including optical, thermal and electrical controls. While these types of control do not currently offer the benefits or cost savings of the present chromatic systems described herein, which operate manually and without electrical source, there may be synergies in some environments and use cases. For example, in an optically controlled window structure that darkens with incident light the incorporation of the smart window structure described herein allows additional control such as to enhance the function and capability of the optically controlled window on sunny or rainy days or to improve the performance. For this purpose the substrate may have photochromic properties or have an additional photochromic coating. In one embodiment, the optically controlled window may be transparent in the evening; the smart window structure allows the windows to be darkened on conditions that the passive control does not enable.

As the substrate layer provides a supporting layer for the structure, and upon which the dynamic layer(s) are built, there are considerations for materials used for this layer. Some structures employ multiple layers for the substrate. Some structures may include intervening layer(s) between a base substrate layer and the other components of the structure, such as the chromatic layer (herein referred to as an active layer or layers).

In some embodiments, the substrate layer may be a glass, plastic, textile, or other base material (onto which a conductive layer and/or a chromatic layer is deposited); the substrate may be built using a pure base material or may be a composite of metal oxides or metals with the pure base material.

These substrates may be transparent or colored. The color of the complete device is modified by the color of the substrate and the color of the active layer in relation to a complementary electrode.

Conductive Layer 112

The conductive layer 112 in some embodiments is a transparent conductive layer used to enable the operation and performance of the smart material structure 100 while maintaining visibility to the transparent substrate 110. It provides a path for the electrons in the redox reaction. In some example embodiments, the conductive layer 112 is formed using TEC™ glass, a trademark of Nippon Sheet Glass (NSG), Tokyo, Japan. The conductive layer 112 may comprise an Indium Tin Oxide (ITO) layer. TEC glass is a glass having an anti-iridescent layer deposition in combination with a transparent conductive layer. Various ITO materials and structure have been used in applications from transparent flexible electronics to energy conversion and storage. The flexibility of the conductive layer 112 is desired in some applications to expand the applicability of the smart material structure 100, such as for use in a foldable, or bendable mobile device. Some applications may desire a rigid, less flexible solution. In a flexible device the substrate is not rigid but may be formed into other shapes and positions. This specifies that the layers above the substrate to be similarly flexible or malleable.

The conductive layer 112 may include conductive polymers or composites of conductive polymers that will transition to transparent clear states when a conductive component (a metal element) is connected to the conductive layer 112. For a redox reaction in the chromatic layer 114, electrons move between the electrolyte layer 116 and the chromatic layer 114 by way of the conductive contact 118, the connector 119 and the conductive layer 112. In an example embodiment, the clear, transparent state is defined as the state in which any part of the UV-visible spectrum has higher than a 30% transmittance, and preferably greater than 50%. Conducting polymers may include polyaniline, polypyrrole, Poly (3,4-ethylenedioxythiophene) or PEDOT, and so forth. Further, conducting polymers may include an insulating polymer loaded with conductive particles such as polyethylene impregnated with carbon black or any other conductive particles.

The conductive chromatic layer 114 may be applied on top of the substrate containing the transparent conductive layer 112 or it may serve as the transparent conductive layer itself. Ordinary glass may be coated with a conductive chromatic layer directly without the need of a transparent conductive layer, as long as the conductive layer remains an electrical conductor in all states. In this case, the chromatic layer is also sufficiently conductive to allow electron movement. In some embodiments, the substrate layer is conductive and no separate conductive layer is incorporated. A variety of combinations may be built using various materials that support the redox reactions required to change the optical or chromatic behavior of the chromatic layer. Such conditions may be applicable to the embodiments described herein depending on application and configuration.

Chromatic Layer 114

In some example embodiments, the chromatic layer 114 is formed using a conductive polymer, such as an organic conjugated polymer, which acts as a semiconductor. These same conjugated polymers become metallic upon heavy doping. When doped, conjugated polymers become conductive because of the mobile charge carriers injected in the polymeric backbone during such process. Doping may be achieved by a reaction with an oxidant (to remove electrons) or reductant (to introduce electrons). Examples of conjugated conducting polymers are polythiophene, polyaniline and polypyrrole. In one example of the smart structures illustrated in FIGS. 1-8, the chromatic layer 114 is a polyaniline layer.

The conductive layer 112 provides a path to the electrons necessary to the reactions in chromatic layer 114. The conductive and chromatic layers, 112, 114, act as a cathode (or anode) after closing the circuit with 119, where the complimentary conductive contact (metal) 118 which acts as anode (or cathode) and induces a charge in the film without external power.

Other factors that affect the chromatic properties include, but are not limited to, contrast, color range, transparency. Similarly, the chromatic layer material and configuration that determine and impact transition speed(s) may include, but are not limited to: i) concentration of electrolyte, and other additive components and composites such as oxidizers and/or catalyst agents; ii) material used for conductive layer 112; iii) material used for chromatic layer 114; iv) thickness of the conductive layer 112; v) thickness of the chromatic layer 114; vi) conductivity in the chromatic layer 114; vii) type of metal in the conductive contact 118; viii) structure and configuration of the conductive contact 118 within the smart material structure 100; ix) application method of the conductive contact 118; x) deposition or growth method of the chromatic layer 114 on the conductive layer 112 (see discussion herein); xi) methods to bind conductive chromatic layer material to conductive layer; xii) methods to make an electrolyte for the electrolyte layer 116; xiii) variation in temperature or heat; and xiv) presence of a second metal for energy storage to re-balance the structure during redox process.

Figure 34:
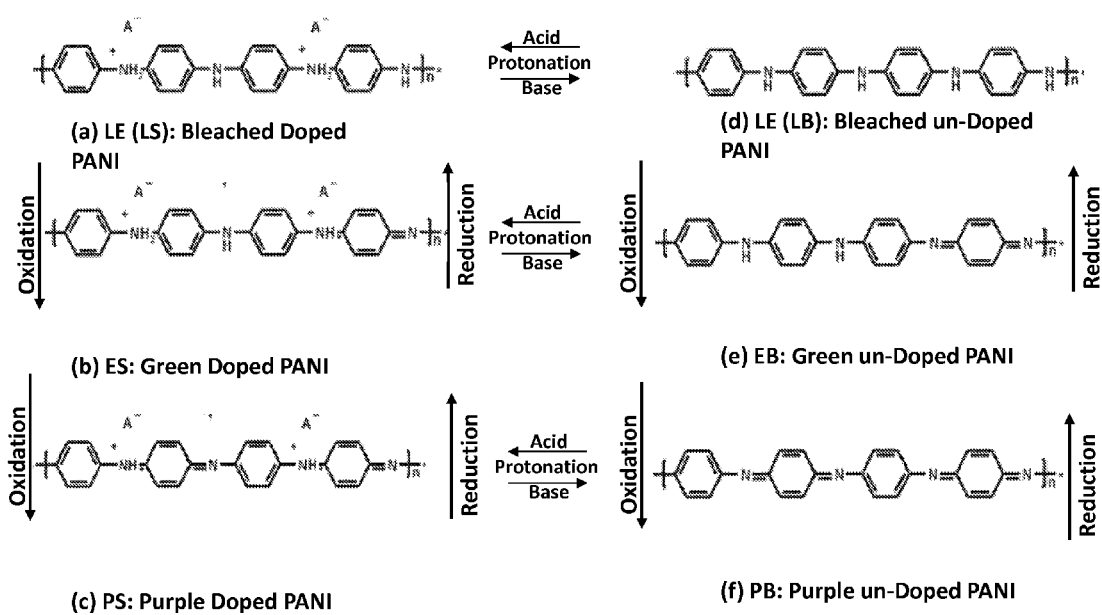
FIG. 34 illustrates various states of Polyaniline for application in smart material structures, according to various embodiments.

In some embodiments, the chromatic layer 114 incorporates a polyaniline or PANI material. The structure 100 is in a balanced stable state with switch 119 open; in the structure's stable state, the chromatic layer 114 is a green color. This is a first oxidation state of the chromatic layer 114; the chromatic layer 114 is oxidized and conductive, as illustrated in FIG. 1 and FIG. 8. When switch 119 is closed, the conductive contact 118 makes electrical contact to the conductive layer 112; this results in a reduction process within the PANI material of chromatic layer 114, inducing a transition in the chromatic layer 114 to a colorless PANI leucoemeraldine state (LE), as illustrated in FIG. 4 and FIG. 5. When the switch 119 is opened, PANI of the chromic layer 114 is re-oxidized and returns to its green state. If the oxidation process is allowed to proceed even further, the PANI will reach a higher oxidation PG state that has a purple/black color. FIG. 34 illustrates the various states of Polyaniline.

In some embodiments, the chromatic layer 114 may include conductive polymers or composites of conductive polymers that will transition to clear when a complementary electrode is connected to the conductive layer. Conducting polymers may include any of the inherently conducting polymers such as polyaniline, polypyrrole, PEDOT, and so forth.

The chromatic layer may be applied to a surface of the substrate containing a transparent conductive layer or it may serve as a transparent conductive layer itself. For example, ITO glass may be applied with a layer of a conductive chromatic layer, such as polyaniline in the former example; in the latter example, ordinary glass may be coated with a layer of conductive chromatic layer directly without the need of a transparent conductive layer such as ITO. The chromatic layer 114 may include composites of a transparent conductive polymer that will transition to a colored or clear state upon contact with a metal. In all these embodiments, the structure supports the chemical reactions, such as redox reactions, that result in chromatic behavior change(s).

The conductive chromatic layers may include metal oxides such as $WO_3$, $NiO$, $SnO_2$, $V_2O_5$, etc., coated by themselves or impregnated into a conductive polymer matrix. Alternatively, the conductive polymer composites may include any other compound that may easily undergo a reversible color change (or transparency change or shade change) upon oxidation/reduction (redox) processes. These may include other conducting polymers or engineered colored nanoparticles such as gold nanoparticles that are added to the chromatic layer.

Additionally, this may include inherently conductive polymers engineered to be transparent, such as leucoemeraldine polyaniline, or a composite of such a material with other material types and structures discussed herein. The chromatic layer 114 may also be an oligomer of the conducting polymer and composites of those oligomers with various composite materials, such as those listed herein. These composites, and/or the pure chromatic material without any additives, allow for the transition from color-to-color, opaque-to-transparent, or combinations thereof. Alternate materials that may be included in the layers of a chromatic structure include polymer electrolytes, or polyelectrolytes.

The present embodiments incorporate a PANI material for the chromatic layer 114. PANI materials may be "switched" by the addition of acids and bases that protonate and deprotonate the base sites within the polymer. This leads to the dependence of the polymer states, and thus the reactions, on the pH of the solutions, producing chromatic changes. The chemical properties of PANI are varied and may be controlled by application of a potential and/or an acid or base. Not only do the conductivity and chemical properties of PANI change, but the color of the polymer also changes between each of these states. These changes in PANI enable the redox reactions to bring about chromatic changes.

In the presence of an acid or base the properties of PANI change and may transition between various states, vary the chemical properties, and/or change color between states. These chromatic changes in PANI make it useable for control of windows, display devices, and in a wide range of applications. The smart material structure 100 of FIG. 1 the configuration of the electrolyte layer 116 to connect with or isolate from the chromatic layer 114 enables the conductive contact 118 to drive the redox reactions of the chromatic layer 114.

The color of thin films of conducting polymer nanofibers may vary from red chloride doped polythiophene, green perchloric acid doped polyaniline, blue dedoped polyaniline, and so forth. When exposed to either base or acid vapors, these films dedope (blue) or further dope (green), respectively.

Polymer nanocomposites built by incorporating metallic or semiconductive nanomaterials may further enhance the performance of the smart material by leveraging some of its passive electromagnetic properties. For instance, by using metamaterial structures an effective negative index of refraction may be achieved that may further diffuse, reflect, or absorb incident light in a controlled way. Such behavior may be also triggered without requiring any external electrical power. It may purely be based on near-field manipulation by adjacent objects.

The chromatic layer 114 may include composites of colored conductive polymers that transition to clear, or substantially clear, when a complementary electrode is connected to the conductive layer. Similarly, these composites may be used to transition from one color to another. Additionally, the change in transparency may be classified broadly as a change in optical characteristics, such as a change in optical density, opacity, reflectivity, and so forth. The chromatic layer may also include metal oxides to further enhance the color, transition speed, stability, and durability of the structure over multiple oxidation and reduction cycles.

In the case of a PANI material used for the chromatic layer, its wide range of redox reaction potentials, dependency on pH level in basic and protonated versions, and utilization in metal anodic protection against corrosion during oxidation make it attractive to use in the chromatic structure. In general, PANI, Polypyrrole, Polythiophene may be used in the chromatic material, while carbon steel, stainless steel, aluminum, magnesium, zinc and copper are possible metals. A consideration in selecting material and structure of the various components of a smart structure (chromatic layer, metals for conductive contacts, conductors and electrolytes combination) is to balance the redox potential (both oxidation and reduction) at a desired pH level, similarly it is desirable to minimize metal corrosion and electrolyte contamination.

As illustrated in FIG. 34, PANI may exist in three salt oxidation states (a) clear Leucoemeraldine Salt (LS), (b) green Emeraldine Salt (ES), and dark-blue to purple Pernigraniline Salt (PS) states. Transition between these three states is possible through reduction or oxidation. As illustrated in FIG. 34, PANI may also exist in three base oxidation states (a) clear Leucoemeraldine Base (LB), (b) blue Emeraldine Base (EB), and dark-blue to purple Pernigraniline Base (PB) states. Transition between these three base states is possible through reduction or oxidation. Transitions between the salt and base states are accomplished by proton exchange reactions.

In fact, reduction of PANI from ES to LE states (with oxidation of steel) has been observed in anodic protection of metal against corrosion given the presence of balancing anions in the structure. Since PANI in an ES state is conductive and electroactive, it may shift the cathodic reaction interface from the conductive layer on the substrate to the PANI surface by reducing PANI from ES to LS states followed by re-oxidation when the connection between the metal and the conductive layer is removed (FIG. 8). Balancing the pH level is also important, as high pH levels affect corrosion and passivation of metal, as well as PANI redox reactions. Once PANI is reduced to the LE state (FIG. 4), it is no longer conductive, and therefore the electrochemical activities are effective at the beginning when the metal is connected to the conductive layer of the substrate (FIGS. 2-3).

In addition to the potential and pH balance, a careful analysis of the ionic balance is necessary as PANI in its ES state requires the presence of counter ions generated during redox processes. In some embodiments, counter ions are not only balanced during oxidation and reduction but also when the structure is cycled multiple times (cycle refers to reduction followed by re-oxidation); the counter ionic presence in the structure is not accumulated but rather balanced between the reduction and re-oxidation processes, such as adding another metal (see the example embodiment illustrated in FIGS. 26-33) or multiple electrolyte compartments (not shown).

The chromatic layer 114 may also be an inorganic material, such as those used in electrochromic devices. These may also be a mixture of several metal oxides, such as $WO_3$, NiO, $IrO_2$, $V_2O_5$, and others based on tin oxide and their combinations.

Electrolyte Layer 116

In general, an electrolyte is a solution or gel containing ions which form an electrically conductive medium; strong electrolytes are highly efficient conductors and weak electrolytes have smaller capacity to conduct ions, i.e. support smaller ionic flow through the electrolytic material. The electrical conductivity of the electrolyte layer 116 therefore may depend on the type of solvent, acid, and/or their concentrations. This conductivity characteristic determines the electrostatic interaction between ions, which therein effects its transport across the electrolyte.

The electrolyte layer may incorporate a protic acid (e.g. HCL, $H_2SO_4$, $HNO_3$, acetic acid) or base (e.g. $NH_4OH$). Alternatively, the electrolyte may comprise polymeric acids or bases such as polystyrenesulfonic acid, poly (2acrylamido2methyl1-1propane sulfonic acid). The electrolyte may also be non-aqueous or aprotic.

The electrolyte may include additional chemicals which may accelerate or decelerate the rate at which the conductive chromatic layer changes color. These additive chemicals may include oxidants such as ammonium persulfate (APS) or reductants such as hydrazine or ascorbic acid or any combination of the two. In some embodiments, the concentration of the additive in the solution may vary from 0.0001 M to 1 M.

The electrolyte typically contains different salt concentrations and compositions. For example, an electrolyte may be made in an aqueous solution of HCl containing a concentration of HCl ranging from 0.001 M to 5 M. It may also contain a salt in addition to the acid or in lieu of the acid, such as NaCl, $LiPF_6$, $liCLO_4$, $LiCF_3SO_3$ etc. or any combination of these salts. Alternatively, this electrolyte may be prepared in an organic solvent or in a polymer matrix containing salts (for example polyethylene oxide containing lithium salts).

Common electrolytes, in various applications, may include a variety of salts dissolved in an aqueous or non-aqueous medium. The use of a liquid requires an additional layer (not shown) to encapsulate this material. Such additional layer may be a glass layer or another transparent layer. This additional layer will be determined by the specific application and use characteristics and behavior desired in the smart material structure.

The chromatic layer 114 may allow detection of acids and bases whereby the chromatic layer reacts with the acid/base to cause a color change. The chromatic system may then be applied for testing and acid/base determination of a solution or substance. For example, when doped polyaniline comes into contact with a base (NaOH, NH$_4$OH, etc) it changes color from green to blue. When it comes into contact with an acid it undergoes the opposite color change i.e. blue to green.

The chromatic layer material may also be used as a visual sensor to detect analytes that are strongly reducing or oxidizing agents. For example, ammonium (APS) may change the color of the polyaniline chromatic material from green to purple and reducing agents such as hydrazine or ascorbic acid may change the color of polyaniline to clear. These analytes may also be electron-deficient or electron-rich chemical species which also affects the chromatic material in a similar manner as oxidizing and reducing agents.

Some embodiments may include additional composites in the electrolyte layer to accelerate or slow down the transition speed. Some embodiments include additional composites to change the color of the chromatic layer. Composites of the electrolyte may also include catalyst agents to use solar energy for reconditioning the oxidizing elements that may be used during the re-oxidation (or reduction) reactions.

Figure 10:
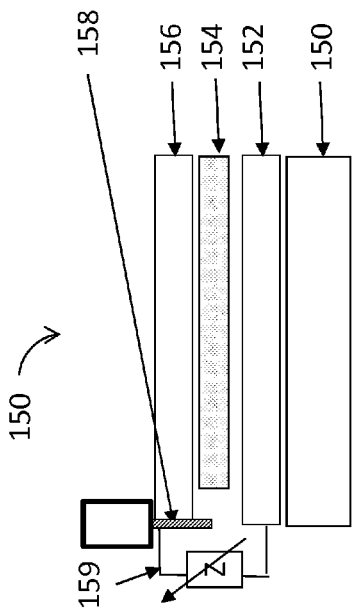
Figure 11:
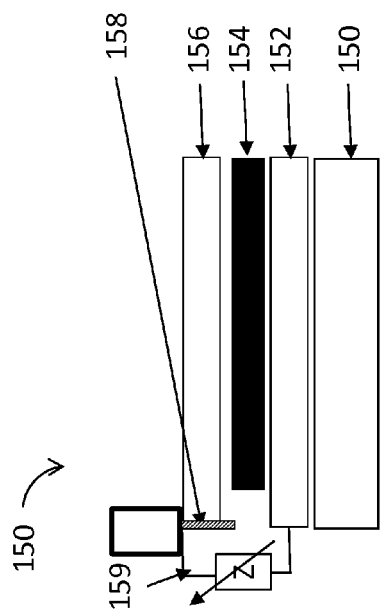
Figure 12:
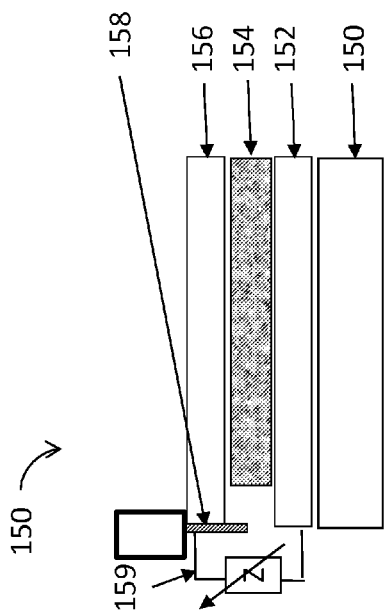

Variable Impedance Control:

An embodiment smart structure 150 is illustrated in FIGS. 9-12 having variable impedance controller 159 to adjust the level of colored and transparent states without an electrical source. The structure 150 is similar to that of structure 100, but with the variable impedance controller 159 replacing the switch 119. The use of the impedance controller 159 enables control of the connection of the conductive contact 158 and the conductive layer 152. Smart structure 150 does not require the conductive contact to be repositioned with respect to the conductive layer 152. By reducing the effective impedance through the variable impedance controller 159, the strength of the contact or coupling between the conductive contact 158 and the conductive layer 152 is increased and the resultant change in color and/or transparency of the chromatic layer 154 is achieved. The structure 150 enables continuous control of the redox reaction of the chromatic layer 154. There are a variety of mechanisms which may be used to control the conductivity between conductive layer 152 and conductive contact 158. FIGS. 10-12 illustrate various conditions of the variable impedance controller 159 and the resultant behavior of the chromatic layer 154.

FIG. 13 illustrates a method 200 for using the smart material structures described hereinabove, wherein a default configuration is provided having a conductive contact is in a first position with respect to the conductive and chromatic layers, 210. The system detects a first condition, 212, which may be a temperature condition, a measure of incident light, or other measure. When the first condition is in a first range of values, 214, the conductive contact is repositioned to a second position, 216. The repositioning will place the conductive contact in contact with the smart material structure layers. Such method may be used as a binary device, having two states, such as clear and opaque. In some embodiments the control mechanism enables the user to make a binary decision. Still other embodiments enable, either by the user or automatically, a continuous refinement and change in position of the conductive contact. Alternatively, a purely mechanical device, such as a knob, that gradually deepens the conductive contact depending on user's desire.

FIG. 14 illustrates an alternate method where the system may enable additional states and conditions. This method continues after either step 216 of FIG. 13 and determines if a second condition is reached, 220. If a second condition is reached, the process repositions the conductive contact accordingly, such as to a second position, 222.

There are a variety of configurations for implementation of such smart material structures in applications. Some of these are described hereinbelow.

Mechanical Control:

In another embodiment, a variable resistor can be connected in series between a conductive contact, such as contact 118 of FIG. 1, and a conductive layer, such as layer 112 of FIG. 1, as a means of controlling the degree of transition and the color change induced in the chromatic layer, such as chromatic layer 114 of FIG. 1.

Figure 17:
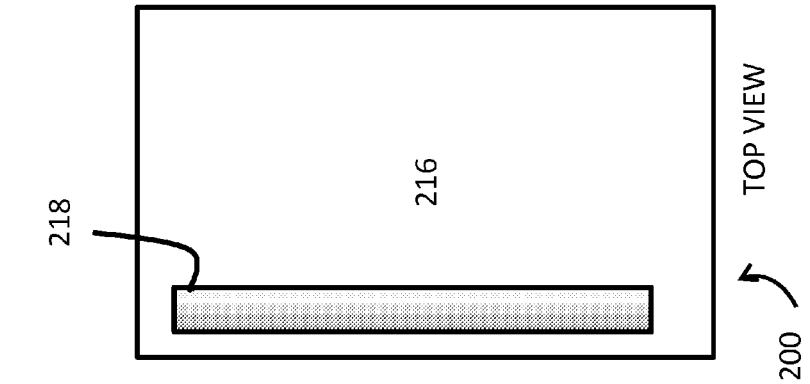
Figure 16:
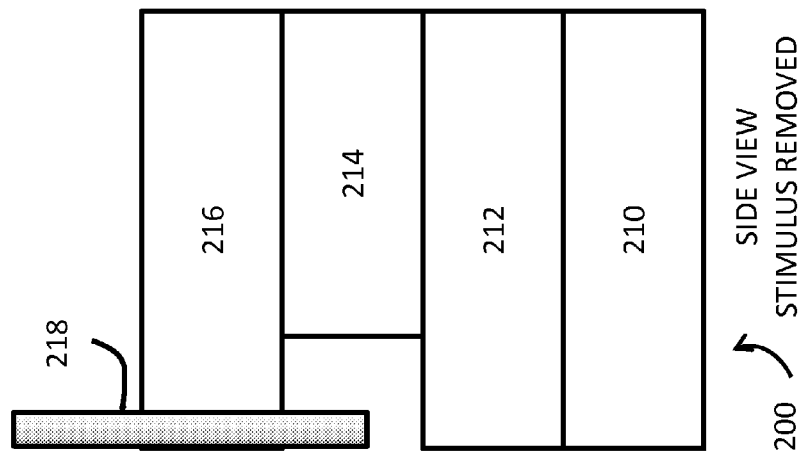
Figure 15:
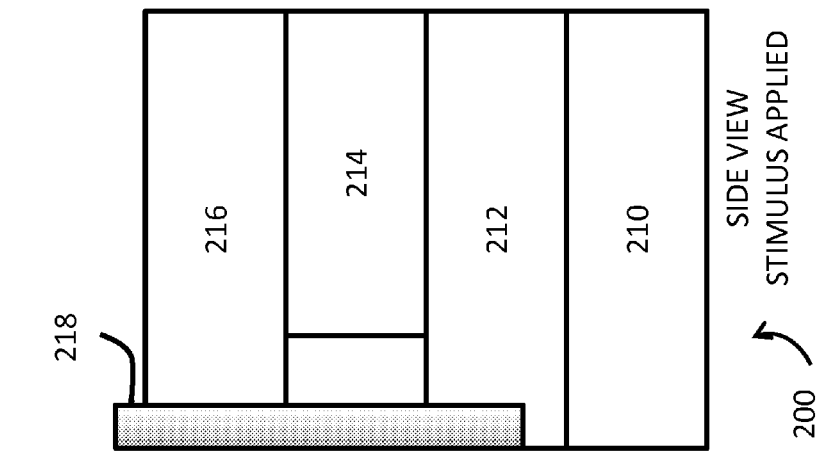

As illustrated in FIGS. 15-17, some embodiments of a smart structure 250, having a substrate 251, a conductive layer 252, a chromatic layer 254, an electrolyte layer 256, and a conductive contact 258. A trench 259 is positioned between the electrolyte layer 256 and conductive layer 252 by shaping of the chromatic layer 254. FIGS. 15-17 illustrate changes in the proximity of the conductive contact 258 with the conductive layer 252. This movement is made without application of a mechanical switch or other controller to provide a connection between the electrolyte layer 256 and conductive layer 252, such as connections provided by switch 119 or variable impedance controller 159 of FIGS. 1 and 9, respectively. The composition of the layers of structure 250 are similar to corresponding layers of structure 100 of FIG. 1.

The structure 250 of FIG. 15 incorporates a trench, or slot, to enable the conductive contact 258 to move proximate specific layers desired. The conductive contact 258 moves so as to make or remove electronic contact with the conductive layer 252. The mechanical positioning establishes an electronic contact, FIG. 15. Similarly, the contact 258 may be positioned so as to disable the electronic contact, as illustrated in FIG. 16. A top view of the configuration of structure 250 is illustrated in FIG. 17.

In some embodiments, the stimulus provided by conductive contact 258 may be dynamically controlled by mechanically bringing contact 258 to varied proximity of the conductive layer 252 and thereby establishing varying degrees of electronic contact. Any means for mechanically repositioning the contact 258 and/or the conductive layer 252 may be used to achieve the mechanical control of the chromatic layer 254.

Alternate Solid Electrolyte Layer(s)

Polymeric solid electrolytes may be used instead of liquid electrolyte for ease of manufacturing and integration. These solid electrolytes may comprise polymeric binder, conductive agents, filler, thixotropic agents and other additive and auxiliaries; for example U.S. Pat. No. 5,016,991A, entitled "Flexible, solid electrolyte useful in electrochromic devices." When such solid electrolytes are utilized, the conductive contact mechanism still interfaces with both the electrolyte layer and conductive polymer layer, similar to use of a liquid electrolyte material. Some embodiments may allow the conductive contact to slide or be repositioned within a trench cut through the layers of the smart material structure, so as to allow contact with the chromatic layer and/or the electrolyte layer. Alkali metal salts, necessary for the function of the electrolyte, may include chlorides, nitrates, sulfates and perchlorates of alkali metals, and so forth, as well as such salts as lithium chloride, sodium nitrate, sodium sulfate, and lithium perchlorate. The amount and composition may also depend on the type of conductive polymer and metal used to control the smart material's chromatic property and behavior.

A solid polymer electrolyte composition may be patterned and coated on the electrode in passive matrix shape by using a screen printing. The electrode is solidified by removing a solvent or it may be cured such as by heat and/or ultraviolet radiation. Here the electrode is the conductive layer, the conductive contact or both.

Complimentary Conductive Contact

The conductive contact, such as contacts 118, 158, 258, 288. may be a metal, such as aluminium, iron, copper, zinc, steel, and so forth. Additionally, the conductive contact may be a metal composite or alloy such as stainless steel, AlLi. The conductive contact acts as an electrode and therefore metals work well. The conductive contact may be in the form of a wire, sheet, or a conductive mesh.

As illustrated in FIG. 18, the cross-sectional view of a structure 280 includes the conductive contact 288 positioned proximate the electrolyte layer 286 which may be connected with our isolated from the conductive layer 282. The chromatic layer 184 is positioned similar to the structure 100 of FIG. 1; the proximity of the conductive contact 288 with respect to the electrolyte layer 186 and the conductive layer 182 triggers changes in a chromatic parameter or behavior of the chromatic layer 284, similar to that of structure 100 of FIG. 1.

The conductive contacts may also be a transparent conductor such as silver nanowires/nanoparticles, ITO, carbon nanotubes, and so forth, wherein the conductive contact is transparent or blends with the window or structure the contacts are effectively hidden and do not interfere with the view, such as for a window. In some embodiments additional conductive contacts or electrode elements are positioned in various locations to increase the speed of transition on contact; in these applications it is desirable that the contacts be relatively invisible to the viewer.

The surface area of the conductive contact may be designed to achieve the chromatic change in the substrate. Some embodiments achieve chromatic changes impacting a portion of the substrate, whereas other embodiments achieve chromatic changes impacting the entire substrate.

In some embodiments the complementary electrode is a window frame shape that fits over the entire window frame and is moved to contact the window or moved away from the window to control the transition of the window color or transparency state. In other embodiments, the complementary electrode is positioned to allow a variety of pressure conditions, wherein each pressure condition causes a different color or transparency state transition.

The conductive contact may have various shapes, forms, and contact points as illustrated in FIG. 18-21. A side view of the structure includes a substrate layer 280, a conductive layer 282, a chromatic layer 284, an electrolyte layer 286, and a structural trench 288.

A second complimentary conductive contact may be included to drive or help the redox processes. For instance, the transition between green PANI ES and colorless PANI LE, and vice versa, occurs between approximately $-0.1V$ and $<0.35V$ vs SCE depending on the electrolyte. In some embodiments, placing the PANI in contact with a metal M1, wherein the metal M1 has a standard reduction potential that is much higher than $-0.1$ V vs SCE, triggers reduction of the PANI. A separate conductive contact, or electrode, of another type of metal M2 may be used to oxidize the PANI back to its colored state. This will occur when the ions are already present in the electrolyte solution and available for the reduction process to occur. This way these anions (cations) may be reduced back to the original metal condition.

The conductive contact may have a roughness factor to further increase the exposed cross section without requiring additional metal (see the window of FIG. 23), or may be wrapped in a membrane with ionic size pores (see structure of FIG. 20). FIG. 20 is a side-view of a structure where the conductive contact has an uneven surface. The uneven surface increases the surface area over which electrons. More electrons flow over the larger surface area. When the conductive contact 288 contacts the conductive layer 282, the ions generated will flow through the electrolyte 286 when the free electrons flow from the conductive contact 288 to the conductive layer 282 and finally to the chromatic layer 284. The increased electron flow of these structures acts to increase the transition time from one chromatic state to another (color transition), and may enhance the effect by maximizing the oxidation of the chromatic layer 114. FIG. 21 illustrates a metal layer with a protective membrane. The protective membrane is used to prevent damage to the structure from the surrounding environment or from the user, such as scratches on a display screen.

Returning FIG. 18, within the structure 280 is positioned a trench 288 to enable the conductive contact (not shown) to contact the various layers. FIG. 19 illustrates a top view of a similar structure 290 wherein a trench 292 is positioned in a rectangle proximate the edge of the structure 290. A conductive contact (not shown) having a shape similar to or with structured so as to fit within the trench 292 and contact the various layers of the structure 290 may be used as a stimulus and moved within trench 292. This configuration may be used in a smart window application as illustrated in FIGS. 22-24.

Alternative Electrode Element(s)

The conductive contact element may be integrated within the structure or may be a separate element, such as a small hand held conductive structure. A user may carry a small wand or device made of a conductive material, which may be used to control a variety of smart structures similar to the touch screen pen except that this does not operate with an external electrical power source. In some embodiments, the conductive contact element is referred to as a complementary electrode and is used to control a portion of the structure, such as to create a small viewing area in a large window. In other embodiments, the structure itself is patterned in such a way to display different color, clear, or shades of colored patterns upon contact with conductive element or elements. In addition, the device may operate with conductive contacts, or complementary electrode, elements, and voltage simultaneously or sequentially depending on the applications. For instance, smart glass in an active mode may display a first pattern or have a first appearance during a first oxidation state, and then enter a hibernation mode when in a second oxidation state with a second pattern. Using the position of the conductive elements or controlling the conductivity between layers, the smart glass application transitions between display patterns without requiring any additional power source.

Further, the conductive contact may be configured proximate to a smart structure in a distributed manner, such that a patterned effect is realized. In this way, the conductive contact may provide a shaded view of a window appearing as blinds opening and closing on the window. The conductive contact may include multiple conductive components configured around the smart structure, wherein some or all of the conductive components may change position at a given time. When the conductive components all change position, the chromatic characteristic of the smart structure changes over the entire surface, such as to make the window transparent; when a staggered portion of the conductive components are positioned close to the conductive polymer a pattern of transparent and opaque portions is realized.

A similar shading effect may be realized by patterning of the conductive contacts, or complementary electrode elements, and/or conductive chromatic layer to achieve different results. For example, the smart window application may be used for a display screen wherein a portion of the screen may be controlled, while another portion is not. Similarly, there may be a design that a user desires to display on the screen, which is presented when a set of the contact elements are proximate the chromatic layer and another set of contact elements are at a different position with respect to the chromatic layer. There are a variety of configurations possible using various geometries, positioning, combinations of sets of contact elements, and the specific structure configuration and patterning desired.

FIGS. 22-24 illustrate smart window applications, employing a variety of configurations. FIG. 22 illustrates a window 296, where FIG. 23 illustrates the window 296 to which a conductive contact 299 is positioned. The window 296 includes a substrate glass pane 297, a conductive layer 298 an electrolyte layer (not shown) and a chromatic layer (not shown). In FIG. 23, the conductive contact 299 is positioned along the perimeter of the entire substrate 297. In FIG. 24, the conductive contact 295 is positioned along a portion of the substrate 297.

Figure 25:
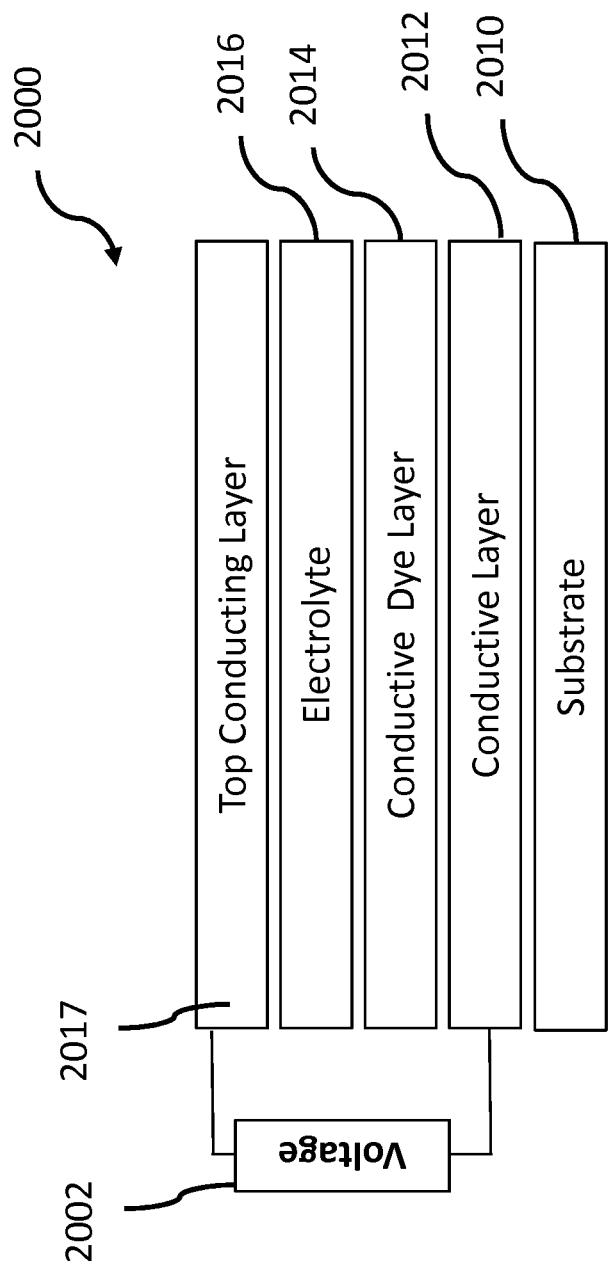
FIG. 25 illustrates a chromatic application structure incorporating an active chromatic technology that requires applied voltage, such as a battery or solar conversion energy storage, according to example embodiments.

In FIG. 25, an illustration of a hybrid smart structure 2000, which is based on the structure as in FIG. 1, having a substrate 2010, conductive layer 2012, chromatic layer 2014 and electrolyte layer 2016. In the present embodiment, the chromatic layer 2014 is a conductive dye layer. A voltage control 2002 is included in addition to a mechanical or switch control (not shown). A chromatic technology is presented wherein the conductive contact that drives color change in the chromatic layer is replaced by a top metallic conductive layer 2017; this layer may be transparent, colored, or patterned depending on the target use and application. For example, the structure 2000 may be used for a display window, where the glass displays videos, applications, or other types of dynamic content display information. The voltage control 2002 is present to enable such display to connect the chromatic material layer 2014 and the top conductive layer 2017. When the window is used for privacy or protection from outside environment, the mechanical switching (not shown) is used to drive the transparent, colored, blinds, shaded, or other states without using the continuous voltage source of voltage control 2002. The switch may be configured in combination with the voltage control 2002 or may be a separate construction. Such hybrid smart windows leverages both active display and static application without consuming equal power in both cases.

The structure 3000 is configured to change the optical state of the chromatic behavior, such as from $C_1$-to-$C_2$ (from one color to another color) or C-to-T. To achieve this optical state change, a conductive contact 3010 is applied to connect the electrolyte layer 3002 and conductive layer 3006 via the closed switch 3020 (3030 and 3040 switches are open) as illustrated in FIGS. 27-28, to transition the chromatic layer 3006 (in the case of Polyaniline ES) from oxidized state to reduced state (or vice versa). When the chromatic layer reaches its stable reduced (or oxidized) state, the switch 3020 is opened. We note that in some embodiments, the structure may require the switch 3020 to be closed to maintain the stable state. The chromatic layer in structure 3000 is a conductive dye layer 3004, which changes color according to oxidation state.

Another embodiment is illustrated in FIGS. 26-33, wherein a chromatic structure 3000 is configured to enable transitions between two stable optical states without requiring any external electrical circuitry to drive color transitions. The structure 3000 has a substrate 3008 and a conductive layer 3006. A conductive dye layer 3004 acts as the chromatic layer for chromatic transitions. An electrolyte layer 3002 is positioned on the conductive dye layer 3004. The conductive dye layer 3004 is a chromatic layer and may incorporate a transparent ITO layer, a conductive polymer, metal oxides, and other additives.

Two conductive contact, metal contact 3010 and metal contact 3011 are coupled to different portions of the electrolyte layer 3002. As illustrated, the metal contact 3010 is positioned on an opposite side of the electrolyte layer 3011 from the metal contact 3011. A switch couples metal contact 3010 with metal contact 3011, and is used for recharging components of the structure 3000, as is described hereinbelow. A switch 3020 couples the metal contact 3010 to the conductive layer 3006. A switch 3040 couples metal contact 3011 to a different portion of the conductive layer 3006.

In a first state, FIG. 26, the structure is in a colored state ($C_1$) that interferes or absorbs some of the incoming light; a second state for the structure is a bleached or transparent state (T) where light passes through the structure substantially as received. We note that the second state may be a second colored state ($C_2$) different from the first colored state. FIG. 26 illustrates a stable oxidized state of the conductive dye layer 3004, wherein the switch 3020 is open, the switch 3040 is open and the conductive dye layer 3004 is a default color. The switch 3030 is open during the color transition processes.

In FIG. 27, switch 3020 is closed to initiate a color transition of the conductive dye layer 3004. As illustrated, the color of the conductive dye layer 3004 changes, and continues as illustrated in FIG. 28. And finally in FIG. 29 the color has transitioned to final state.

In FIG. 30, switch 3020 is open and switch 3040 is closed to begin the reverse transition. As illustrated in FIG. 31, the color of the conductive dye layer continues to change. Once the color is back to a default condition, the switch 3040 is opened and the switch 3030 is closed to initiate the reconditioning process.

In the example of FIG. 26, the chromatic layer 3004 at time $t_1$ (FIG. 26) begins in a stable oxidized state with both switches 3020 and 3030 open, at time $t_2$ (FIG. 27) a conductive contact 3010 is placed in contact with the electrolyte layer 3002, the chromatic layer 3004 (indirectly) and the conductive layer 3006 by connecting the switch 3020 to initiate a transition from a stable oxidized state to a stable reduced state of the chromatic layer 3004. The conductive contact 3010 maintains this contact position to facilitate the transition of the chromatic layer 3004 to a stable reduced state. At time $t_3$ (FIG. 28), the conductive contact 3010 is still in contact with the chromatic structure 3000. At time $t_4$ (FIG. 29) the metal electrode 3010 contact is terminated without change to the stable reduced state of the chromatic layer 3004 and when the surrounding environment (pH, Oxygen level and so forth) able to maintain such balanced and stable state.

In operation of the structure 3000, closing and opening the connection 3020, the structure 3000 undergoes a reduction-oxidation (redox) process. The redox process is driven by the metal electrode 3010 making contact via switch 3020 with the conductive layers 3006 and electrolyte layer 3002, thus creating a galvanic potential difference there between. The conductive contact 3010 acts as one electrode (anode)

and the combined conductive layers 3004 and 3006 act as another electrode (cathode) defining the potential difference. The components and configuration of the chromatic structure 3000 are designed such that this potential difference is sufficient to establish a redox process and relationship between the electrolyte layer 3002 and the conductive layers 3004, 3006. Specifically, the chemical composition of the electrolyte layer 3002 is part of the redox process with the chromatic layer 3004.

In order to revert to its original state, another metal 3011 is used to transition the chromatic layer 3006 from its reduced state to its oxidized state (or vice versa) by closing switch 3040 (switches 3020 and 3030 remain open) as illustrated in FIGS. 30-31. When the chromatic layer 3006 reaches its stable oxidized state (or reduced state), the switch 3040 is opened. We note that in some embodiments, the structure 3000 may require the switch 3040 to be closed to maintain the stable state.

As illustrated, the metal contact 3011 is added to reverse the redox process during oxidation. For instance, (FIG. 27) during the reduction process, the first metal electrode 3010 and second metal electrode 3011 are not connected. Furthermore, the second metal electrode 3011 is not connected to the conductive layer 3006. During re-oxidation (reverse process), the first metal electrode 3010 is disconnected from the conductive layer 3006 and connected to the second electrode 3011 as illustrated in FIG. 26, 30, 31. There are a variety of configurations and processes that may be implemented to achieve color transition results.

Where the conductive dye layer 3004 is a PANI material, the default condition is an oxidized PANI. Considering the two metal solution described in FIGS. 28-33, the first metal contact or electrode 3010 drives a first transition from color $C_1$ to color $C_2$. When the conductive dye layer 3004 has color $C_2$, the PANI is reduced. The second metal contact 3020 drives the second transition from color $C_2$ to color $C_1$.

When both switches 3020 and 3040 are open the conductive dye layer 3004 is oxidized in a default state having color $C_1$ (oxidized chromatic layer). On closing switch 3020 and opening switch 3010, the conductive dye layer 3004 transitions to a reduced state having color $C_2$ (reduced chromatic layer).

Closing switch 3020 and opening switches 3010 acts to oxidize the conductive dye layer 3004 to return to the default condition having color $C_1$. When both switches 3010 and 3020 are open, the structure is reconditioned by closing switch 3030, which acts to recondition the electrolyte.

By closing switch 3030 (switched 3040 and 3020 are open) the second metal 3011 is replated (reconditioned) as illustrated in FIG. 32. Furthermore, an optional external voltage 3050 (FIG. 33) may be applied to replate the first metal 3010 and/or recondition the electrolyte. Alternatively, an optional external device 3060 having a separate metal (not shown) with different potential, a circuitry, and battery is incorporated to replate the metal and restore the components of the structure 3000 to a default condition. Solar radiation may be also used to replate first metal 3010 and/or recondition the electrolyte.

As described above, solar energy may be used to self-generate and recondition the electrolyte and replate the metal electrode, either through solar-to-electrical-to chemical conversion or solar-to-chemical direct conversion. In this way, the structure 3000 includes a self-generating feature for re-conditioning the components of the structure 3000 along with the control mechanisms (two metal contacts 3010, 3011 and switches 3020, 3030) that do not require an external applied voltage. Such solutions address a broad range of applications under all environmental conditions.

As described herein, this optical control mechanism may be referred to as Photo-Electro-Chemical (PEC) solution. In some embodiments, the structure is continuously exposed to oxygen, such as oxygen in air. As described herein, an original state of the chromatic layer 3004 is a stable oxidized state and the chromatic layer 3004 transitions to a stable reduced state. In the original stable oxidized state, the chromatic layer 3004 has a first optical characteristic, such as an opaque condition.

FIG. 30 illustrates a side view of an embodiment of a chromatic structure 3000 having a stacked assembly configuration, or stack, including a substrate layer 3008 and a second metal 3011 that re-oxidizes the chromatic layer 3006, re-plates the first metal electrode 3010, and clears the ions that contaminated the electrolyte during the reduction process when first metal electrode 3010 was connected with the conductive layer 3006 (FIGS. 30-33), hence the reverse re-oxidation process to switch back to original color could be achieved with two separate metals of differing standard reduction potential as illustrated in FIG. 30. Once the structure reaches its oxidized state, the switch 3030 may be open while maintaining the stable oxidized state where the surrounding environment (pH, Oxygen level, Chloride.) are such that they may maintain the stable and balanced oxidized state.

In some embodiments, a structure 3000 as illustrated in FIG. 33 may draw power during switching, during which the power supply or battery may be included in the stack of layers. Such application is similar to a dye-sensitized solar cell, or DSSC, technology used in solar applications for energy harvesting. The DSSC is a thin film solar cell based on a photo-electro-chemical process, having a semiconductor layer between a photo-sensitized electrode and an electrolyte. In the current embodiment, energy for the switching may be stored in the electrolyte solution of the electrolyte layer 3002 in much the same way the total energy in a battery is stored in the battery's electrolyte solution. This would mean that there are only a finite number of switches that the structure may support once the film is prepared, similar to the limited lifetime of batteries when they are fully discharged and used up. Since the PANI layer is very thin, the structure may support more than 100,000 switching cycles. Furthermore, these adhesive films may be made disposable when the electrolyte is fully utilized.

This leads to the integration of a mechanism to recharge the electrolyte (as a battery storage) using solar energy when the conductive layer is in an oxidized colored state, such an electro-chemical glass becomes a hybrid electro-chemical-chromatic/Gratzel cell in which the energy for the colored-clear transition comes from solar energy rather than from the electrolyte alone. This would dramatically increase the number of switches since the electrolyte would never be consumed, especially because the energy storage and usage processes are done purely chemically (i.e. without conversion to electrical current).

Alternatively, light may be used to re-oxidize the chromatic layer as illustrated in the next photo-electro-chemical device integration, such as under sunlight illumination. An example is a chromatic material sensitized solar cell (DSSCs) photovoltaic device typically used to convert solar radiation into electrical/chemical energy.

Where solar energy is incorporated to create the photo-electro-chemical reaction, this process enables re-oxidation of the chromatic layer as well as reconditioning of the electrolyte. When sunlight hits the electrolyte layer and the chromatic layer, electrons are excited by the incoming photons; the electrons are set free creating a hole (positive ions h+) during the process. The free electrons are then injected into the conduction band of the conductive layer. Such a process is similar to the re-oxidization process and is referred to as the electron donation from the hole conductor (in this case the holes are going to migrate to the metal electrode). To close the circuit, the free electron will flow from the conductive layer to the metal electrode through the second closed switch connection in order to neutralize the hole. This is referred to as regeneration or electroplating of the metal electrode.

As applied to structure 100 of FIG. 1, in one embodiment the two electrodes include a conductive layer electrode 112 and a conductive contact electrode 118. Upon photo excitation the electrons are injected into the conduction band of the transparent conductive layer 112, where the conductive layer is a material such as ITO, ZnO, SnO2. and others; and the original state of the chromatic material of layer 114 is restored by electron donation from the hole conductor. The regeneration of the sensitizer by the hole conductor intercepts the recapture of the conduction band electron by the oxidized chromatic material and the hole conductor is regenerated at the counter-electrode, which is a metal element in our case.

The circuit is completed via electron migration through the external load. The conducting polymers are the semiconducting polymers which exhibit good electrical properties similar to metals and possess unique properties like light weight, resistance to corrosion, flexibility and low cost. The nanostructures of conducting polymers are excessively exploited in the electronic devices due to the large surface area of the nanomaterials and their unique electronic. These perspectives have prompted the researchers for the rapid development of conducting polymers and the nanocrystalline metal oxide semiconductors for improving the processability, functionality and the conversion efficiency of DSSCs.

Returning to structure 3000, the chromatic layer 3004 at time $t_4$ (3000$d$) begins in a reduced stable state. At $t_5$ a second metal electrode (anode) 3011 that acts as an oxidant metal is connected with first metal electrode that acts as a cathode in the revered (re-oxidation) process by closing the connection 3020 (FIG. 30) to initiate a transition from a stable reduced state 3000$d$ to a stable oxidized state of the chromatic layer 3004. The second metal electrode 3011 maintains this contact position to facilitate the transition of the chromatic layer 3004 to a stable oxidized state. At time $t_7$ (3000$f$) the second electrode 3011 is disconnected from the first electrode 3010 and the stable oxidized state is maintained if the surrounding environments may sustain the stable and balanced oxidized state.

Figure 54:
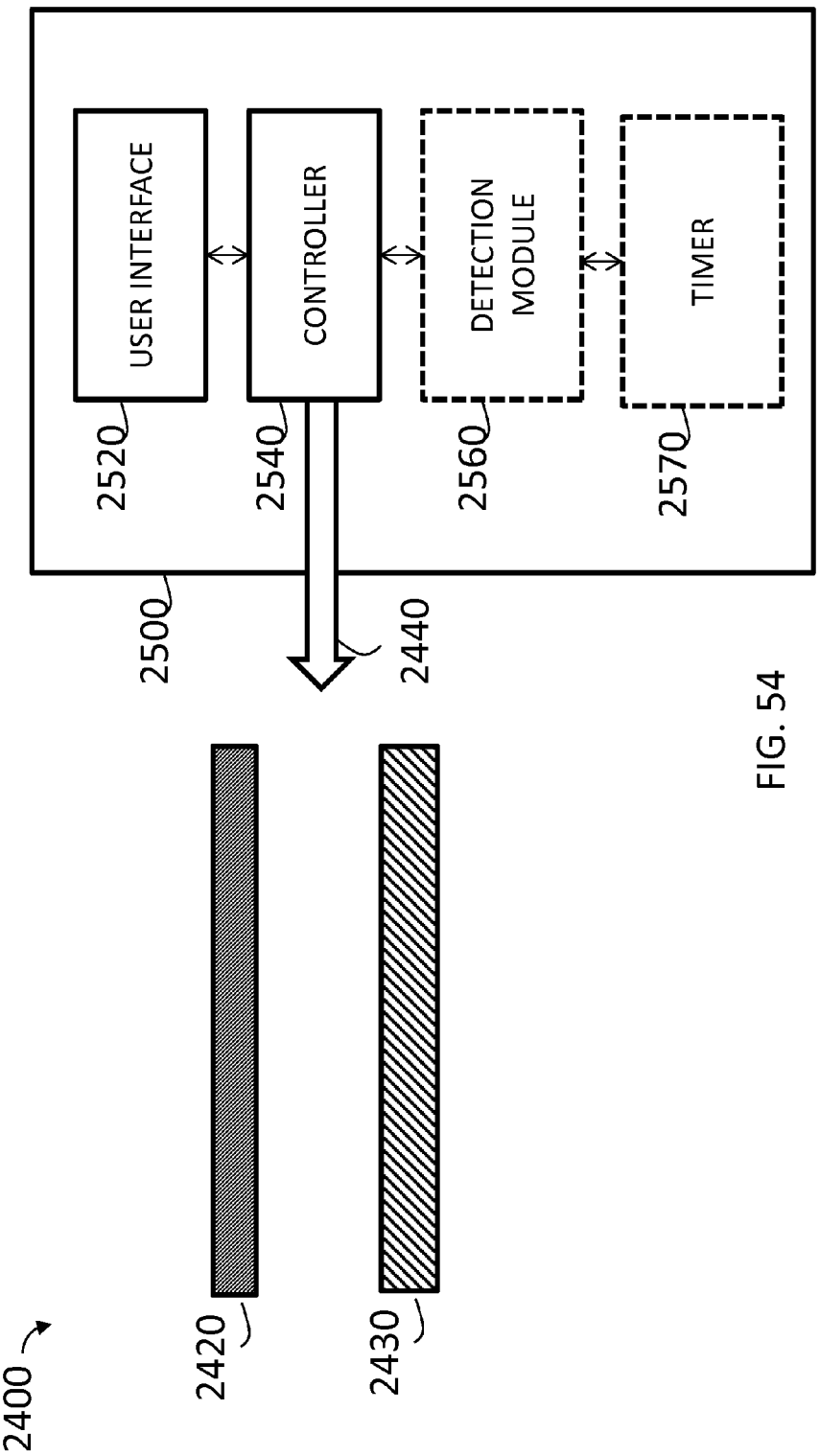
FIG. 54 illustrates a smart material structure incorporating metal electrodes and control mechanism, according to example embodiments.

FIG. 54 illustrates a passive control module 2500 and process, according to some embodiments, that responds to a user's inputs through a user interface module 2520. As illustrated, the control module 2500 works to control transitions of stable redox states for a chromatic structure (not shown) within a system 2400. The transition change may be facilitated by a conductive contacts (3010 and 3011) such as the structure illustrated in FIGS. 26-33. The control module 2500 may be used for control of one or both transition mechanisms associated with both conductive contacts. The chromatic structure may be similar to structure 3000. Controller 2540 provides control of the transition mechanism, including to close and open the switch connecting first electrode metal 2420 (acting as anode during reduction and cathode during oxidation), to close and open the second switch connecting first and second metal electrode 2430 during reduction and oxidation, respectively. In some embodiments, a detection module 2560 is used to detect when the target stable redox state is reached. A passive optical filter or other sensor may be used to detect the stability of the optical state of the chromatic structure. In some embodiments, a timer 2570 sets a duration time for the transition time, time for first conductive contact and second conductive contact, respectively.

The chromatic structure has an original redox state, such as opaque or transparent, and when a change is desired the user indicates to the user interface module 2520. This may be a simple switch or on/off button, or may be a smart controller enabling a variety of changes in the optical characteristics of the chromatic layer, such as change of color or opacity.

In one embodiment, the user selects a change in the chromatic structure by selection through the user interface module 2520. In response the user interface module communicates with the controller 2540 to initiate the selected change. The controller 2540 implements the change by control of the transition mechanism, either to change the switch configuration of the first conductive contact 2420 or to the second conductive contact 2430. The detection module 2560 may be used to determine the time for such a transition. On detection of completed transition, the detection module 2560 communicates with the controller 2540 to control the transition mechanism, such as to discontinue use of the transition mechanism. The controller 2540 interfaces with the transition mechanisms through a communication bus 2440, such as to initiate a mechanical control of positions of the first conductive contact 2420 or second conductive contact 2430.

In one embodiment, the user programs or sets the controller to use passive control, wherein the detection module 2560 includes an optical filter that detects changes in incident light. A first detected light condition may turn on the control and a second detected light condition will turn control off. An example is when the first detected light condition is a bright or hot midday sun this triggers the control to change the optical characteristics of the chromatic structure to absorb less light. Such control of a window may act as a temperature control for a room.

Figure 55:
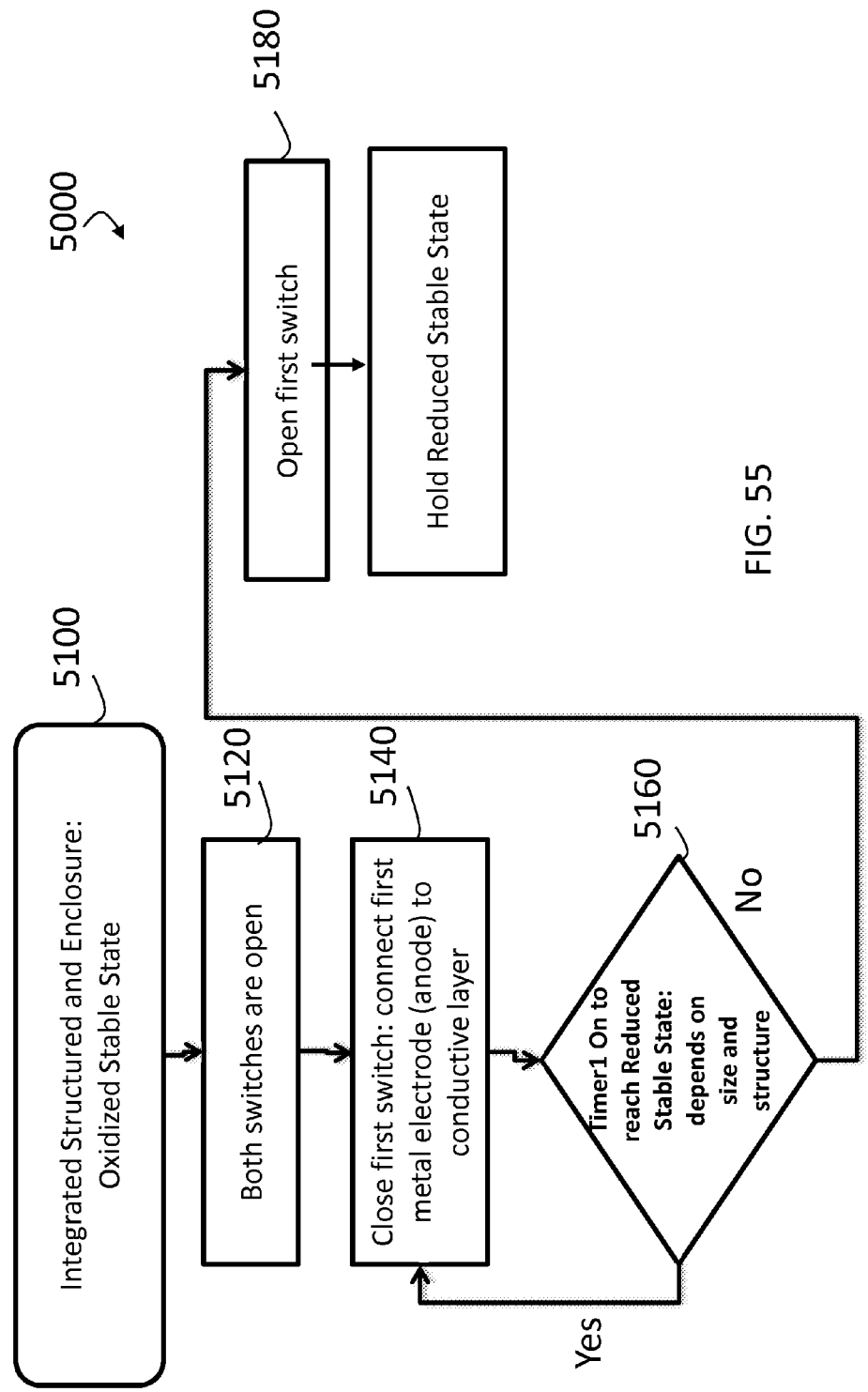
FIG. 55 illustrates a flow diagram of operation of a smart material structure from oxidized to reduced state, according to example embodiments.

FIG. 55 illustrates a process 5000 corresponding to the changes to chromatic structure 3000 as illustrated in FIGS. 26-33. The chromatic structure 3000 is originally in stable oxidized state at time $t_1$ (3000$a$), step 5100, wherein the switch connecting first metal electrode 3010 is in a first position with respect to the conductive layer. At time $t_1$ the second metal electrode is disconnected from first metal electrode. At time $t_2$ the conductive contact 3010 is in second position with respect to the chromatic layer (FIG. 27), step 5120. The chromatic structure 3000 starts the transition to a stable reduced state in response to moving the conductive contact 3010 proximate the chromatic layer 3004 via connecting it though the conductive layer 3006, step 5140. A timer is initiated to measure the transition time, and the timer is monitored, step 5160. The timer is set to a transition time period corresponding to the chromatic structure 3000 configuration, size, and components. On expiration of the timer, step 5160, the conductive contact is removed, step 5180, and the stable reduce state is persistent.

Figure 56:
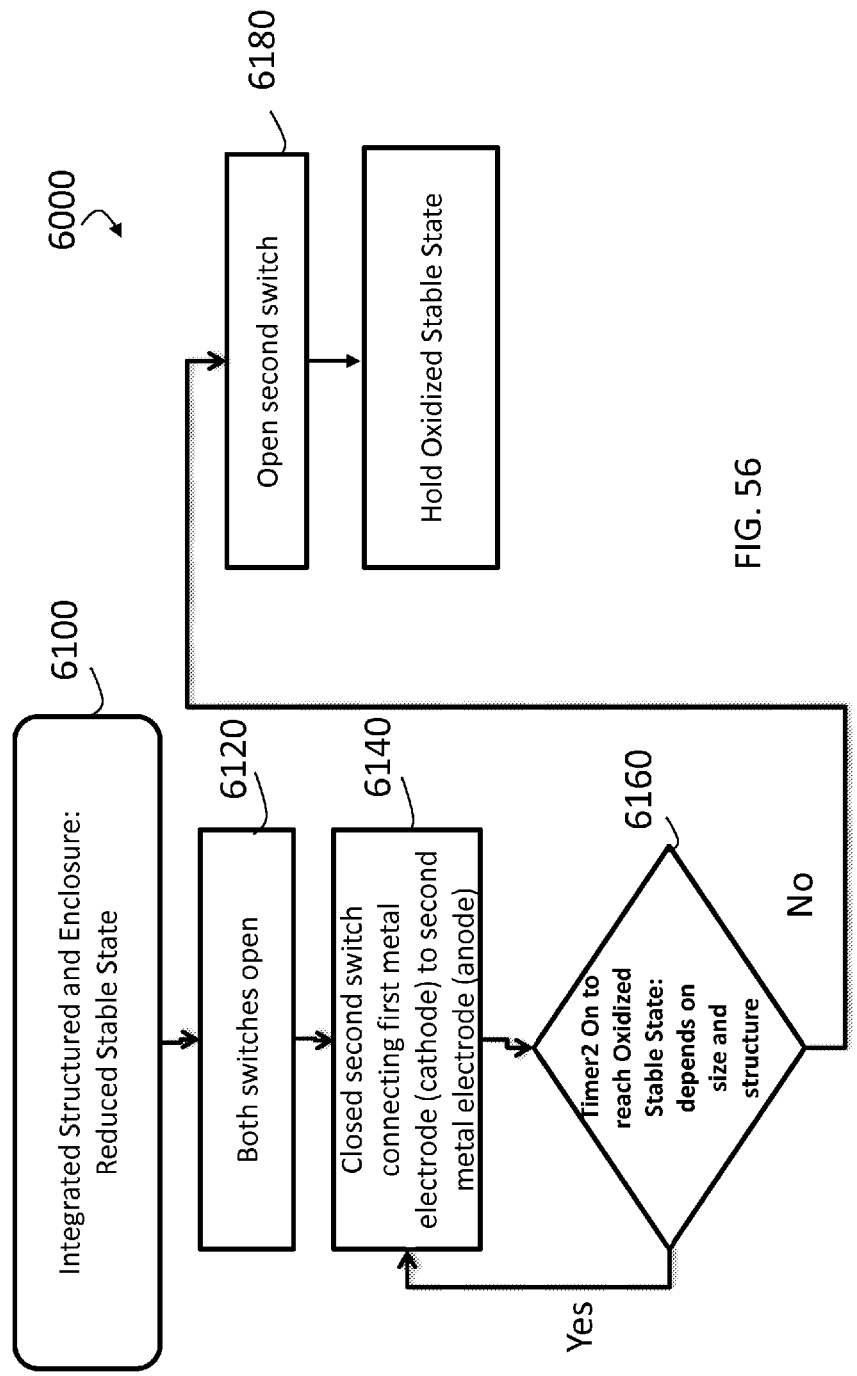
FIG. 56 illustrates a flow diagram of operation of a smart material structure from reduced to oxidized state, according to example embodiments.

FIG. 56 illustrates a process 6000 corresponding to the changes to chromatic structure 3000 as illustrated in FIG. 22. The chromatic structure 3000 is originally in stable reduced state at time t1 (3000$d$), step 6100, wherein the switch connecting second metal electrode 3011 is in a first position with respect to the conductive layer. At time t1 the first metal electrode is disconnected from first metal electrode. At time t2 the conductive contact 3011 is in second position with respect to the chromatic layer (FIG. 22e), step 6120. The chromatic structure 3000 starts the transition to a stable oxidized state in response to moving the conductive contact 3011 proximate the chromatic layer 3004 via connecting it though the conductive layer 3006, step 6140. A timer is initiated to measure the transition time, and the timer is monitored, step 6160. The timer is set to a transition time period corresponding to the chromatic structure 3000 configuration, size, and components. On expiration of the timer, step 5160, the conductive contact is removed, step 5180, and the stable reduce state is persistent.

The active chromatic layer may be coated onto the substrate by printing, spraying, spin-coating, roll-to-roll coating, doctor blading, or other solution based processing techniques. Alternatively, the chromatic layer may be coated onto the substrate by self-assembly in which the substrate is negatively or positively charged and the chromatic layer is in a solution containing the opposite charge. For example, a glass substrate may be plasma etched in order to give its surface negative charges. When dipped into a solution of a chromatic material such as doped polyaniline (positively charged) the polyaniline will electrostatically adhere to the negatively charged substrate.

Multiple layers of the conductive chromatic layer may also be assembled by subsequently dipping the solution into alternating chromatic material solutions that are positively or negatively charged. This layer-by-layer assembly may be used to generate a high number of chromatic layers that may be used to modify the color of the chromatic material or to increase/decrease the speed of transition.

In one embodiment, a 5 inch by 7 inch plasma etched ITO substrate or a plasma etched piece of glass is slowly dipped into a dispersion containing polyaniline doped with HCl in water (300 mL of dispersion in a 400 mL beaker) at a concentration of 4 g/L for 30 seconds. The substrate is removed and thermally annealed at 55° C. for 2 hours. The process may be repeated in order to increase the thickness of the polyaniline layer. This general process may also be used to deposit metal oxides onto the polymer.

Multiple layers of the conductive chromatic layer may also be assembled by subsequently dipping the solution into alternating chromatic material solutions that are positively or negatively charged. This layer-by-layer assembly may be used to generate a high number of chromatic layers that may be used to modify the color of the chromatic material or to increase/decrease the speed of transition. A detailed procedure for this process is described hereinbelow.

In one embodiment, a 5 inch by 7 inch plasma etched ITO substrate or a plasma etched piece of glass is slowly dipped into a dispersion containing undoped polyaniline in water (300 mL of dispersion in a 400 mL beaker) at a concentration of 4 g/L for 30 seconds. The substrate is removed and thermally annealed at 55° C. for 2 hours. The resulting substrate is blue in color. This blue substrate may then serve as a substrate to deposit additional conducting polymers of different colors. For example, the blue polyaniline substrate prepared by the above mentioned procedure may be slowly dipped into a dispersion of doped polythiophene (4 g/L, 300 mL in a 400 mL beaker) in order to generate a layer of undoped polyaniline and doped polythiophene which appears purple in color. Other conducting polymers of different colors may be mixed and matched in order to tune the color of the substrate to the desired color.

There are a variety of fabrication methods for building these structures, including a layer by layer film process to build the layers, an in situ self-assembly of the chromatic layer, a composite fabrication, substrate immersion techniques and so forth.

The smart material structure 100 (FIGS. 1-8) is considered a semi-active chromatic system, as the structure on its own is a passive element, but when a chemical stimulus is applied the properties of the passive element change. The chromatic layer 114 is the passive element which when proximate the electrolyte layer 116 reacts to a chemical stimulus in the electrolyte and/or conductive contact 118.

Alternatively, metal exchanges electrons and anions with the electrolyte 116 and chromatic layer 114 until an equilibrium is reach in the presence of the conductive layer 112 that acts as a counter electrode to allow the chromatic layer 112 to reduce and oxidize in the case of PANI case.

The preparation, fabrication, and manufacturing process of such material in some embodiments is described as follows. A dispersion of polyaniline protonated with an acid such as camphorsulfonic acid (0.23 grams) is prepared by adding the polyaniline/acid powder into a solution of a highly polar and acidic solvent such as m-cresol or hexafluoroisopropanol (20 mL). The dispersion is allowed to sit for 1 day after which time it is ready to cast.

A conductive film of doped polyaniline may be prepared on a structure having a conductive layer 112, such as ITO layer, in combination with a substrate 110 by drop-casting a small amount of the doped polyaniline dispersion on the conductive layer 112 and allowing the dispersed polymer to dry at room temperature forming a polymer film. Alternately, the polymer may set by applying a small amount of heat (up to 110 C) in order to facilitate the drying process. Additional dispersions or layers of polyaniline may subsequently be added onto existing polymer film to control the thickness using a similar technique as above.

In addition to coating the conductive layer 112 using a pre-existing solution of polyaniline, a thin film of conductive polyaniline could also be deposited by electrochemical polymerization of aniline in the presence of aniline. In this process, a solution of aniline (0.001-0.1 M) in 1M acid (HCl, H2SO4, etc) is placed in a small beaker and a conductive layer and substrate with a conductive contact is submerged into the acidic solution of aniline. In the presence of a counter electrode, a current is applied to the system and may be cycled through various voltages. The time, current, current rate, and voltage cycling may all be varied in order to control the thickness of the polyaniline film and its conductivity.

In addition to making a film of the pure polymer, composite films may also be produced in order to improve adhesion and facilitate film-forming processes. In one example, building the smart material structure includes preparing a polyaniline dispersion in water, or in alcohol, in the presence of a surfactant or a film-forming additive. For example, dedoped polyaniline (0.1 g) may be doped with a surfactant such as dodecylbenzenesulfornic acid (DBSA) (0.13 g) and sonicated in the presence of the dedoped polyaniline in order to produce a stable dispersion that may be casted as a thin film with improved adhesion and film-forming properties. Many other surfactants and film-forming additives may be used such as phenol resins, surfactants, and so forth. In one example a Triton X-Surfactant® is a nonionic surfactant by Dow Chemical Company of Midland, Mich.

Producing such polyaniline electrochromic composite film includes preparing polyaniline composite and polystyrene glue solution. The process then adds the polyaniline composite into the polystyrene glue solution, mixing well. Then use a spin coating, sputtering, or ultrasonic for scattering to obtain polyaniline composite conductive liquid. Coat the conductive liquid on a conductive layer, such as ITO, a conductive glass or a conductive film to obtain a polyaniline electrochromic composite film by means of painting or spraying. Finally, the process bonds the polyaniline electrochromic composite film with an electrolyte-contained conductive layer by drying at 50-60 DEG C. for 2-3 hours, and using epoxy resin to seal the two layers all around and obtain the polyaniline electrochromic composite film device. The polyaniline electrochromic composite film device made by such a method has the advantages of short response time, long recycling service life, high performance and the like, and the production method is simple and low in cost and has wide application prospect and high practical value.

Figure 35:
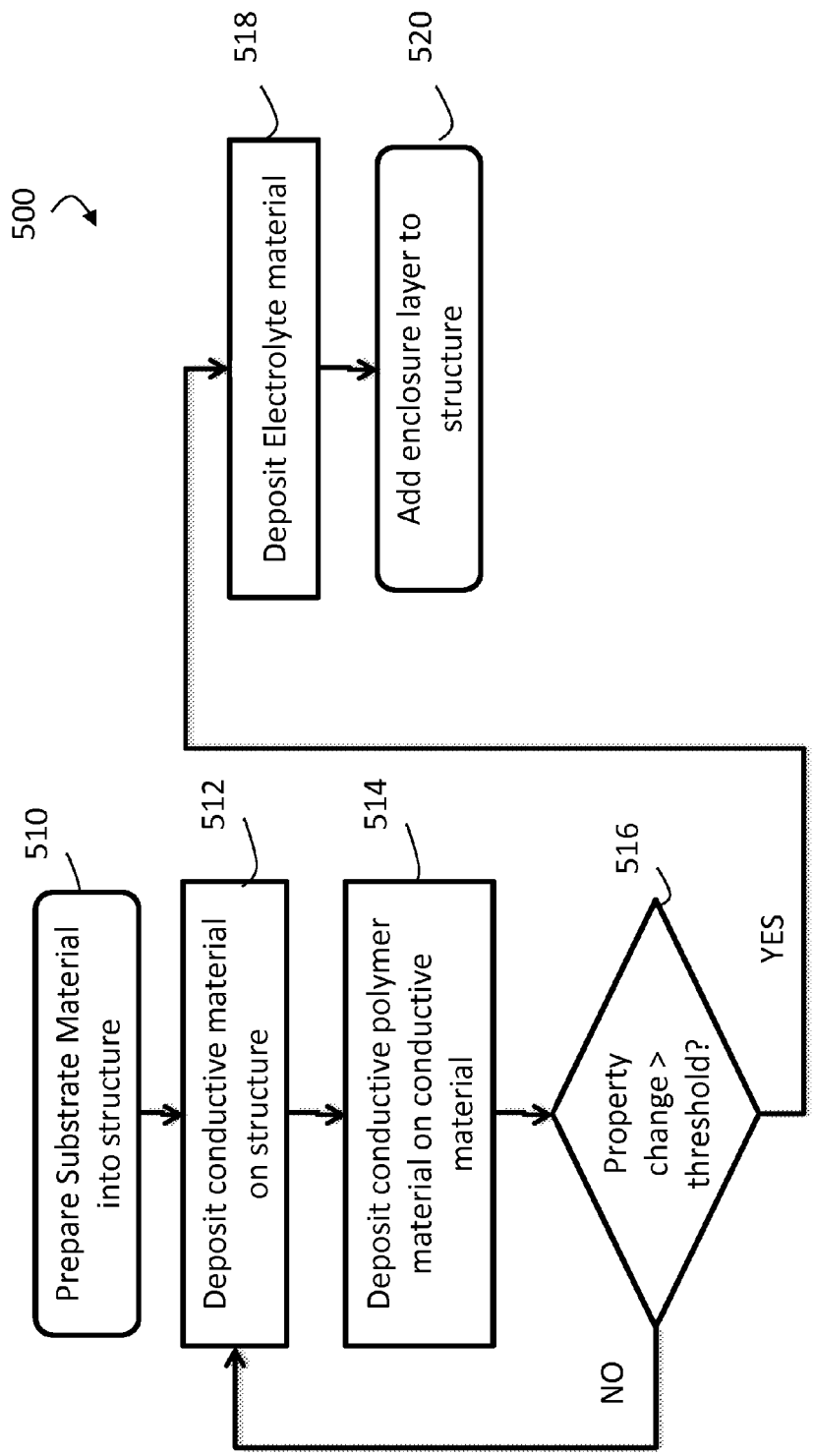
FIG. 35 illustrates a method for manufacture of a smart material structure, according to example embodiments.

FIG. 35 illustrates a method 500 for manufacture of a smart structure, as in FIGS. 1-12, and others. The process starts with preparation of a substrate material, 510, to form a substrate layer. A conductive material is deposited on the substrate layer, 512, to build a conductive layer of the smart material structure. A conductive polymer is deposited on the conductive layer, 514, to form a conductive polymer layer of the smart material structure. If the property change of the smart material structure is above a threshold characteristic, 516, an electrolyte material is deposited on the smart material structure, 518, to form an electrolyte layer. An enclosure is provided to maintain the configuration of the smart material structure, 520. If the property change is not above the desired threshold, 516, then processing continues with deposition of another conductive layer, 512. The property change may be determined by testing with application of a metal contact or through simulation or other means.

Roll-to-Roll Film Fabrication

The dynamic chromatic structure described in this application may also be fabricated using roll-to-roll technique where the chromatic layer may be deposited directly on the conductive film, followed by the electrolyte layer and protective layer as illustrated in FIG. 8-24. The other side of the film includes protective adhesive material that may be removed before applying it to the target surface. The film may be fabricated using common window sizes where the edges are left clear of a chromatic layer in order to integrate the metals electrodes. Alternatively, the film may be pre-cut and integrated with the metals electrodes and switches prior to shipping them to an end-user, or provided with a kit in order to prepare the film at the site for retrofitting. The kit includes the metals electrodes and switches in addition to cutting and clearing tools as described next.

EMBODIMENTS AND APPLICATIONS

Smart materials may be built using the structures presented herein as building blocks, wherein a conductive polymer material is coupled with an electrolyte material when conductive contact triggers property changes in the conductive polymer. For use in smart windows the conductive polymer has a color or transparency property that changes in response to the conductive contact. Other smart materials may be built using other properties of a conductive polymer, such as electrical conductivity, insulating properties, sonar properties, and others.

The steps and process to design, preparation, fabrication, testing, and fine-tuning of the smart material structure are determined based on general requirements, specifications targeting certain market application, budget considerations and so forth. For example, in some smart window application the initial color of the glass may be selected based on building architecture and colors. The level of transparency may also be chosen early on to maintain a minimum threshold to prevent excessive heat to penetrate the building in hot days. Such specifications will reflect the type and thicknesses of substrate, electrolyte, conductive chromatic layer, and conductive ITO layer combined to meet the designed format and function. Once the design parameters are selected the fabrication process starts to deposit, sputter, or grow the conductive chromatic layer on top of the ITO layer. Continuous testing is conducted for different thicknesses until the target colors/transparency are achieved before finalizing the design and integrating it inside the final enclosure.

The smart material structure 100 (FIGS. 1-8) is considered a semi-active chromatic system, as the structure on its own is a passive element, but when a chemical stimulus is applied, the properties of the passive element change. The conductive dye layer 114 is the passive element which when proximate the electrolyte layer 116 reacts to a chemical stimulus, which is the metal contact 118. The electrolyte layer 116 may include a reservoir to manipulate the hydrogen gas generated and absorbed during reduction (e.g., application of a metal contact) and oxidation (e.g., by removing the metal contact). Such reservoir may be vacuum or include additional gases to further enhance color transition process. In addition to hydrogen, a small amount of heat may be produced as well.

The underlying mechanism of the color changing process may be also explained by a concept similar to energy storage, metal corrosion, or a combination of the both phenomena. Basically, the metal interacts with the electrolyte, as a strong acid, through a reaction that produces hydrogen gas. Hydrogen gas is a strong reducing agent so the hydrogen generated is able to reduce PANI which enables the latter to transition from green to yellow to clear during reduction process.

Alternatively, metal exchanges electrons and anions with the electrolyte 116 and conductive dye layer 114 until an equilibrium is reached in the presence of the conductive layer 112 that acts as a counter electrode to allow the conductive dye layer 112 to reduce and oxidize in the case of PANI case.

In some situations, the phenomena is also similar to the electrochromic mirror concept based on reversible uptake of hydrogen in nickel-magnesium alloy films as reported in "*Switchable mirrors based on nickel-magnesium films*," by Richarson, T. J.; Slack, J. L.; Armitage, R. D.; Kostecki, R.; Farangis, B.; Rubin, M. D. Applied Physics Letters, Volume 78, Issue 20, id. 3047 (2001). Upon exposure to hydrogen gas the films take up hydrogen and become transparent and when hydrogen is removed the mirror properties are recovered. The effect of applying Hydrogen gas was found to be equivalent to applying a voltage to the film.

Another embodiment includes a flexible adhesive film 297 (FIG. 22-24) that may be applied to existing glass to convert them to smart windows (as illustrated) without the need to fully integrate them with the glass because there is no need for the structure to be bound to a glass substrate. The flexible film will include the conductive layer, chromatic layer, and electrolyte sealed inside a flexible and transparent enclosure and applied to glass like in the automobile window tinting films. The film may include an exposed area to integrate the metallic contact(s) along. Alternatively, the metal objects 298 may be thin layer objects positioned inside the film around the peripheral of the film and integrated with the switch knob mechanism 299 after cutting and during placement on the window illustrated in FIG. 23. In another retrofitting film application, the inner side of the glass is surrounded by the window frame, leaving side edges exposed to integrate the metal electrodes and switches. After cutting the film to fit the window size, the edges are cleared from Chromatic layer and a tape containing the metal electrodes and electrolyte is used to integrate the metal electrodes with the film. Then the switches are added to connect the metal electrodes with the conductive film or with others.

Figure 36:
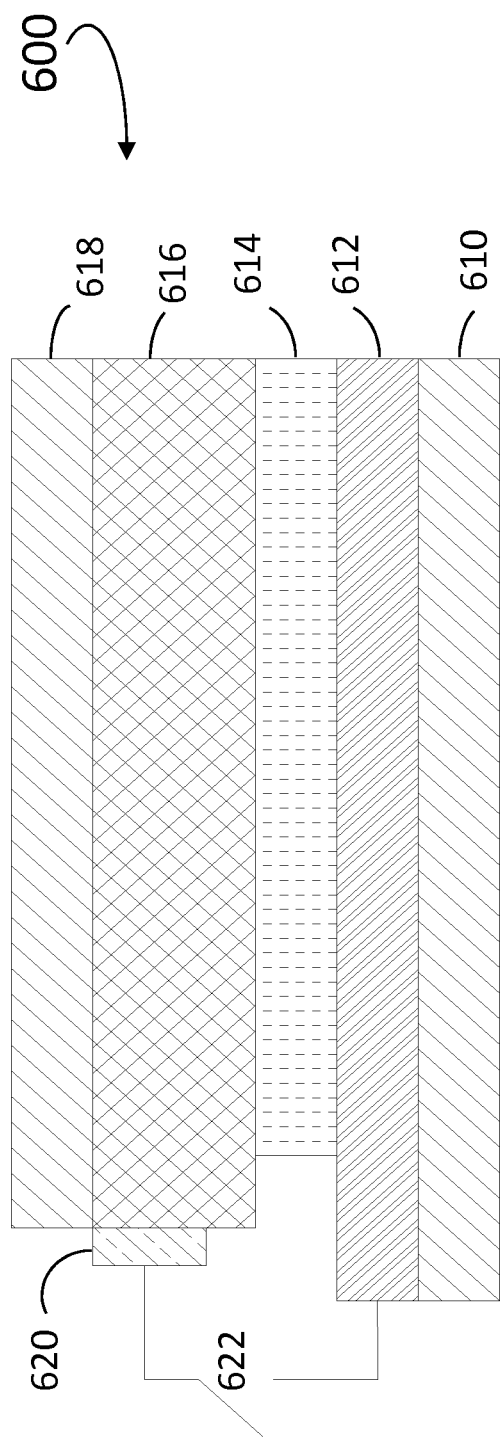
FIG. 36 illustrates a cross-sectional view of a smart material structure incorporating chromatic glazing, according to example embodiments.

A variety of the materials used in these devices have been covered in the interrelated applications and references provided herein. FIG. 36 illustrates a cross-section of a device 600 having a transparent substrate (TS) 610, which may be an inorganic glass, a plastic, and so forth. The TS 610 has a coating of a transparent conductor (TC) 612. Transparent conductors include indium-tin oxide (ITO), fluorine doped tin oxide (FTO) and aluminum doped zinc oxide (AZO), a mesh of conductive nanowires, and others. For many applications, typical values of surface resistance of such transparent conductors range from about 1 ohm/square to 100 ohms/square. A chromatic layer (CL) 614 is configured on the TC 612, wherein the CL 614 may be a polymeric or an inorganic layer with redox properties, and so forth. This has at least two or more optical states related to an equal number of redox potentials. The color change in the device 600 occurs when the redox state of the CL 614 is changed. Some materials that may be employed for the CL 614 include conductive polymers, such as polyaniline, polypyrrole, polythiophene and their derivatives, and inorganic oxides, such as tungsten oxide, nickel oxide, mixed metal oxides (e.g., lithium-tungsten oxide, lithium-tungsten-nickel oxide, lithium-tungsten-niobium oxide, indium-niobium oxide, tin-iridium oxide), combinations of more than one redox materials, and others. The CL 614 may be deposited by a variety of methods such as physical vapor deposition (e.g., sputtering, evaporation), chemical vapor deposition or from liquids (from liquid solutions, sol-gel technology, and others, such as, by dipping, roll coating, spraying, spinning followed by a thermal treatment). An electrolytic layer (EL) 616, which may be a liquid or a solid; aqueous or non-aqueous, is configured on the CL 614. In addition to salts and/or acids in EL 616 may also have redox additives. In some embodiments, redox additives are reversible so as to provide devices with high reversibility. These redox additives may also exhibit color change with a change in their redox state. A top layer 618 acts as a cover plate, which for glazing is also transparent. In an alternative embodiment (not shown) this cover plate 618 may also have a conductive coating (transparent for a window), and may even have another redox layer which is in contact with the conductive layer and the electrolyte (not shown), and this redox layer may also have complimentary chromatic properties as compared to the conductive layer. As illustrated, a redox mediator, contact element 620, which may be a metal, is in contact with the electrolyte. In some embodiments, the contact element 620 is a storage component of ions which are released when the chromatic layer 614 is activated to transition to a different redox state. The contact element 620 is connected to the transparent conductor 612 through a switch 622, the transparent conductor 612 may also have a conductive perimeter busbar (not shown) in order to distribute the current uniformly around the device perimeter so that color change is uniform and transitions quickly. The contact element 620 may be located at the periphery of the device, or this may be a mesh inserted between the electrolyte 616 and the cover plate 618. As a variation, these metallic wires may be bonded or embedded in the cover (e.g., glass with embedded wires) where some parts of the mesh is exposed to the electrolyte layer.

In typical electrochromic devices the change in color of the chromatic layer is induced by an externally applied electrical stimulus; in the inventive devices this is done using internal potential differences of the various materials used that trigger the redox reactions in the chromatic layer; this is achieved through the configuration of the chromatic layer 612, electrolytic components 616 and the redox mediator 620 (metal in this case). For example, when the switch 622 is closed, ions from the metal 620 are released while the electrons travel through the circuit created by the closed switch 622 such that the chromatic layer 612 is electrochemically reduced and acquires a different color. When the switch 622 is opened a redox shuttle in the electrolyte reverses the reaction. Introducing a resistor in this switch 622 provides a control on the device kinetics and/or the level of coloration (gray state control). The magnitude of this resistance (resistance tuning) may be controlled by a variable resistor. One may also force this change by mechanical movement of the mediator, where in one state it touches both the electrolyte and the transparent conductor 612 or the chromatic layer 614, and in the other state may not touch any component or only the electrolyte. However, accomplishing the change in state via a switch is more desirable as it is simpler and more reliable. Although in this and other descriptions we use metal object (such as a wire, mesh, plate, sponge, etc.) as a redox mediator (metal 622), but nonmetals are also considered, as it may be any solid hosting the appropriate redox reaction. For example, this may be a metal oxide, any other metal or a non-metal compound, a composite of several redox materials, a coating deposited on a substrate or on particles which are then assembled together, coating or deposits on porous bodies, etc.

Figure 38:
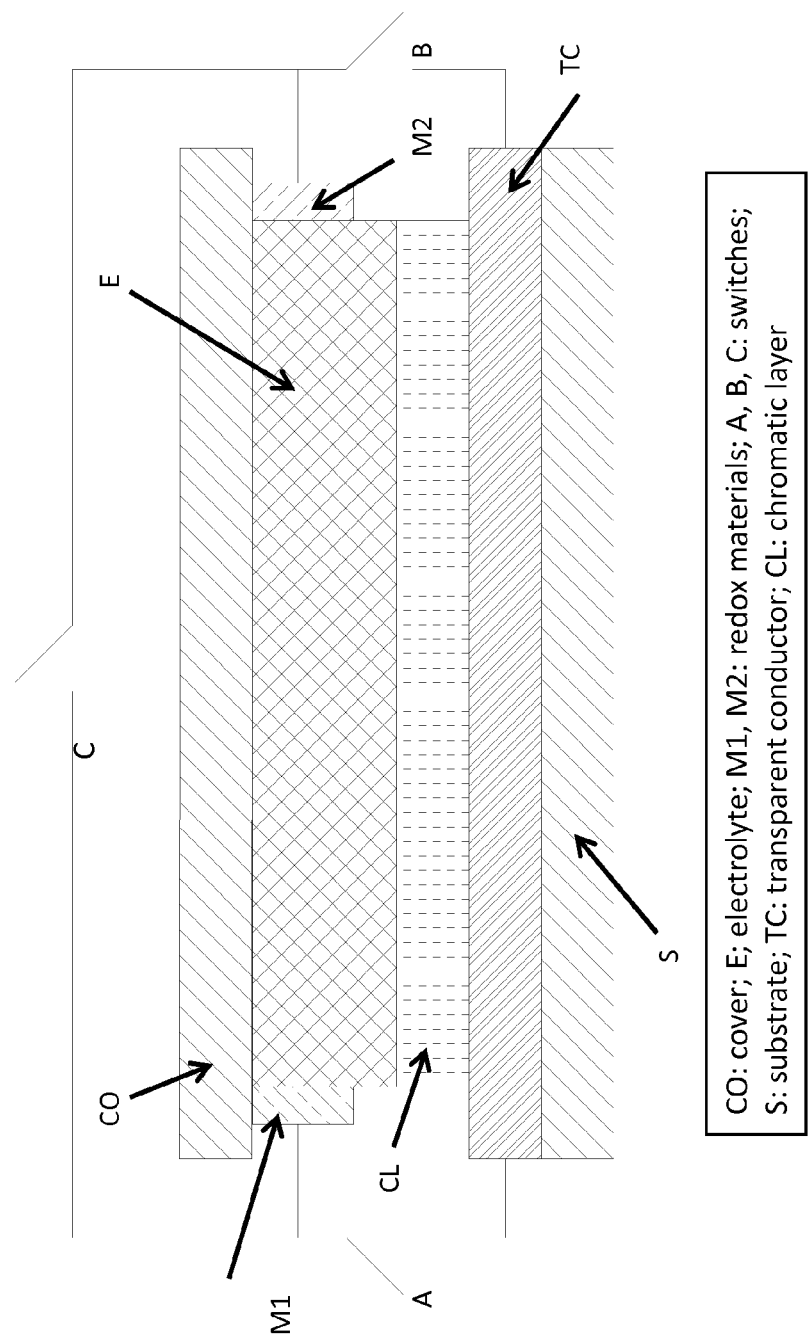
FIG. 38 illustrates a cross-sectional view of a chromatic device, according to example embodiments.

FIG. 38 illustrates an alternate embodiment, wherein a device has two solid redox mediators, with or without any redox agent in the electrolyte; a first solid redox agent (M1) may reduce the chromatic layer to put it in one optical state and the second solid redox agent (M2) acts to oxidize the chromatic layer CL to reverse the change in color (or optical density). Let us assume that as shown in FIG. 38, the M1 solid redox agent is in contact with the electrolyte E, and is responsible to reduce the chromatic layer CL when switch A is closed and switches B and C are open. This means that the relative electrochemical potential of M1 is such that when it is electrically connected to the CL though the transparent conductor TC, this material oxidizes but CL is reduced and its optical state changes to a first optical state. When the optical state is to be reversed, the switch A is opened (switch C is already in open state) and switch B is closed. The redox potential of M2 is such that it reduces and the chromatic layer CL is oxidized. This may occur by deposition/reduction of cations from the electrolyte E, and these may be the same ions formed by the oxidation of M1. In this device CO is a cover, which is transparent for windows. The electrolyte E may be a solid (aqueous or non-aqueous) and also the perimeter of the device is sealed to minimize any interaction or leakage of the interior components into the atmosphere. The solidification of the electrolyte E may be done in situ, wherein the process fills the device with a liquid electrolytic formulation followed by polymerizing a monomer in it. In other embodiments, a solid polymeric electrolyte sheet may be laminated between the CL, deposited on a substrate, and the Cover (CO).

Although it is not shown in FIG. 38, one or both of M1 and M2 may be in contact with different electrolytic compositions, wherein these electrolytes are separated by a membrane with the Electrolyte (E) so that a salt bridge is formed between the two so as to pass only specific ions through this membrane.

Figure 41:
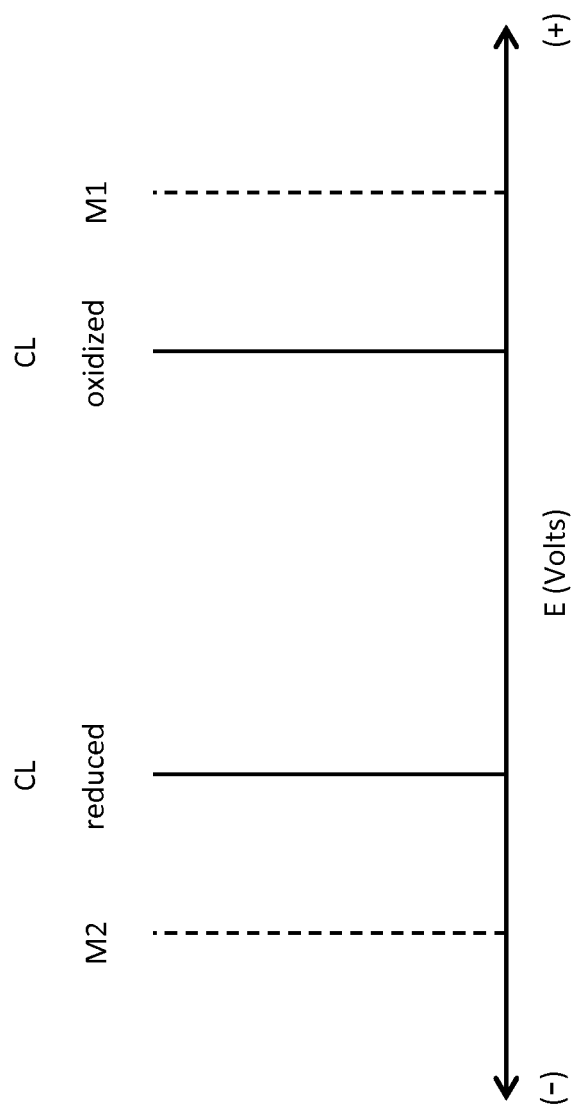
FIG. 41 illustrates transmission spectra of the smart material structure of FIG. 36, according to example embodiments.

Schematically, the device mechanism may be depicted on an electrochemical scale as shown in FIG. 41. The two solid lines represent the reduction and the oxidation potential of the CL layer, and the reduction and the oxidation potential of M1 and M2 relative to the CL potentials are also illustrated. The potentials for these materials may be determined using standard electrochemical methods, such as cyclic voltammogram, may be used to determine the reduction and the oxidation potentials of the CL layer. Sometimes these peaks are broad (or spread out on the voltage scale), and one may use the maximum peak positions as an indication of this potential. These potentials are preferably established using the same ions and similar electrolytic compositions which are contemplated to be used in the devices. The kinetics of these may be influenced by the surface area of M1 and M2, where higher surface area may lead to faster kinetics. For reasonable kinetics, the difference between M2 and "CL reduced" is about greater than 0.2V and may be greater than 0.4V, and similarly the difference between M1 and "CL oxidized" is about greater than 0.2V and may be greater than 0.4V.

M1 and M2 may be wires, strips, porous bodies, mesh, and so forth, located around the perimeter of a device (such as a window), and one may deposit this in a mesh adhered on the inside of the cover CO, such as on the side facing the electrolyte layer. These may even be a sequence of fingers of alternating M1 and M2. The above described mesh may both be deposited, or printed, on the cover facing the electrolyte and should preferably be done so that any crossover points between the two, where M1 and M2 are electrically insulated from each other. M1 and M2 may be located on different edges of the device perimeter or may both be positioned around the entire perimeter, as long as an electrical short between the two is avoided. Although in these descriptions M1 and M2 also act as conductive paths, one may use a composite element where conductive core or a layer is used and then it has a plating of the material with electrode or a redox function.

M1 and M2 are designed such that the desired optical change reactions are driven with reasonable time frame (kinetics). For windows in architectural and transportation applications this may be from about a minute to about 20 minutes, depending on the application. It is possible to consider shorter and longer transitions for various applications, such as industrial applications which may allow for a longer transition or medical applications where shorter transitions are desired. For example, when M1 oxidizes by sending ions into the electrolyte for the CL layer to reduce, and then during reversal M2 is activated so that the reduction takes place on its surface by deposition of the ions in the electrolyte formed from the oxidation of M1. The latter reaction may stall soon and reach an equilibrium where the deposited M1 ions will again like to go into the electrolyte and oppose the oxidation reaction of M2. One way to overcome this problem would be to make surface area of M2 electrode much larger as compared to the surface area of M1; a desirable surface area of M2 as compared to M1 would be in the range of about 2 to 2,000. This ensures that even when some of its surface of M2 is covered with the material formed from the plating of ions from the electrolyte, such as may be formed from M1, the electrodes still predominantly functions as the reduction layer until the CL layer reaches a desired optical state. However, in this case, after some cycles all of M2 may be covered with ions that may have originated from M1 and the window may not be able to reverse the color.

Figure 39:
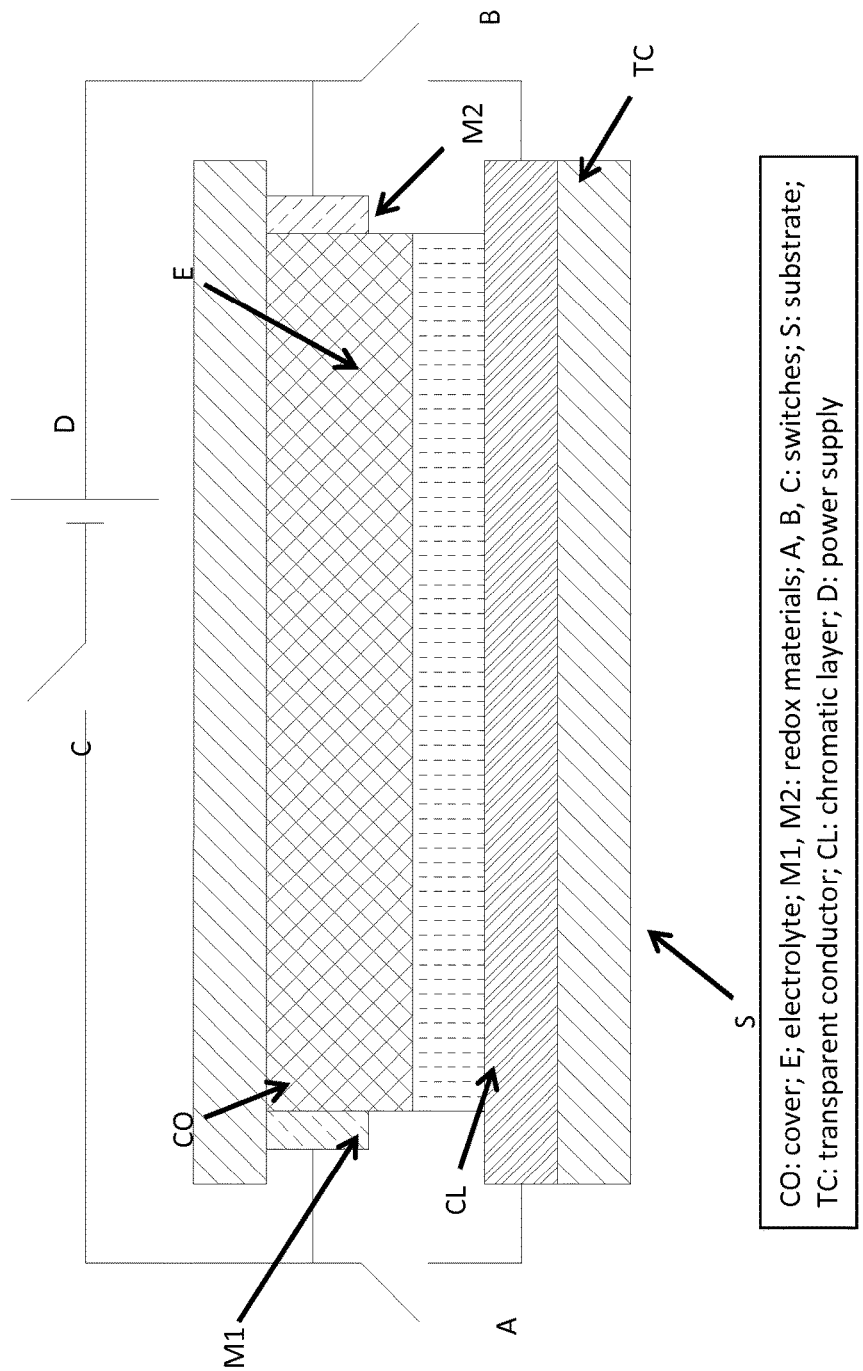
FIG. 39 illustrates a cross-sectional view of a chromatic device, according to example embodiments.

To overcome this situation, one may add a power source as shown in FIG. 39, wherein the layers are as described in FIG. 38. This power source may be a DC supply from mains, battery, capacitor or a solar cell. When the device is not being cycled from one state to the other, then one may open switches A and B, and close switch C so that all of the plated material on M2 is reversed and is deposited back onto M1. This results in the effective regeneration of M1 and M2. This could be done automatically without human intervention. This power source may be used for other functions or as a control system, such as opening and closing the switches, monitoring the light passed through the device if used as a window, detection of end points by monitoring the optical state of the device, potential of an electrode as compared to another electrode, current or charge passed, time for coloration/bleach, and any combination of these.

The electrolyte may have salts dissolved containing the same ions as produced by electrochemical oxidation of M1, and the concentration of M1 in the electrolyte decreases or increases as the optical states of the device are changed. An interesting aspect of several of these devices is that even when used as windows, they may only use one transparent conductor.

The following examples provide specific configurations, formulations and components used to build smart structures.

Example 1: Preparation of Polyaniline Coatings

Polyaniline Solution

Polyaniline in the emeraldine base 50,000 molecular weight was used. The process involved placing 0.5 grams of this material in a sure seal bottle fitted with a stir bar and to this was added 20 ml of 88% formic acid. This mixture was immediately stirred at a rapidly at room temperature for six hours. This resulted in a dark green solution. The solution was filtered by vacuum filtration through Fisherbrand glass fiber filters (G6, 1.5 µm).

Substrates

The substrates were 7"×6" glass sheets with one side coated with a conductive layer of fluorine doped tin oxide with a sheet resistance of 15 Ω/sq (TEC 15 glass) and the substrate had a thickness of 2.3 mm. Prior to use the substrates were soaked in an Alconox detergent solution (Fisher Scientific USA) for one hour and then thoroughly scrubbed, rinsed with deionized water and dried in a clean room oven at 110° C.

Deposition

The coatings were deposited by spin coating using a Headway Research Spin Coater. The polyaniline solution was deposited, by first passing through a 0.7 µm glass syringe filter (Whatman GF/F W/GMF), onto the conductive side of the glass substrate. The substrate was then rotated at 500 rpm for two minutes to give a dark greed coating. The thickness of the coating was 440 nm as measured by surface profilometry. By varying the concentration of the polyaniline solution and the spin speed the coating thickness was varied between 1 and 0.2 microns. After deposition the coatings were stored under an inert atmosphere.

Example 2: Activation of the Polyaniline Coating with Zinc Wire

Electrolyte

An electrolyte solution was prepared by dissolving 0.228 g of ammonium persulfate (Sigma Aldrich USA) and 0.833 ml of 37% hydrochloric acid solution (Sigma Aldrich USA)

in deionised water (18 megaohm-cm). The final concentration was 0.01M ammonium persulfate in 0.1N hydrochloric acid.

Activation

A 2"×2" polyaniline coating was spin coated on TEC 15 glass resulting in a 440 nm translucent green coating. The coating was removed with a blade near one edge of the substrate, leaving a quarter inch wide strip where the underlying transparent conductor was exposed. A few drops of the electrolyte were dispensed on the substrate partially covering the polyaniline. By touching the top of the electrolyte on one side and the exposed transparent conductor on the other end with a zinc wire, the coating immediately turned from a deep green color to a colorless highly transparent coating. Upon removal of the zinc wire the coating turned back to a deep blue/green color.

Example 3: Activation of the Polyaniline Coating with Stainless Steel Wire

A polyaniline coating was activated as described in Example 2 above except that stainless steel wire was used instead of zinc. In this case the bleach kinetics (going from deep green to colorless transparent) was slightly slower and the color kinetics was the same.

Example 4: Preparation of Window Device with Polyaniline Electrode

Figure 37:
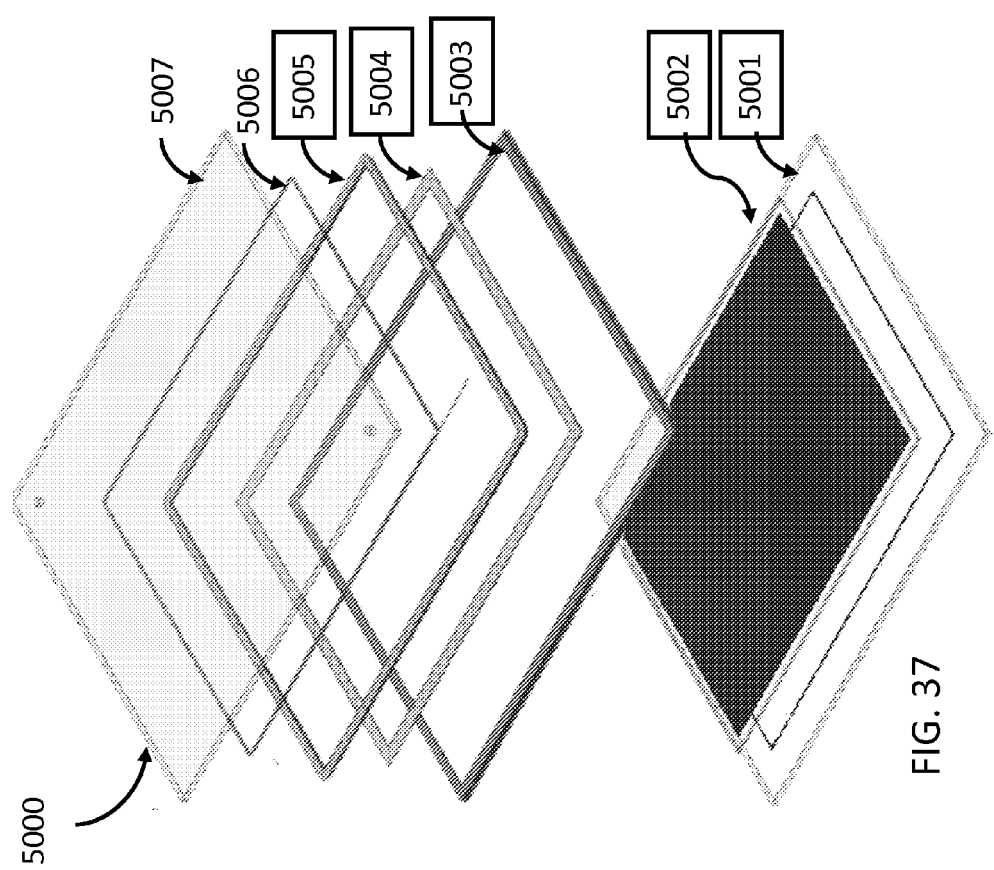
FIG. 37 illustrates an expanded view of the smart material structure of FIG. 36, according to example embodiments.

The device construction is illustrated in FIG. 37 and of a TEC 15 glass substrate 5001, 6"×7" coated with polyaniline 5002 as described in Example 1. The polyaniline thickness was 440 nm. The polyaniline was removed around the perimeter to a width of one half inch with a blade. A copper conductive tape 5003 was placed around the exposed perimeter to a width of one eight of an inch. A high temperature curing epoxy 5009 was dispensed around the inner edge of the copper tape to a width of one eight of an inch. Then an insulating 100 microns thick polyimide tape 5004 was placed around the inner perimeter of the epoxy such that it slightly over lapped on the polyaniline coating. The width of the tape was five sixteenths. On top of this tape was placed a metal wire 5006 of composition 63% tin and 37% lead. The wire was rectangular in shape and open on one corner where a thin insulated wire was soldered and extended outside the cell through the epoxy providing means for external connection with the metal wire. Finally the cell construction was completed by placing a top glass cover (5007) 7"×6" with two holes drilled in opposite corners which when placed on top of the polyaniline substrate were inside the epoxy sealant perimeter to allow for injection of the electrolyte. The epoxy sealed between the top cover 5007 and the bottom substrate 5001, and the gap of the cavity formed was established by the diameter of the metal wire 5006 which was 0.031". The cell was cured under ambient atmosphere at 150 C for 1 hour. Upon cooling the cured device to room temperature the polyaniline coating had changed color from deep green to the full oxidized deep blue state.

Example 5: Activation of Window Device

Figure 40:
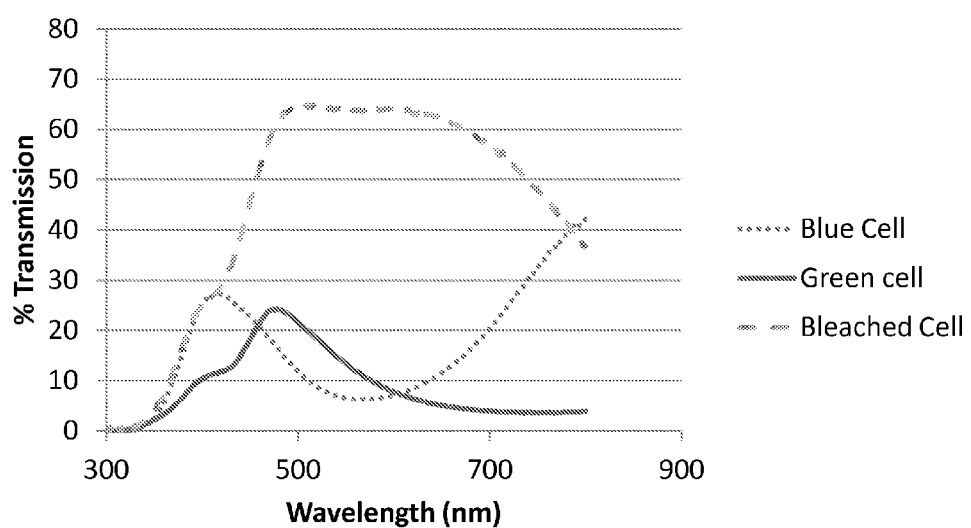
FIG. 40 illustrates relative oxidation and the reduction potentials of a chromatic layer of a chromatic device in reference to the redox potentials of the other electrodes, according to example embodiments.

A device as described in Example 4 above was filled using a syringe through one of the fill holes with the electrolyte described in Example 2. The approximate volume of electrolyte used was 20 ml. The fill holes were sealed with tape. The initial state of the device was deep blue. When the external leads of the metal wire were connected to the copper tape the device immediately started to bleach from the outside to the inside of the cell. After all the active area was bleached, the wire was disconnected and the cell started to color again until it reached a uniform green colored state. Spectra between 300 and 800 nm of this device in both bleached and color states are shown in FIG. 40.

Glazing System Incorporating Chromatic Elements and their Control

FIG. 42 depicts a switchable smart window 650 controlled wirelessly using an integrated wireless radio 658. The control sub-system 654 detects the on, off, or transitional signals from the radio 658 and relays it to the switch 656 that connects or disconnect the metal wire (5006 in FIG. 37) to and from the conductive layer (5003 in FIG. 37). Currents may be drawn from an integrated battery during switching. The device will remain passive before and after switching.

FIG. 43 depicts a switchable smart window 660 triggered automatically by integrated sensors 668. For instance, in application for skylight windows, such as for buildings located in hot geographical locations, it is desired to tint the window during solar exposure peak hours. Hence, a local sensor 668 will automatically detect such situation using passive optical sensing, then alert the control sub-system 664 that will trigger the switch 666 to connect or disconnect or introduce appropriate resistance between the metal wire (5006 in FIG. 37) to and from the conductive layer (5003 in FIG. 37). Currents may be drawn from an integrated battery or a solar cell during switching. The device will remain passive before and after switching.

Figure 44:
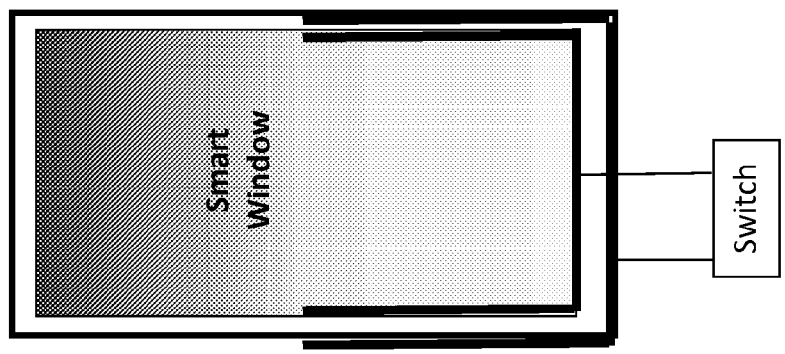
FIG. 44 illustrates a smart material structure having a gradual tint design, according to example embodiments.

FIG. 44 depicts a switchable smart window with gradual tinting, desired in tall windows with longer sun exposure towards the top of the window. In this case, it is desired to have stronger tinting towards the top and more transparent states toward the bottom of the window to allow natural viewing to and from the outside. An example of such implementation is illustrated where the metal wire to provide the bleach redox and conductive layer connection are used in the bottom part only. Furthermore, the chromatic and or the transparent conductive layer may also be designed to provide higher contrast towards the top. It should be understood that the chromatic system described herein may be also used in those window installations where two or more panes are separated by a gap (i.e., as in insulated glazing unit (IGU)). In an IGU configuration, one of these panes is the chromatic device described and the other pane(s) may be a clear, tinted or have a low-e coating or a UV barrier. Depending on which pane faces the outside of the building, one may also have UV barrier and/or low-e coating on the outside surfaces of the chromatic device, One may even form the chromatic device as shown in FIG. 1, where the substrate and/or the cover is tinted and/or has UV blocking properties.

It will be understood that various modifications may be made to the embodiments disclosed herein. Hence the above description should not be construed as limiting, but merely as exemplifications of preferred embodiments. Those skilled in the art will envision other modifications that come within the scope and spirit of the claims appended hereto. All patent applications cited as priority (related applications) are explicitly incorporated herein by reference in their entirety.

Returning to FIGS. 1-4, in an alternate embodiment, the switch 119 is replaced with a mechanism to move the conductive contact 118 with respect to the conductive layer 112. Such a smart material structure transitions through various conditions or states, from a default condition, wherein the conductive contact is positioned proximate to but without contact to any of the layers of the smart material structure, and the chromatic layer is in a default state without stimulus. In some embodiments the conductive contact may be in contact with the electrolyte layer and partially in contact with the chromatic layer depending on the application, configuration and structure.

As the conductive contact is positioned to contact the electrolyte layer and the chromatic layer, the conductive contact 118 acts to stimulate the redox reaction in the chromatic layer. This results in a change in color and/or transparency of the chromatic layer. As the conductive contact 118 is moved closer to the conductive layer, such that an increased surface area of the conductive contact contacts various portions of the structure. The contact again acting as a stimulus to encourage even greater reaction, and thus the increased change in color and/or transparency of the chromatic layer. When the conductive contact is moved further in contact with the layers of the structure, there is a resultant change in color and/or transparency of the chromatic layer.

The position of the conductive contact within the smart material structure may be altered to accommodate applications and designs. The amount of contact, such as the surface area touching, as well as the various layers and the portions of those layers in contact with the conductive contact correspond to various color/transparency changes. Note also that in some embodiments, a return of the conductive contact to the original position and configuration will cause a resultant return to the color/transparency of the chromatic layer.

The window 296 of FIG. 22 is a smart window having layers similar to those described in the examples provided herein. Specifically, the smart window has an electrolytic layer, a chromatic layer, a conductive layer and a glass substrate. FIG. 23 illustrates application of a conductive contact 298 along the periphery of the glass pane, which may be moved in a position to stimulate the redox reaction and thus the color/transparency change of the window. Alternatively, the whole window grid may act as the metal frame that will change the color/transparency of the glass within each grid frame. Alternate configurations may incorporate the conductive contact (e.g. metal frame) within the structure without impeding the function. In other words, the conductive contact is part of the window frame structure and appears as part of the original window structure. This acts to enable the function of the smart window without deteriorating the esthetic effect of the window or window treatments.

Additional embodiments may incorporate a window treatment structure, such as blinds or drapes, wherein a conductive contact is positioned so as to contact the smart window. Vertical blinds, for example, may have multiple conductive contacts built in, which then are controlled by cords at the end of the blinds, similar to current functional control of vertical blinds. Horizontal blinds, for example, may have a single element (or multiple) at the top of the blinds, which moves in and out toward the smart window. This is particularly advantageous, as typical horizontal blinds have a large metal box at the top to hold the control mechanism for functioning the blinds up, down, open and close. In other examples, the control mechanism may be built into a window treatment such as a curtain rod or other hardware.

In some embodiments the individual properties of the various layers and components are used to achieve other desired results. For example, the conductive layer may be used for its insulating/conducting or electrical properties. In some embodiments, the conductive layer may structured on the substrate, such as on glass, in such a way that it absorbs certain electromagnetic waves to prevent interference, lower radiation exposure, and/or allow more secure indoor communication.

Figure 59:
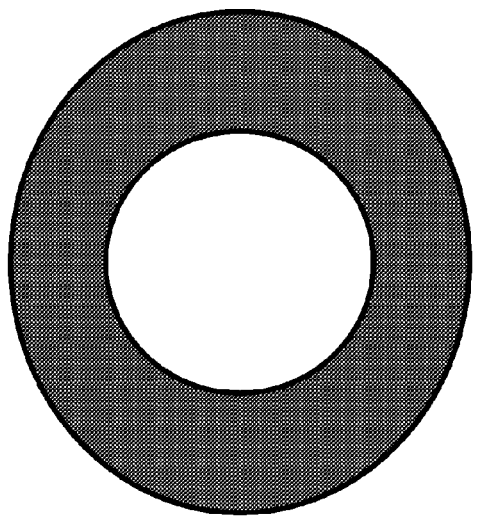
FIGS. 57-59 illustrate a smart material structure applied to a camera aperture, according to example embodiments.
Figure 58:
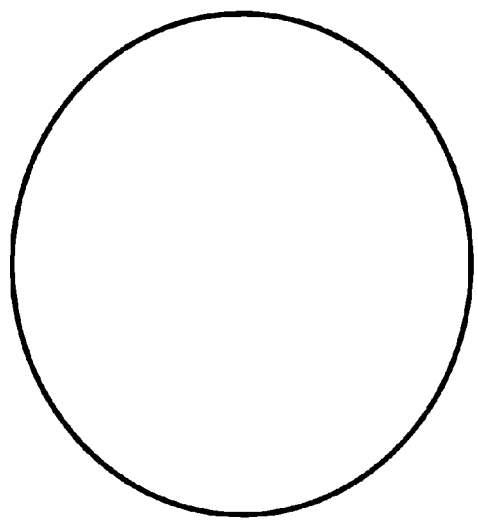
Figure 57:
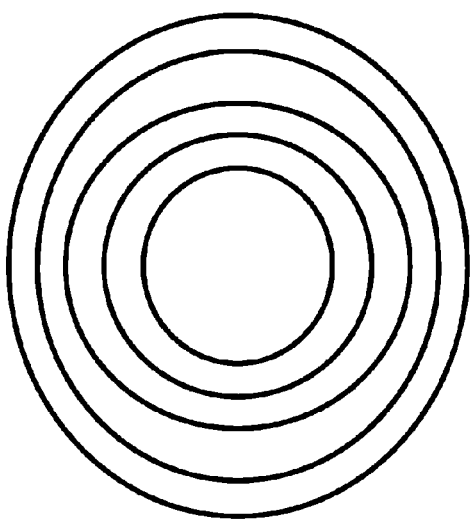

Another application is an adaptor to camera lenses that adjusts the aperture opening to allow enough light depending on the desired shot, location, orientations, and surrounding lighting. The structures described in the application may be designed in ring shapes, such that rings of varying diameters and depths turn opaque or transparent without requiring an external applied voltage; this enables adjustment of the depth of focus. FIGS. 57-59 illustrate theses concentric rings. FIG. 57 illustrates the overall layout of the rings. FIG. 58 illustrates the case when all rings are transparent (open lens case). In FIG. 59, the lens is partially open and some of the rings have changed chromatic behavior due to redox reactions within the structure. For use in a camera, the rings may be opaque to reduce the size of the aperture and restrict light passing through the lens, or may be transparent to optimize the light passing through the lens. Such camera modules may be used in smartphones, drones, and other types of cameras. The size and shape of the aperture may be adjusted by darkening and lightening the concentric rings in the design. Today, most camera apertures in smartphones are not adjustable.

Figure 45:
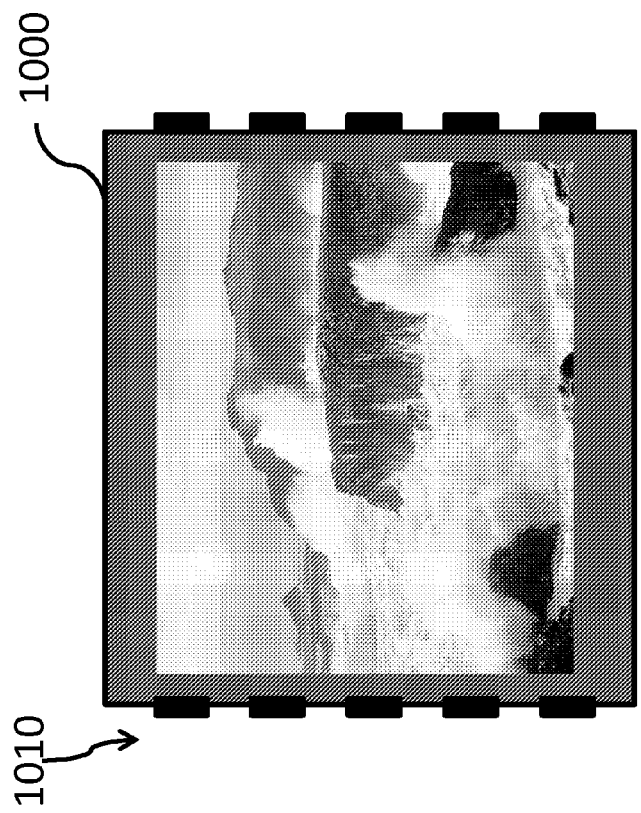
FIG. 45 illustrates a smart material structure, and chromatic application thereof, having patterning capability, wherein the structure is illustrated prior to application of conductive contacts, according to example embodiments.
Figure 46:
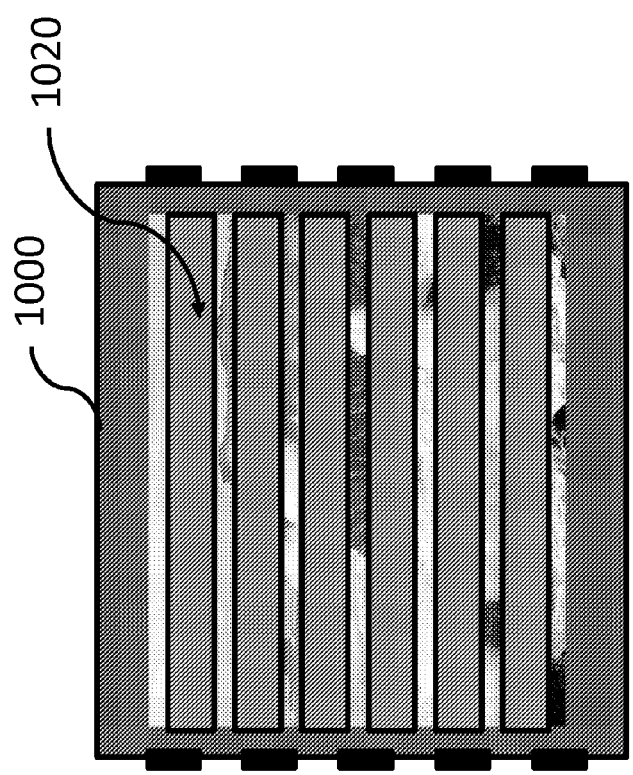
FIG. 46 illustrates the smart material structure, and chromatic application thereof, having patterning capability, wherein the structure is illustrated after application of conductive contacts, according to example embodiments.

Referring to FIGS. 45-46, consider a distributed conductive contact 1010 on smart structure 1000, which is a smart window. In FIG. 45, the distributed conductive contact 1010 is in a first position wherein the chromatic characteristic of the smart window structure, and the substrate glass layer, is transparent. When a portion of the conductive elements of the distributed conductive contact change position with respect to the smart window structure a patterned shading occurs on the window, where the chromatic characteristics of portions of the window become opaque. As illustrated in FIG. 46, where patterns 1020 resemble window blinds. By changing the number and position of conductive elements that change position it is possible to achieve various patterns on the window, or on other smart structures.

A similar shading effect may be realized by patterning of the substrate and/or conductive polymer layer to achieve different results. For example, the smart window application may be used for a display screen wherein a portion of the screen may be controlled, while another portion is not. Similarly, there may be a design that a user desires to display on the screen, which is presented when a set of the contact elements are proximate the conductive dye layer and another set of contact elements are at a different position with respect to the conductive dye layer. There are a variety of configurations possible using various geometries, positioning, combinations of sets of contact elements, and the specific structure configuration and patterning desired.

Figure 47:
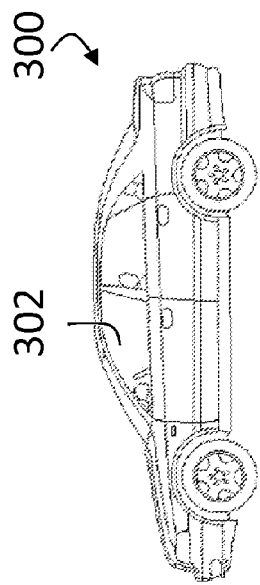
FIGS. 47-48 illustrate an automobile having a smart material structure, according to example embodiments.
Figure 48:
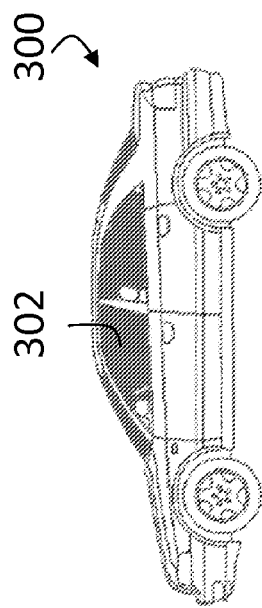

There are limitless applications for the semi-active chromatic structures described herein. FIGS. 47-48 illustrate an automotive application. Here the automobile 300 incorporate smart material structures to provide smart windows 302. These may be automatically transition on environmental conditions, wherein the control mechanism (not shown) places a metal contact so as to contact the smart material structure layers and transition the color/transparency of the smart windows 302, or these may be manually enabled by the user. A limousine may use smart glass to reduce or eliminate viewing of the driver from the back seats. The opaque state could also be used to prevent sight of belongings in a car and avoid theft as an anti-theft system to stop car thieves from seeing the interior of a car.

In some applications, the opaque state may enable presentation of an image or photo, such as to present an image of an empty car interior when the car is parked and avoid break-in and theft. The ability to present an image when the glass is not transparent involves embedding an image on the glass that may be transparent in a first state and visible in a second state.

Such smart material structures may be used to provide borderless sun glare block area and sunshield in a windshield in a motor vehicle to prevent drivers from being blinded by sunset and sunrise. In some embodiments, the smart material structures are used as adaptive windshield and windows to enable driver and riders to adjust the transparency of the glass to project video, maps, and others.

Intelligent variable road traffic marking lines with an electrochromic component enable lane changes to be implemented without traffic signs and cones with their manual placement. The markings would change color by semi-active chromatic transitioning. The traffic may thus be intelligently controlled according to the size of the traffic flow or time of day. The intelligent variable road traffic marking line has advantages of high efficiency, direct control, clear visibility and so forth.

Figure 49:
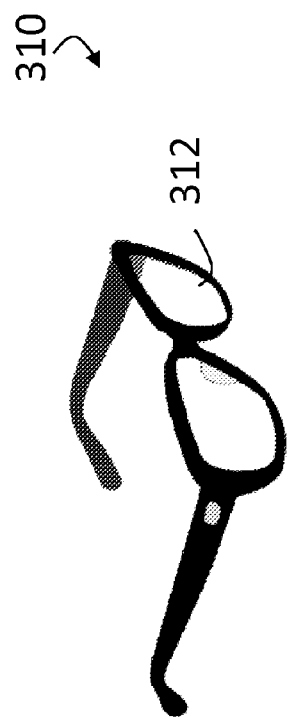
FIGS. 49-50 illustrate eye glasses having a smart material structure, according to example embodiments.
Figure 50:
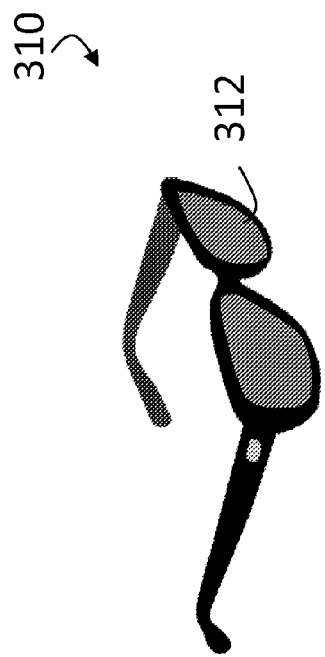

In FIGS. 49-50 smart material structures, or smart glass, is used to control transition of the color of the glass 312 in a pair of eye glasses 310. Here the user may desire control and a simple mechanism may be implemented on the side of the glasses 310 enable such control.

Furthermore, smart glasses such as Google Glass, a product of Google of Mountain View, Calif., rely on transparent glass to analyze and reflect data from surrounding environment and Internet and to user eye and Internet. The way Google Glass devices accommodate a user's privacy is by using thick glass to prevent people nearby from reading or accessing the information displayed on the Google Glass, which is not only cumbersome but less effective given the transparency of the glass. Giving the user to ability to changer the background color of the color will not only enhance the contrast of the data displayed on the glass but also avoid exposing it to others.

In some embodiments the transition may be to a one-way opaque glass enabling the wearer to see through the glasses 310 but not prohibiting vision from external to see the wearer. Such application may be advantageous where sensors monitor the user's eye movement, and the user does not wish to be subject to such monitoring. This security application may be extended to enable specific coded visual aspects, wherein the smart glass may be encoded to provide one-way visual capabilities. For example, the user may have a specific key to encode the glasses for one-way viewing by the user. A target device or display may have a similar encoding which may only be decrypted by the user's glasses. Here the encoding enables a message or image to be presented to multiple people but only viewable and comprehendible by the user having the encryption/decryption key. The encryption may be implemented using a dot matrix color scheme applied to the glasses, which is changed to match the conditions of the information presented.

A transparent interface for a flexible smartphone, mobile or other device that may be rolled up or folded in someone's pocket. The novel controlled chromatic smart material is integrated to allow a user's device to sense environmental conditions and respond accordingly. The opaque state may enhance code security patterns or hide a user/smartphone manufacturer specific ID Bar, or QR code.

Figure 53:
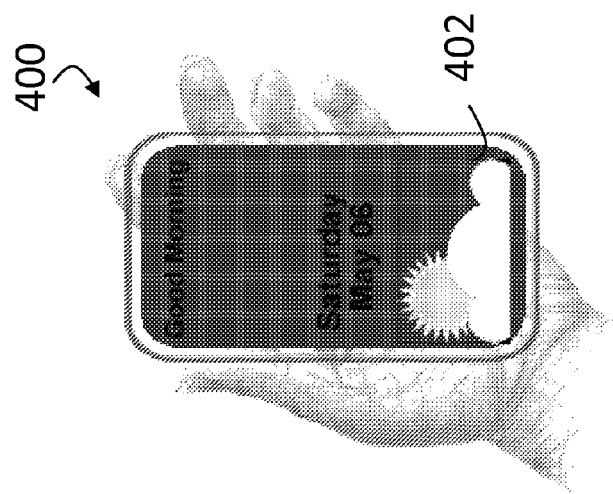
FIGS. 51-53 illustrate a mobile device having a smart material structure, according to example embodiments.
Figure 52:
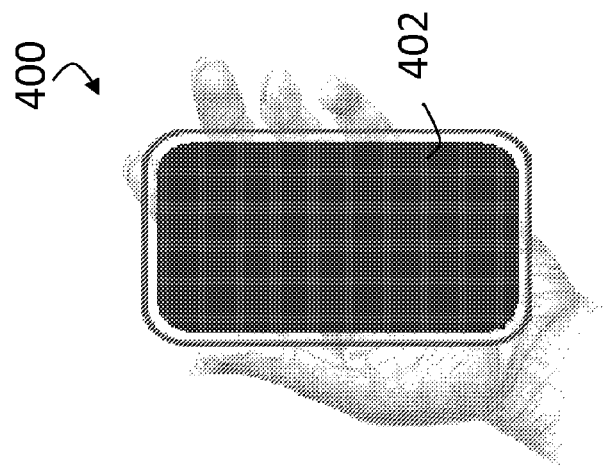
Figure 51:
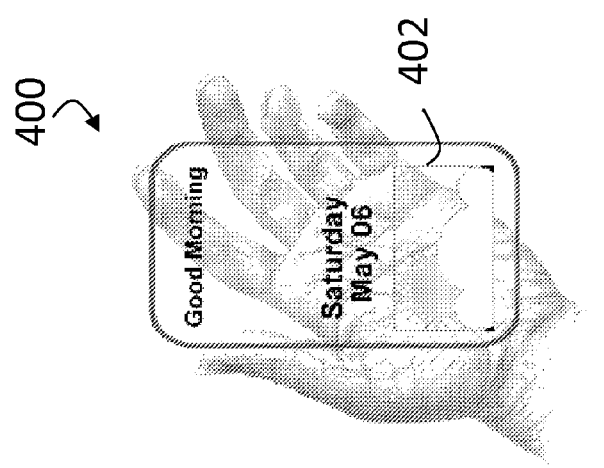

FIGS. 51-53 illustrate a mobile device 400 having a smart glass display 402 which is controlled automatically by environmental condition changes and/or by a user through direct control mechanisms. For instance, the mobile device user will sweep his finger(s) along the display, which triggers the controller to sense the user's fingerprints to authenticate the user before applying or removing the metal frame to make the display completely opaque or transparent. The effect is similar to today's pattern recognition security mechanism except that in addition the mobile device keeps operating in the background.

Another application is to shrink the size of the chromatic structure to a pixel size and arrange multiple of them in such a way to display high-resolution images and drive the switches between these images using external variable impedance circuit, similar to the one illustrated in FIGS. 9-12.

In some embodiments an intelligent dimming and temperature regulation process incorporates a smart glass having two layers of glass substrates, a chromatic polymeric layer, and an electrolyte layer, which are sequentially arranged between the two layers of glass substrates. The intelligent dimming and temperature regulation glass does not required external voltage but may be integrated with a temperature sensor that applies or removes the metal contact or frame according to changes in room temperature.

Some embodiments use smart material structures in the light shading module of stereoscopic 3D film glasses. The filtering may be static or adjustable so as to change light transmittance and/or reduce ambient light when viewers are watching three-dimensional images and videos.

The embodiments described herein may be used to retrofit windows by application of layers sufficient to build smart material structures and allow smart control. There are several ways, in addition to those described herein, to build out these existing glass and transparent structures, and position a metal contact proximate the resulting structures.

Many devices, including many mobile devices, currently have a touch screen that includes a conductive layer, such as an ITO layer. These devices merely require a conductive dye layer, electrolyte, and a metal contact to result in a smart glass device.

Other applications may be directed to an adjustable reticle that changes its optical transmissibility and patterns. Some of aiming or pointing devices include a glass with cross lines to help user aim the device at a given target. In some situations, the reticle design needs to adapt to the specific target such as a cross or a circle and dot. The smart glass will include all these designs and make the desired one opaque and the rest transparent. Chromatic material may be built to allow filtering to prevent cross-talk due to optical effects from the glass edges when user tilts his head. Other chromatic materials may be built that enhance cross-talk to give users the impression of 3D effects, ghosting, and other optical illusion.

The embodiments, examples and discussion herein provide a smart material technique and structure whereby application of a metal to such a structure enables a color transition or change in transparency of the structure. The metal is applied to an electrolyte layer which triggers generation of hydrogen bubbles that act to reduce the conductive polymer, which then transitions to a different color or transparent state. Upon removal of the metal contact, the reduced PANI film is exposed to oxygen (e.g., such as in air) and oxidizes to its original color. The reduction and oxidation speeds depend on the various parameters discussed hereinabove. Such color reversibility is a key in many commercial applications. The structure built thereby has a reservoir to store hydrogen, oxygen and/or other gas or gasses.

The conductive layer acts as a counter electrode to increase electron mobility through the structure. The voltage difference between the metal contact and the conductive layer exists due to the very large effective impedance there between. The structure configuration is designed according to this impedance match.

In some applications the chromatic device is used as a sensor to detect specific gases or types of gas, such as to detect dangerous gas (e.g. NO2). After application of the metal contact, the device will change color in the presence of the gas. In this way, a non-electric sensor may be constructed for use in dangerous situations. These sensors may be placed in the home, school, fire station, and so forth.

Mechanical Integration(s)

There are various ways to integrate the smart material and the conductive contact frame in order to better control the speed at which its chromatic properties change, including the following.

Multi-thread shafts may be used to adjust the metal frame pressure on the smart material structure layers. A variety of mechanical structures may be used, as there is no need to apply an electric charge to the conductive chromatic layer material but rather a physical movement of the conductive contact proximate to or away from the layers of the smart material structure.

A threshold may be applied to avoid deterioration of the conductive film or material and avoid see-sawing back and forth between states. A hysteresis mechanism may be applied that will avoid abrupt changes and balance the transition between color/transparency levels bi-directionally.

A ratcheting handle may be used in combination with mechanical shafts to manually release or lift the metal frame which uses minimum energy of the user to accomplish these tasks.

Such mechanical systems may be controlled via a turning knob that may rotate in a clockwise or counter-clockwise directions, a lever that enables smooth control, an electronic selection that may enable discrete levels or continuous control and flexibility.

Alternatively, it may be controlled using a lever arm or a knob attached to the frame of contact section.

In some embodiments a mechanism is used to move the complementary electrode proximate the chromatic structure, wherein the movement is driven by an event or condition. In some embodiments, the mechanism is driven by heat, whereby the complementary electrode is moved with respect to the chromatic layer to change the temperature of the room; such as to darken the window when the room is hot, or to lighten the window when the room is cold. Still other triggers may be based on light, temperature, air pressure, or other means.

In some embodiments, the Metal object or frame may move magnetically upon pressing or turning a knob. Furthermore, a passive electrical circuit element, such as a resistor, may be inserted between the metal object/frame and counter electrode conductive layer in order to adjust the resistance based on how far the knob is turned. The mechanical contact may be remotely controlled, such by wireless signal to the contact.

The present inventions provide non-electrical methods for creating user or environmentally controlled smart glass. The present inventions provide mechanical techniques for creating dimmable or dynamic glass which provides vastly improved efficiency over traditional smart glass mechanisms. The inventions presented herein may be used to provide energy efficient design, aesthetic features, ease of use, and satisfy design criteria not previously possible with the expensive electrochromic and other mechanisms.

The embodiments provide herein demonstrate the application of a chromatic layer on a variety of substrates, which responds when the complementary electrode is connected to the conductive layer. The complementary electrode is the stimulus and the response is a change in the chromic (or color) characteristics, including transparency and haze. A large variety of materials are presented which may be used in a variety of configurations to achieve these results.

The present invention(s) are applicable to use cases included architectural design, transportation, and device applications. Architectural applications include commercial, residential, and industrial. Transportation includes trains, aircraft, automobiles, subway and rail. Transportation may have application to aerospace, military, as well as recreational, including motorcycles, bicycles, snowmobiles and so forth. These inventions are applicable globally.

The inventions presented herein may be used in combination with, and to enhance, present smart glass mechanisms which require other energy sources, including Suspended Particle Displays (SPD), Liquid Crystals (LC), Polymer Dispersed Liquid Crystals (PDLC), Electrochromics, photochromic and others.

Below is a table of possible material and composites to use in each layer. It is be noted that the conductive chromatic layer is typically used as an Electrochromic layer in an Electrochromic device, but in the devices of this invention the activation of the devices is not carried out by applying electrical power. G Chromatic structures comprise a stack of layers to achieve the redox states of conductive chromatic layer material(s), and may include materials that change refractive index such as metamaterial structures, potassium dihydrogen phosphate (KDP), ferroelectric material such as PLZT, lithium titanate, barium titanayte, polyvinylidene fluoride, nanocrystal, quantum dots, graphene.graphene. Fabrication of these stacks may include spin coating, sputtering, ink jet, wet printing, soaking in chemical baths, layer-by-layer deposition.

| LAYER | MATERIAL |
|---|---|
| Substrate | Plastic, glass, polycarbonate |
| Conductive Layer | ITO, IZO, SnO2:F, doped transition metal oxides, metal nanowire films, CNT based films. |
| Chromatic layer | Any material that exhibits color change properties upon oxidation and reduction properties |
| | Polyaniline, other conductive polymer with metal oxide |
| | Inorganic $LiWO_3$, |
| | With pH composites |
| | Additives for improved adhesion such as Polyacrylic acid PAA |
| | Hydroquinone (HQ) for improved Chromatic characteristic. |
| Electrochromic Oxides | NiO, $IrO_3$, WO3, $LiWO_3$ |
| | Composites of conductive and Electrochromic oxides. |
| Electrolyte | Additives such as HCl, H2SO4, PTSA, APS, ascorbic acid, etc . . . |
| | Polyelectrolyte, Polystyrene sulfonate-Na salt, Polystyrene sulfonate-Na salt with VOSO4 salt, LiAlF, non-aqueous electrolyte with an oxidant such as benzo quinone or metal |

-continued

| LAYER | MATERIAL |
| --- | --- |
| | nitrate such as zinc nitrate hydrate or other oxidant which are able to reduce. Additives for improved adhesion such as Polyacrylic acid PAA with metal oxide Counter ions to conductive contacts such as, $Fe^{2+}$, $Al^{3+}$, $Ag^+$ etc. |
| Complementary conductive contact | Iron, steel, aluminum, aluminum alloys, silver and its alloys, gold, rhodium, titanium, nickel, chromium, stainless steel, antimony, |
| Protective Coating, plates | To prevent oxidation from oxygen or moister SIOx, glass/plastic plates, transparent plates coated with transparent conductors. |

The following are ways to prevent or recover the electrolyte from contamination by metal ions when the metal is in contact with the electrolyte:

The use of two electrochemically different metals as illustrated in FIGS. 26-33.

Use of an auxiliary electrode (not shown) to extent the uniformity of the working electrode potential.

Use of multiple connections between metal and conductive layer (not shown).

Have two types of electrolytes located in two spate compartments with a salt bridge (membrane) to connect with the other working electrode in the case of two metal case (FIG. 26).

At a higher pH level, the cathode (substrate with conductive layer and chromatic layer) to anode (metal) transfer occurs at lower potential and at lower current density. Careful selection of first metal may be made such that the corrosion process is less sever and passivation is possible at lower potential induced by the electrochemical reactions of the structure when the second metal is present.

Modeling such system with an equivalent circuit that is open (oxidation process FIG. 1) and closed (reduction process 2-4) may provide the metal polarization resistance, PANI coating resistance and electrolyte solution resistance when the structure is in a reduced, oxidized, or transitional state, may enable extraction of balanced and stable states parameters in order to optimize the selection of the structure elements.

Cover metal surfaces with an inhibitor membrane with pores. The electrolyte active species may pass through the pores to reach the metal surface. Furthermore, if the enclosure is separated into two solution compartments; one for first electrolyte in contact with first metal and second compartment with metal in contact with second metal with a micro-porous membrane to permit the controlled passage of ionic species but prevents the gross intermixing of the separate electrolytes in respective contact with the two metals. The polarity of the two metal electrodes is readily reversible to permit multiple reduction and re-oxidation cycles and prevention of electrolyte contamination.

In another embodiment, the sealed chromatic cell wherein one or more separate solution compartments are associated with the metal electrodes and with one or more compartments separated by a micro-porous membrane. In such embodiment and in the forward (reduction) operation, the first metal electrode operates as an anode and is in electronic contact with first electrolyte chamber and connected with conductive layer deposited on the substrate. The second electrode is disconnected from first electrode and conductive layer (FIG. 27). In the reverse (oxidation) operation, the first metal electrode operates as the cathode and the second metal electrode operates as the anode and they are connected (FIG. 26). Metal ions generated during the forward operation and present in the first solution plates onto the cathode, i.e., the first metal electrode.

The external energy source (solar of battery) further support the removal of the ions contaminating the electrolyte during reduction and passivation of the metal electrodes. Furthermore, the polarity of the electrodes may reverse polarity to increase number of cycles supported by the structure.

What is claimed is:

1. A chromatic structure, comprising:
a substrate layer;
a conductive layer coupled to the substrate layer;
a conductive dye layer coupled to the conductive layer;
an electrolyte layer coupled to the conductive dye layer; and
a first conductive contact configured to couple and decouple the electrolyte layer to and from the conductive layer,
wherein coupling the electrolyte layer to the conductive layer through the first conductive contact reduces oxidation of the conductive dye layer, and decoupling the electrolyte layer from the conductive layer through the first conductive contact increases the oxidation of the conductive dye layer.

2. A chromatic structure as in claim 1, further comprising a switch positioned between the first conductive contact and the conductive layer, wherein, when the switch is open, the conductive dye layer has an ambient oxidation condition, and closing the switch reduces the oxidation of the conductive dye layer.

3. A chromatic structure as in claim 2, wherein, when the switch is opened from a closed position, the conductive dye layer returns to the ambient oxidation condition.

4. A chromatic structure as in claim 3, wherein the switch is a variable resistor.

5. A chromatic structure as in claim 1, further comprising:
a second conductive contact coupled to the electrolyte layer;
a first switch positioned between the fill conductive contact and the conductive layer; and
a second switch positioned between the second conductive contact and the conductive layer, wherein closing the first switch reduces the oxidation of the conductive dye layer.

6. A chromatic structure as in claim 5, further comprising:
a third switch coupled to the first and second conductive contacts, wherein, when the first and second switches are open, closing the third switch reconditions the electrolyte layer and the first and second conductive contacts.

7. A chromatic structure as in claim 6, wherein the first and second switches are variable resistors controlling the connection between the electrolyte layer and the conductive layer.

8. A chromatic structure as in claim 7, wherein the first and second conductive contacts are made of different conductive materials.

9. A chromatic structure as in claim 1, wherein the first conductive contact comprises a metal material.

10. A chromatic structure as in claim 1, wherein the conductive dye layer comprises a polyaniline material.

11. A chromatic structure as in claim 1, wherein an internal conductive electrode is configured to change position with respect to the conductive layer, wherein the oxidation of the conductive dye layer is a function of the proximity of the internal conductive electrode to the conductive layer.

12. A chromatic structure as in claim 11, wherein conductive dye layer has a trench to enable the internal conductive electrode to change position.

13. A chromatic structure as in claim 1, wherein the substrate layer is a transparent material.

14. A chromatic structure as in claim 13, wherein the conductive layer is a thin film transparent layer of Iridium Tin Oxide (ITO).

15. A chromatic structure as in claim 14, wherein the conductive layer is a material that exhibits chromatic behavior in response to environmental changes.

16. A chromatic structure as in claim 15, wherein the conductive dye layer has a first color when the electrolyte layer is decoupled from the conductive layer, and a second color when the electrolyte layer is coupled to the conductive layer.

17. A chromatic structure as in claim 16, wherein the conductive dye layer is opaque when the electrolyte layer is decoupled from the conductive layer, and transparent when the electrolyte layer is coupled to the conductive layer.

18. A chromatic structure as in claim 1, wherein the first conductive contact comprises a plurality of structures positioned on a perimeter of the layers of the chromatic structure.

19. A smart window system, comprising a chromatic structure as in claim 1.

20. A smart window system as in claim 19, further comprising a control means coupled to the first conductive contact to couple and decouple the electrolyte layer and the conductive layer through the first conductive contact.

* * * * *